(12) United States Patent
Zhang et al.

(10) Patent No.: US 11,799,520 B2
(45) Date of Patent: Oct. 24, 2023

(54) COMMUNICATION METHOD AND COMMUNICATIONS APPARATUS

(71) Applicant: HUAWEI TECHNOLOGIES CO., LTD., Guangdong (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/584,731

(22) Filed: Jan. 26, 2022

(65) Prior Publication Data

US 2022/0149901 A1 May 12, 2022

Related U.S. Application Data

(63) Continuation of application No. PCT/CN2020/102405, filed on Jul. 16, 2020.

(30) Foreign Application Priority Data

Jul. 26, 2019 (CN) .......................... 201910681979.6

(51) Int. Cl.
*H04B 7/0408* (2017.01)
(52) U.S. Cl.
CPC .................. *H04B 7/0408* (2013.01)
(58) Field of Classification Search
CPC .. H04B 7/0408; H04B 7/0608; H04B 7/0695; H04B 7/088; H04B 7/0617; H04B 7/0456; H04B 7/086
See application file for complete search history.

(56) References Cited

U.S. PATENT DOCUMENTS 11,272,429 B2 * 3/2022 Islam ................ H04W 36/0072
2018/0261916 A1 9/2018 Sanford et al.
(Continued)

FOREIGN PATENT DOCUMENTS

| CN | 108092754 A | 5/2018 |
|---|---|---|
| CN | 108288991 A | 7/2018 |
| CN | 109302720 A | 2/2019 |

(Continued)

OTHER PUBLICATIONS

Office Action issued in Chinese Application No. 201910681979.6 dated Apr. 21, 2022, 9 pages.
(Continued)

*Primary Examiner* — Sophia Vlahos
(74) *Attorney, Agent, or Firm* — Fish & Richardson P.C.

(57) ABSTRACT

The present disclosure provides example communication method and apparatuses. One example method includes obtaining first spatial relation parameter information, where the first spatial relation parameter information is spatial relation parameter information of a first target signal, and the first spatial relation parameter information includes a resource index of a first reference signal. First transmission information is determined based on the resource index of the first reference signal, where the first transmission information includes at least one of first antenna panel information or a first spatial characteristic parameter. The first target signal is received or sent based on the first transmission information.

20 Claims, 12 Drawing Sheets

(56) References Cited

U.S. PATENT DOCUMENTS

| | | | | |
|---|---|---|---|---|
| 2021/0336737 A1* | 10/2021 | Li | ...................... | H04W 72/046 |
| 2022/0123818 A1* | 4/2022 | Li | ...................... | H04B 7/0691 |

FOREIGN PATENT DOCUMENTS

| | | | |
|---|---|---|---|
| CN | 109391435 A | | 2/2019 |
| CN | 109417717 A | | 3/2019 |
| CN | 109586872 A | | 4/2019 |
| CN | 109983797 A | | 7/2019 |
| CN | 109997313 A | | 7/2019 |
| CN | 110034853 A | | 7/2019 |
| CN | 110224802 A | | 9/2019 |
| CN | 110463264 A | | 11/2019 |
| EP | 3930366 A1 | | 12/2021 |
| WO | 2017209505 A1 | | 12/2017 |
| WO | WO-2018127181 A1 * | 7/2018 | ........... H04B 17/373 |

OTHER PUBLICATIONS

Extended European Search Report issued in European Application No. 20847219.1 dated Jul. 8, 2022, 7 pages.

ZTE, "Maintenance for beam management," 3GPP TSG RAN WG1 Meeting #94bis, R1-1810214, Chengdu, China, Oct. 8-12, 2018, 11 pages.

Catt, "Consideration on beam management," 3GPP TSG RAN WG1 Meeting 90bis, R1-1717812, Prague, CZ, Oct. 9-13, 2017, 10 pages.

Office Action issued in Chinese Application No. 201910681979.6 dated Sep. 2, 2021, 10 pages (with English translation).

PCT International Search Report and Written Opinion issued in International Application No. PCT/CN2020/102405 dated Sep. 25, 2020, 20 pages (with English translation).

* cited by examiner

COMMUNICATION METHOD AND COMMUNICATIONS APPARATUS

CROSS-REFERENCE TO RELATED APPLICATIONS

This application is a continuation of International Application No. PCT/CN2020/102405, filed on Jul. 16, 2020, which claims priority to Chinese Patent Application No. 201910681979.6, filed on Jul. 26, 2019. The disclosures of the aforementioned applications are hereby incorporated by reference in their entireties.

TECHNICAL FIELD

This application relates to the communications field, and more specifically, to a communication method and a communications apparatus.

BACKGROUND

A terminal device and a network device may determine a transmit beam or a receive beam based on beam training. The transmit beam and the receive beam sometimes may also be referred to as spatial domain filters (spatial filters or spatial domain filters). The transmit beam and the receive beam sometimes correspond to a spatial characteristic parameter. The network device may determine a transmit beam or a receive beam of the network device, and the terminal device may determine a transmit beam or a receive beam of the terminal device. In addition, a plurality of antenna panels may be disposed in the terminal device to receive and send signals. Each antenna panel may correspond to one or more pieces of spatial relation parameter information determined by the terminal device. In other words, the terminal device receives or sends a signal of one or more beams by using one antenna panel. To facilitate scheduling, the network device needs to learn of an identifier of an antenna panel used by the terminal device, to avoid a link interruption caused by a failure of a previous beam training result when the terminal device switches an antenna panel. In addition, the network device may further configure transmit power for an uplink signal based on the identifier of the antenna panel.

In addition, in a beam training process, the network device may send a reference signal to the terminal device, and the terminal device measures the reference signal, so that the terminal device determines a spatial characteristic parameter. Reference signal measurement criteria include reference signal received power (RSRP) measurement and signal to interference plus noise ratio (SINR) measurement. If the terminal device performs two measurements on a same reference signal by using different antenna panels, the terminal device cannot determine a specific measurement, and consequently, cannot determine optimal antenna panel information, where an antenna panel used in the measurement may be used to receive or send another reference signal. Similarly, if the terminal device performs two measurements on a same reference signal by using different spatial characteristic parameters, the terminal device cannot determine a specific measurement, and consequently, cannot determine an optimal spatial characteristic parameter, where a spatial characteristic parameter used in the measurement may be used to receive or send another reference signal.

SUMMARY

This application provides a communication method and a communications apparatus, so that a terminal device or a network device can flexibly determine an optimal spatial characteristic parameter or an optimal antenna panel in a beam training process.

According to a first aspect, a communication method is provided. The communication method includes: obtaining first spatial relation parameter information, where the first spatial relation parameter information is spatial relation parameter information of a first target signal, and the first spatial relation parameter information includes a resource index of a first reference signal; determining first transmission information based on the resource index of the first reference signal, where the first transmission information includes first antenna panel information and/or a first spatial characteristic parameter; and receiving or sending the first target signal based on the first transmission information.

To facilitate scheduling of an uplink signal by a network device, the network device needs to learn of an identifier of an antenna panel of a terminal device. For example, the network device needs to configure transmit power for an uplink signal based on the identifier of the antenna panel. According to the method provided in this application, when a downlink reference signal configured by the network device in a receive beam training process on a terminal side is spatial relation parameter information of an uplink signal, the network device may learn of an identifier of an antenna panel corresponding to the downlink reference signal, and therefore configure transmit power for the uplink signal based on the identifier of the antenna panel. In addition, when measuring a reference signal, the terminal device may separately perform RSRP measurement and SINR measurement on a same reference signal. Due to different standards for the two measurements, obtained optimal beams may also be different. Therefore, this application provides the method. When the network device configures the reference signal for a target reference signal as spatial relation parameter information of the target reference signal, the terminal device may determine a specific measurement standard, where a spatial characteristic parameter and/or antenna panel information obtained based on the measurement standard may be used to receive the target reference signal. In conclusion, this application provides the method, so that the terminal device can obtain an accurate spatial characteristic parameter and/or accurate antenna panel information.

With reference to the first aspect, in some implementations of the first aspect, a resource of the first reference signal belongs to a first reference signal resource set, and reference signal resources in the first reference signal resource set are transmitted by using a same downlink spatial transmission filter.

In this embodiment of this application, that reference signal resources in the first reference signal resource set are transmitted by using a same downlink spatial transmission filter may alternatively be described as that "reference signals in the first reference signal resource set are transmitted by using a same downlink spatial transmission filter", or may be described as that "a repetition field of the reference signal resource set that is configured by using higher layer signaling is "on"". Using a same downlink spatial transmission filter may mean that the terminal device does not assume that different spatial filters are used, that is, at least two reference signals use a same spatial transmission filter. The network device may configure the repetition field of the first reference signal resource set to "on" by using the higher layer signaling (for example, radio resource control (RRC) signaling). The first reference signal resource set may be a resource set for NZP channel state information reference signals (CSI-RSs). The first reference signal resource set may be used for receive beam training on a terminal device side (if there is a beam reciprocity, namely, a beam correspondence in uplink and downlink, the set may be further used for transmit beam training). In other words, in a P3 beam training process, the terminal device may determine, based on the resource index of the reference signal that is indicated by the network device, the spatial characteristic parameter and/or the antenna panel information used to receive or send the first target signal.

With reference to the first aspect, in some implementations of the first aspect, before the obtaining first spatial relation parameter information, the method further includes: obtaining second spatial relation parameter information, where the second spatial relation parameter information is spatial relation parameter information of the first reference signal, and the second spatial relation parameter information includes a resource index of a second reference signal; and the determining first transmission information based on the resource index of the first reference signal includes: determining, based on the resource index of the first reference signal, antenna panel information corresponding to the second reference signal as the first antenna panel information.

In other words, the spatial characteristic parameter corresponding to the first reference signal is a spatial characteristic parameter corresponding to another reference signal, and/or an antenna panel corresponding to the first reference signal is an antenna panel corresponding to the another reference signal; and the another reference signal and the first reference signal satisfy a quasi-colocation relationship. In this embodiment of this application, the network device indicates the first reference signal to the terminal device, so that the terminal device may determine, based on the first reference signal, the second reference signal that satisfies a quasi-colocation relationship with the first reference signal, and determine, based on the spatial characteristic parameter and/or the antenna panel information corresponding to the second reference signal, the spatial characteristic parameter and/or the antenna panel information used to receive or send the first target signal.

With reference to the first aspect, in some implementations of the first aspect, the determining first transmission information based on the resource index of the first reference signal includes: determining antenna panel information corresponding to a third reference signal as the first antenna panel information, where a resource of the third reference signal belongs to a second reference signal resource set, the third reference signal is a reference signal received at second time closest to first time, the first time is time at which the first reference signal is received, the second time is earlier than the first time, and reference signal resources in the second reference signal resource set are transmitted by using different downlink spatial transmission filters.

That reference signal resources in the second reference signal resource set are transmitted by using different downlink spatial transmission filters may alternatively be described as that "reference signals in the second reference signal resource set are transmitted by using different downlink spatial transmission filters", or may be described as that "a repetition field of the reference signal resource set that is configured by using higher layer signaling is "off"". Using different downlink spatial transmission filters may mean that the terminal device does not assume that a same spatial filter is used, that is, at least two reference signals use different spatial transmission filters. The network device may configure the repetition field of the second reference signal resource set to "off" by using the higher layer signaling (for example, RRC signaling). The second reference signal resource set may be a resource set for NZP CSI-RSs. The second reference signal resource set may be used for transmit beam training on a network device side. In other words, it may be agreed in a protocol that the terminal device receives or sends the first target signal by using an antenna panel used by the terminal device in the latest beam training process on the network device side. When the terminal device does not report antenna panel information to the network device, the network device may learn, according to a communication protocol, of an identifier of the antenna panel used by the terminal device.

With reference to the first aspect, in some implementations of the first aspect, the second reference signal resource set includes resources of M reference signals, the M reference signals include the third reference signal, and M is a positive integer; and the method further includes: sending resource indexes of K reference signals and N pieces of antenna panel information, where K is less than or equal to M; K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

This embodiment of this application provides a manner of reporting the antenna panel information. Each of the K reference signals may correspond to one of N antenna panels. That is, one antenna panel may correspond to one or more reference signals. The antenna panel information may be used to indicate an identifier or a virtual identifier of the antenna panel.

With reference to the first aspect, in some implementations of the first aspect, before the obtaining first spatial relation parameter information, the method further includes: sending the first antenna panel information corresponding to the first reference signal.

In this embodiment of this application, in the P3 beam training process, the terminal device may report, to the network device, antenna panel information corresponding to a resource index of a reference signal, so that the network device may indicate the reference signal to the terminal device, and the terminal device may determine a piece of antenna panel information that is used to receive or send the first target signal.

With reference to the first aspect, in some implementations of the first aspect, a first resource occupied by the first reference signal is a resource in a third reference signal resource set, and a second resource occupied by the first reference signal is a resource in a fourth reference signal resource set. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and antenna panel information corresponding to the first reference signal is the first antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters.

In this embodiment of this application, a relationship for a same reference signal is agreed upon by using a protocol, and the same reference signal correspond to a same spatial characteristic parameter and/or same antenna panel information. Therefore, when receiving the resource index of the reference signal that is indicated by the network device, the terminal device can determine the spatial characteristic parameter and/or antenna panel information used to receive or send the first target signal. Therefore, a case in which a self-contradiction occurs and determining cannot be performed is avoided when the terminal device receives or sends the first target signal.

With reference to the first aspect, in some implementations of the first aspect, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The determining first transmission information based on the resource index of the first reference signal includes: determining the first transmission information based on the first spatial relation parameter information, where the first spatial relation parameter information is used to indicate that a transmission state of the first target signal is a first state or a second state, the first state corresponds to the second transmission information, and the second state corresponds to the third transmission information; or determining the first transmission information based on the resource index of the first reference signal and first indication information, where the first indication information is used to indicate antenna port information of the first target signal, a value of the first indication information is a third value or a fourth value, the third value corresponds to the second transmission information, and the fourth value corresponds to the third transmission information.

In this embodiment of this application, the terminal device may determine, based on a quantity of resource indexes of reference signals included in the first spatial characteristic parameter, whether single-stream transmission or multi-stream transmission is performed, and determine whether inter-beam interference exists during transmission of the first target signal, to determine to use a spatial characteristic parameter and/or antenna panel information corresponding to the measurement of the first-type channel quality, or use a spatial characteristic parameter and/or antenna panel information corresponding to the measurement of the second-type channel quality. In addition, the terminal device may determine, based on a quantity of active antenna panels, whether it is a single-user transmission state or a multi-user transmission state, and determine whether there is an interference potential risk, to determine to use the spatial characteristic parameter and/or the antenna panel information corresponding to the measurement of the first-type channel quality, or use the spatial characteristic parameter and/or the antenna panel information corresponding to the measurement of the second-type channel quality. Moreover, the terminal device may determine, based on the antenna port information, whether single-user transmission or multi-user transmission is performed, and determine whether multi-user interference exists during transmission of the first target signal, to determine to use the spatial characteristic parameter and/or the antenna panel information corresponding to the measurement of the first-type channel quality, or use the spatial characteristic parameter and/or the antenna panel information corresponding to the measurement of the second-type channel quality (for example, the terminal device determines, based on information such as a demodulation reference signal (DMRS) port occupied by the first target signal and/or a quantity of DMRS CDM groups with no data that are/is indicated by using an antenna port field in downlink control information (DCI), whether single-user transmission or multi-user transmission is performed). Therefore, a case in which a self-contradiction occurs and determining cannot be performed is avoided when the terminal device receives or sends the first target signal.

With reference to the first aspect, in some implementations of the first aspect, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters. The determining first transmission information based on the resource index of the first reference signal includes: determining the first transmission information based on the resource index of the first reference signal and second indication information, where the second indication information indicates that the first transmission information is the second transmission information or the third transmission information.

In this embodiment of this application, the terminal device may report different measurement results to the network device, and the network device determines a spatial characteristic parameter and/or antenna panel information corresponding to a specific measurement result to be used. The spatial characteristic parameter and/or the antenna panel information used by the terminal device to receive or send the first target signal are/is indicated by using an instruction. Therefore, higher flexibility is provided, and a case in which a self-contradiction occurs and determining cannot be performed is avoided when the terminal device receives or sends the first target signal.

With reference to the first aspect, in some implementations of the first aspect, when the second indication information carries a first bit value, the second indication information indicates that the first transmission information is the second transmission information; or when the second indication information carries a second bit value, the second indication information indicates that the first transmission information is the third transmission information.

In this embodiment of this application, in a manner of transmitting a bit value, low signaling overheads may be used to flexibly indicate a spatial characteristic parameter and/or antenna panel information.

With reference to the first aspect, in some implementations of the first aspect, the first-type channel quality is reference signal received power RSRP, and the second-type channel quality is a signal to interference plus noise ratio SINR.

With reference to the first aspect, in some implementations of the first aspect, there is an interval of S time units between a time domain position of the first resource and a time domain position of the second resource, and S is less than a preset threshold.

In this embodiment of this application, because the terminal device or the network device moves, the terminal device may need to update its spatial characteristic parameter and/or antenna panel information based on channel state information, to obtain better transmission quality. However, a change of the channel state information may be a slowly changing process. Therefore, in a case, when a relationship for a same reference signal is agreed upon in a protocol, that is, it is predetermined that the same reference signal correspond to a same spatial characteristic parameter and/or same antenna panel information, the limitation does not exist at any time but exists only when two resources (the first resource and the second resource) on which a same reference signal is located in a relatively short time interval are received or measured by using a same spatial characteristic parameter and/or same antenna panel information that are/is used as a spatial characteristic parameter and/or antenna panel information used to receive or send the first target signal, to avoid a case in which a self-contradiction occurs and a spatial characteristic parameter and/or antenna panel information to be used cannot be determined when the terminal device receives or sends the first target signal. In another case, when the terminal device determines, based on a quantity of resource indexes of reference signals included in the first spatial relation parameter information and/or an antenna port field in DCI indicating the first target signal or the second indication information, a spatial characteristic parameter and/or antenna panel information obtained by the terminal device by using a same reference signal on the first resource and the second resource in two measurement processes when the terminal device receives or sends the first target signal, only two resources with a relatively short time interval are compared. Otherwise, a channel state may change, and the comparison cannot be performed. According to the method, on the one hand, a success rate of sending and receiving the first target signal can be ensured, and on the other hand, flexibility of message sending and receiving can be ensured.

According to a second aspect, a communication method is provided. The communication method includes: determining first transmission information, where the first transmission information includes first antenna panel information and/or a first spatial characteristic parameter; sending first spatial relation parameter information based on the first transmission information, where the first spatial relation parameter information is spatial relation parameter information of a first target signal, and the first spatial relation parameter information includes a resource index of a first reference signal; and sending or receiving the first target signal based on the first transmission information.

In an example, the first target signal is an uplink signal, and the first transmission information further includes power information of the first target signal. The power information may be determined based on the first antenna panel information.

With reference to the second aspect, in some implementations of the second aspect, a resource of the first reference signal belongs to a first reference signal resource set, and reference signal resources in the first reference signal resource set are transmitted by using a same downlink spatial transmission filter.

With reference to the second aspect, in some implementations of the second aspect, before the determining first transmission information, the method further includes: sending second spatial relation parameter information, where the second spatial relation parameter information is spatial relation parameter information of the first reference signal, and the second spatial relation parameter information includes a resource index of a second reference signal; and the determining first transmission information includes: determining antenna panel information corresponding to the second reference signal as the first antenna panel information.

With reference to the second aspect, in some implementations of the second aspect, the determining first transmission information includes: determining antenna panel information corresponding to a third reference signal as the first antenna panel information, where a resource of the third reference signal belongs to a second reference signal resource set, the third reference signal is a reference signal sent at second time closest to first time, the first time is time at which the first reference signal is received, the second time is earlier than the first time, and reference signal resources in the second reference signal resource set are transmitted by using different downlink spatial transmission filters.

With reference to the second aspect, in some implementations of the second aspect, the second reference signal resource set includes resources of M reference signals, the M reference signals include the third reference signal, and M is a positive integer; and the method further includes: receiving resource indexes of K reference signals and N pieces of antenna panel information, where K is less than or equal to M; K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

With reference to the second aspect, in some implementations of the second aspect, before the determining first transmission information, the method further includes: receiving the first antenna panel information corresponding to the first reference signal.

With reference to the second aspect, in some implementations of the second aspect, a first resource occupied by the first reference signal is a resource in a third reference signal resource set, and a second resource occupied by the first reference signal is a resource in a fourth reference signal resource set. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and antenna panel information corresponding to the first reference signal is the first antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters.

With reference to the second aspect, in some implementations of the second aspect, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The sending first spatial relation parameter information based on the first transmission information includes: sending the first spatial relation parameter information based on the first transmission information, where the first spatial relation parameter information is used to indicate that a transmission state of the first target signal is a first state or a second state, the first state corresponds to the second transmission information, and the second state corresponds to the third transmission information; or sending the first spatial relation parameter information and first indication information based on the first transmission information, where the first indication information is used to indicate antenna port information of the first target signal, a value of the first indication information is a third value or a fourth value, the third value corresponds to the second transmission information, and the fourth value corresponds to the third transmission information.

With reference to the second aspect, in some implementations of the second aspect, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters. The sending first spatial relation parameter information based on the first transmission information includes: sending the first spatial relation parameter information and second indication information based on the first transmission information, where the second indication information indicates that the first transmission information is the second transmission information or the third transmission information.

With reference to the second aspect, in some implementations of the second aspect, when the second indication information carries a first bit value, the second indication information indicates that the first transmission information is the second transmission information; or when the second indication information carries a second bit value, the second indication information indicates that the first transmission information is the third transmission information.

With reference to the second aspect, in some implementations of the second aspect, the first-type channel quality is reference signal received power RSRP, and the second-type channel quality is a signal to interference plus noise ratio SINR.

With reference to the second aspect, in some implementations of the second aspect, there is an interval of S time units between a time domain position of the first resource and a time domain position of the second resource, and S is less than a preset threshold.

According to a third aspect, a terminal device is provided. The terminal device includes: an obtaining module, configured to obtain first spatial relation parameter information, where the first spatial relation parameter information is spatial relation parameter information of a first target signal, and the first spatial relation parameter information includes a resource index of a first reference signal; a processing module, configured to determine first transmission information based on the resource index of the first reference signal, where the first transmission information includes first antenna panel information and/or a first spatial characteristic parameter; and a transceiver module, configured to receive or send the first target signal based on the first transmission information.

With reference to the third aspect, in some implementations of the third aspect, a resource of the first reference signal belongs to a first reference signal resource set, and reference signal resources in the first reference signal resource set are transmitted by using a same downlink spatial transmission filter.

With reference to the third aspect, in some implementations of the third aspect, before the obtaining module obtains the first spatial relation parameter information, the obtaining module is further configured to obtain second spatial relation parameter information, where the second spatial relation parameter information is spatial relation parameter information of the first reference signal, and the second spatial relation parameter information includes a resource index of a second reference signal; and the processing module is specifically configured to determine, based on the resource index of the first reference signal, antenna panel information corresponding to the second reference signal as the first antenna panel information.

With reference to the third aspect, in some implementations of the third aspect, the processing module is specifically configured to determine antenna panel information corresponding to a third reference signal as the first antenna panel information, where a resource of the third reference signal belongs to a second reference signal resource set, the third reference signal is a reference signal received at second time closest to first time, the first time is time at which the first reference signal is received, the second time is earlier than the first time, and reference signal resources in the second reference signal resource set are transmitted by using different downlink spatial transmission filters.

With reference to the third aspect, in some implementations of the third aspect, the second reference signal resource set includes resources of M reference signals, the M reference signals include the third reference signal, and M is a positive integer; and the transceiver module is further configured to send resource indexes of K reference signals and N pieces of antenna panel information, where K is less than or equal to M; K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

With reference to the third aspect, in some implementations of the third aspect, before the obtaining module obtains the first spatial relation parameter information, the transceiver module is further configured to send the first antenna panel information corresponding to the first reference signal.

With reference to the third aspect, in some implementations of the third aspect, a first resource occupied by the first reference signal is a resource in a third reference signal resource set, and a second resource occupied by the first reference signal is a resource in a fourth reference signal resource set. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and antenna panel information corresponding to the first reference signal is the first antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters.

With reference to the third aspect, in some implementations of the third aspect, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/ or third antenna panel information. The processing module is specifically configured to determine the first transmission information based on the first spatial relation parameter information, where the first spatial relation parameter information is used to indicate that a transmission state of the first target signal is a first state or a second state, the first state corresponds to the second transmission information, and the second state corresponds to the third transmission information; or the processing module is specifically configured to determine the first transmission information based on the resource index of the first reference signal and first indication information, where the first indication information is used to indicate antenna port information of the first target signal, a value of the first indication information is a third value or a fourth value, the third value corresponds to the second transmission information, and the fourth value corresponds to the third transmission information.

With reference to the third aspect, in some implementations of the third aspect, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters. The processing module is specifically configured to determine the first transmission information based on the resource index of the first reference signal and second indication information, where the second indication information indicates that the first transmission information is the second transmission information or the third transmission information.

With reference to the third aspect, in some implementations of the third aspect, when the second indication information carries a first bit value, the second indication information indicates that the first transmission information is the second transmission information; or when the second indication information carries a second bit value, the second indication information indicates that the first transmission information is the third transmission information.

With reference to the third aspect, in some implementations of the third aspect, the first-type channel quality is reference signal received power RSRP, and the second-type channel quality is a signal to interference plus noise ratio SINR.

With reference to the third aspect, in some implementations of the third aspect, there is an interval of S time units between a time domain position of the first resource and a time domain position of the second resource, and S is less than a preset threshold.

According to a fourth aspect, a network device is provided. The network device includes: a processing module, configured to determine first transmission information, where the first transmission information includes first antenna panel information and/or a first spatial characteristic parameter; and a transceiver module, configured to send first spatial relation parameter information based on the first transmission information, where the first spatial relation parameter information is spatial relation parameter information of a first target signal, and the first spatial relation parameter information includes a resource index of a first reference signal, where the transceiver module is further configured to send or receive the first target signal based on the first transmission information.

In an example, the first target signal is an uplink signal, and the first transmission information further includes power information of the first target signal.

With reference to the fourth aspect, in some implementations of the fourth aspect, a resource of the first reference signal belongs to a first reference signal resource set, and reference signal resources in the first reference signal resource set are transmitted by using a same downlink spatial transmission filter.

With reference to the fourth aspect, in some implementations of the fourth aspect, before the processing module determines the first transmission information, the transceiver module is further configured to send second spatial relation parameter information, where the second spatial relation parameter information is spatial relation parameter information of the first reference signal, and the second spatial relation parameter information includes a resource index of a second reference signal; and the processing module is specifically configured to determine antenna panel information corresponding to the second reference signal as the first antenna panel information.

With reference to the fourth aspect, in some implementations of the fourth aspect, the processing module is specifically configured to determine antenna panel information corresponding to a third reference signal as the first antenna panel information, where a resource of the third reference signal belongs to a second reference signal resource set, the third reference signal is a reference signal received at second time closest to first time, the first time is time at which the first reference signal is received, the second time is earlier than the first time, and reference signal resources in the second reference signal resource set are transmitted by using different downlink spatial transmission filters.

With reference to the fourth aspect, in some implementations of the fourth aspect, the second reference signal resource set includes resources of M reference signals, the M reference signals include the third reference signal, and M is a positive integer; and the transceiver module further receives resource indexes of K reference signals and N pieces of antenna panel information, where K is less than or equal to M; K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

With reference to the fourth aspect, in some implementations of the fourth aspect, before the processing module determines the first transmission information, the transceiver module is further configured to receive the first antenna panel information corresponding to the first reference signal.

With reference to the fourth aspect, in some implementations of the fourth aspect, a first resource occupied by the first reference signal is a resource in a third reference signal resource set, and a second resource occupied by the first reference signal is a resource in a fourth reference signal resource set. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and antenna panel information corresponding to the first reference signal is the first antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters.

With reference to the fourth aspect, in some implementations of the fourth aspect, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The transceiver module is specifically configured to send the first spatial relation parameter information based on the first transmission information, where the first spatial relation parameter information is used to indicate that a transmission state of the first target signal is a first state or a second state, the first state corresponds to the second transmission information, and the second state corresponds to the third transmission information; or the transceiver module is specifically configured to send the first spatial relation parameter information and first indication information based on the first transmission information, where the first indication information is used to indicate antenna port information of the first target signal, a value of the first indication information is a third value or a fourth value, the third value corresponds to the second transmission information, and the fourth value corresponds to the third transmission information.

With reference to the fourth aspect, in some implementations of the fourth aspect, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The third reference signal resource set is used to measure first-type channel quality, and the fourth reference signal resource set is used to measure second-type channel quality; or reference signal resources in the third reference signal resource set are transmitted by using a same downlink spatial transmission filter, and reference signal resources in the fourth reference signal resource set are transmitted by using different downlink spatial transmission filters. The transceiver module is specifically configured to send the first spatial relation parameter information and second indication information based on the first transmission information, where the second indication information indicates that the first transmission information is the second transmission information or the third transmission information.

With reference to the fourth aspect, in some implementations of the fourth aspect, when the second indication information carries a first bit value, the second indication information indicates that the first transmission information is the second transmission information; or when the second indication information carries a second bit value, the second indication information indicates that the first transmission information is the third transmission information.

With reference to the fourth aspect, in some implementations of the fourth aspect, the first-type channel quality is reference signal received power RSRP, and the second-type channel quality is a signal to interference plus noise ratio SINR.

With reference to the fourth aspect, in some implementations of the fourth aspect, there is an interval of S time units between a time domain position of the first resource and a time domain position of the second resource, and S is less than a preset threshold.

According to a fifth aspect, a communication method is provided. The communication method includes: receiving resource indexes of K reference signals that are sent by a network device; receiving, based on the resource indexes of the K reference signals by using N antenna panels, the K reference signals that are in one-to-one correspondence with the resource indexes of the K reference signals and that are sent by the network device; and sending the resource indexes of the K reference signals and N pieces of antenna panel information in one-to-on correspondence with the N antenna panels to the network device, where K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

According to a sixth aspect, a communication method is provided. The communication method includes: sending resource indexes of K reference signals; and receiving the resource indexes of the K reference signals and N pieces of antenna panel information that are sent by the terminal device, where K and N are positive integers; and when a quantity of active antenna panels is 1, N is 1, and the resource indexes of the K reference signals correspond to the N pieces of antenna panel information; or when a quantity of active antenna panels is greater than 1, N is equal to K, and the resource indexes of the K reference signals are in a one-to-one correspondence with the N pieces of antenna panel information.

According to a seventh aspect, a terminal device is provided. The terminal device includes modules configured to perform the method according to any one of the first aspect or the possible implementations of the first aspect or the fifth aspect.

According to an eighth aspect, a network device is provided. The network device includes modules configured to perform the method according to any one of the second aspect or the possible implementations of the second aspect or the sixth aspect.

According to a ninth aspect, a computer program storage medium is provided. The computer-readable medium stores program code, and when the computer program code is run on a computer, the computer is enabled to execute instructions of the method according to any one of the first aspect and the second aspect or the possible implementations of the first aspect and the second aspect, the fifth aspect, or the sixth aspect.

According to a tenth aspect, a computer program product including instructions is provided. When the computer program product runs on a computer, the computer is enabled to perform the method according to any one of the first aspect and the second aspect or the possible implementations of the first aspect and the second aspect, the fifth aspect, or the sixth aspect.

According to an eleventh aspect, a communications apparatus is provided. The communications apparatus is configured to perform the method any one of the first aspect and the second aspect or the possible implementations of the first aspect and the second aspect, the fifth aspect, or the sixth aspect.

According to a twelfth aspect, a communications apparatus is provided. The apparatus includes a processor and a memory. The processor is coupled to the memory, the memory is configured to store a computer program, and the processor is configured to execute the computer program stored in the memory, to enable the communications apparatus to perform the method according to any one of the first aspect and the second aspect or the possible implementations of the first aspect and the second aspect, the fifth aspect, or the sixth aspect.

According to a thirteenth aspect, a communications apparatus is provided. The apparatus includes a processor, a memory, and a transceiver. The memory is configured to store a computer program, and the processor is configured to execute the computer program stored in the memory, to enable the apparatus to perform the method according to any one of the first aspect and the second aspect or the possible implementations of the first aspect and the second aspect, the fifth aspect, or the sixth aspect.

According to a fourteenth aspect, a communications apparatus is provided. The communications apparatus includes at least one processor and a communications interface. The communications interface is used by the communications apparatus to exchange information with another communications apparatus, and when program instructions are executed in the at least one processor, the communications apparatus is enabled to implement the method according to any one of the first aspect and the second aspect or the possible implementations of the first aspect and the second aspect, the fifth aspect, or the sixth aspect.

According to a fifteenth aspect, a processor is provided. The processor includes at least one circuit, configured to perform the method according to any one of the first aspect and the second aspect or the possible implementations of the first aspect and the second aspect, the fifth aspect, or the sixth aspect.

According to a sixteenth aspect, a chip system is provided. The chip system includes at least one processor, and when program instructions are executed in the at least one processor, the chip system is enabled to implement the method according to any one of the first aspect and the second aspect or the possible implementations of the first aspect and the second aspect, the fifth aspect, or the sixth aspect.

According to a seventeenth aspect, this application provides a communications system. The communications system includes the foregoing terminal device and network device.

DESCRIPTION OF EMBODIMENTS

Figure 1:
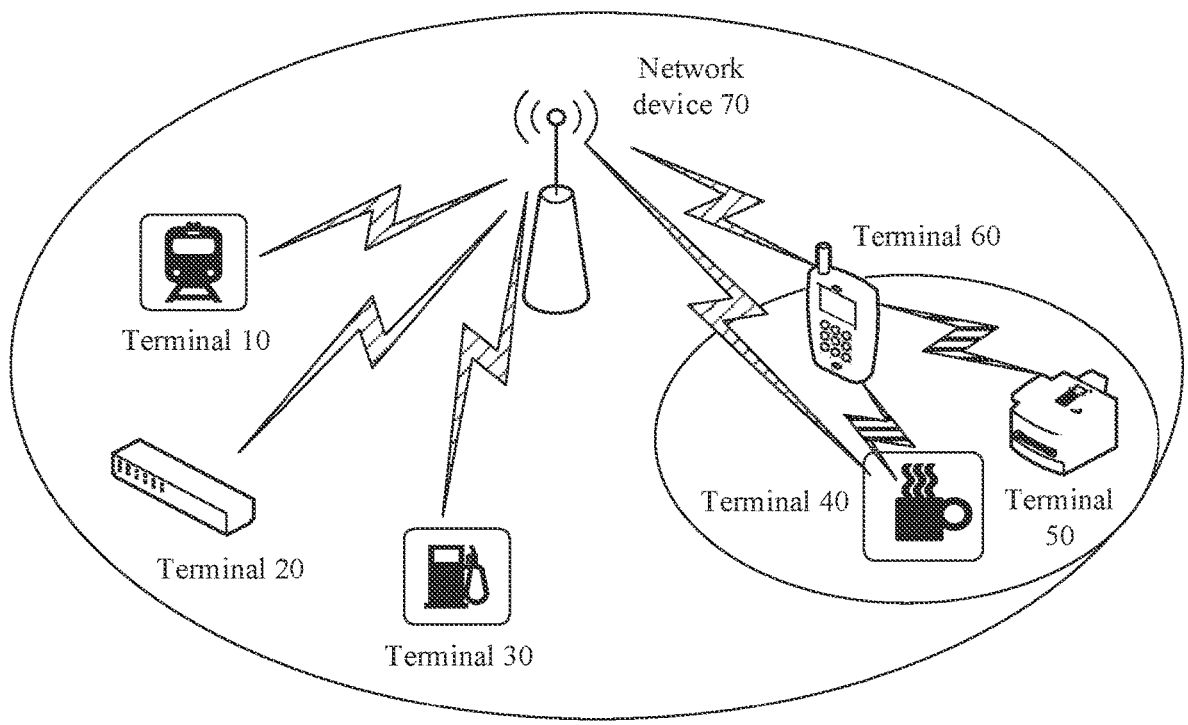
FIG. 1 is a schematic diagram of a communication scenario according to an embodiment of this application.

The following describes technical solutions in this application with reference to the accompanying drawings.

The following describes terms in this application in detail.

Beam:

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Optionally, a plurality of beams having a same or similar communication feature may be considered as one beam. A transmit beam may refer to distribution of signal strength formed in different directions in space after a signal is transmitted through an antenna, and a receive beam may refer to distribution of signal strength, in different directions in space, of a radio signal received from an antenna. The beam may correspond to a spatial domain filter (spatial filter or spatial domain filter), a spatial domain transmission filter, a spatial characteristic parameter, and the like in a protocol. Beams may be classified into a transmit beam and a receive beam of a network device, and a transmit beam and a receive beam of a terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information of the terminal device. The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. A receive beam on a terminal device side and a transmit beam on a network device side each may be a downlink spatial filter, and a transmit beam on the terminal device side and a receive beam on the network device side each may be an uplink spatial filter.

The beam may correspond to a time resource, a space resource, and/or a frequency domain resource. The beam may further correspond to a reference signal resource (for example, a reference signal resource for beamforming) or beamforming information. The beam may further correspond to information associated with a reference signal resource of the network device. The beam may further correspond to a spatial domain filter (spatial filter or spatial domain filter) or a spatial domain transmission filter. A reference signal may be a channel state information reference signal (CSI-RS), a synchronization signal and physical broadcast channel block (synchronous signal/PBCH block, SSB), a demodulation reference signal (DMRS), a phase tracking signal (PTRS), a tracking signal (TRS), a sounding reference signal (SRS), or the like. The information associated with the reference signal resource may be an identifier of the reference signal resource, quasi-colocation (QCL) information, or the like. The identifier of the reference signal resource corresponds to a transmit-receive beam pair that is established during measurement of the reference signal resource. The terminal may infer beam information by using the identifier of the reference signal resource.

Beam Indication Information:

The beam indication information is used to indicate a beam used for transmission, including a transmit beam and/or a receive beam. The beam indication information includes at least one of a beam number, a beam management resource number, an uplink signal resource number, a downlink signal resource number, an absolute index of the beam, a relative index of the beam, a logical index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of a transmit weight corresponding to the beam, an index of a weight matrix corresponding to the beam, an index of a weight vector corresponding to the beam, an index of a receive weight corresponding to the beam, a reception codebook corresponding to the beam, a transmit codebook corresponding to the beam, an index of a reception codebook corresponding to the beam, and an index of a transmit codebook corresponding to the beam, where the downlink signal includes any one of a synchronization signal, a broadcast channel, a broadcast signal demodulation signal, a channel state information downlink signal (channel state information reference signal, CSI-RS), a cell-specific reference signal (CS-RS), a user equipment-specific reference signal, a downlink control channel demodulation reference signal, a downlink data channel demodulation reference signal, or a downlink phase noise tracking signal. An uplink signal includes any one of an uplink random access sequence, an uplink sounding reference signal, an uplink control channel demodulation reference signal, an uplink data channel demodulation reference signal, or an uplink phase noise tracking signal.

Spatial Characteristic Parameter:

The spatial characteristic parameter may also be referred to as a spatial relation characteristic. The spatial characteristic parameter includes one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, a spatial channel correlation, transmit beamforming of the network device, receive beamforming of the network device, an average channel gain, an average channel delay (average delay), a delay spread, a Doppler spread, a Doppler shift, a spatial receive parameter (spatial Rx parameters), and the like. These spatial characteristic parameters describe a characteristic of a spatial channel between an antenna port for a source reference signal and an antenna port for a target reference signal, and help the terminal device complete a transmit-side (or receive-side) beamforming or sending (or receiving) processing process based on spatial relation parameter information.

Spatial Relation Parameter Information:

The spatial relation parameter information may be quasi-colocation (QCL) information, or may be spatial relation information. Generally, the QCL information is used to indicate spatial relation parameter information of a downlink signal (for example, a PDCCH/PDSCH/CSI-RS/DMRS/TRS), and the spatial relation information is used to indicate spatial relation parameter information of an uplink signal (for example, a PUCCH/PUSCH/SRS/DMRS). For example, the terminal device may receive a target signal based on receive beam information that is of the source reference signal and that is indicated by using the QCL information. For another example, the terminal device may send a target signal based on transmit beam information that is of the source reference signal and that is indicated by using the spatial relation information. The spatial relation parameter information may be equivalent to a spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like.

QCL Information:

The QCL information may be used to indicate a QCL relationship between two reference signals. The target reference signal may be usually a demodulation reference signal (DMRS), a channel state information reference signal (CSI-RS), or the like. A referenced reference signal or the source reference signal may be usually a CSI-RS, a synchronization signal and physical broadcast channel block (synchronous signal/PBCH block, SSB), a sounding reference signal (SRS), or the like. It should be understood that, a tracking reference signal (TRS) is also a type of CSI-RS. It should be understood that, the target reference signal may be usually a downlink signal. Spatial characteristic parameters of two reference signals that satisfy a QCL relationship are the same or similar, so that a spatial characteristic parameter of the target reference signal may be inferred based on a resource identifier of the source reference signal. Four types of QCL are defined in an existing standard, and the network device may simultaneously configure one or more types of QCL for the terminal device. QCL-Type A includes a Doppler shift, a Doppler spread, an average delay, and a delay spread. QCL-Type B includes a Doppler shift and a Doppler spread. QCL-Type C includes an average delay and a Doppler shift. QCL-Type C includes a spatial relation parameter (spatial Rx parameter).

The spatial relation information may be used to indicate a spatial transmit parameter relationship between two reference signals. The target reference signal may be usually a DMRS, an SRS, or the like. The referenced reference signal or the source reference signal may be usually a CSI-RS, an SRS, an SSB, or the like. It should be understood that, the target reference signal may be usually an uplink signal. Spatial characteristic parameters of two reference signals that satisfy a spatial relation are the same or similar, so that the spatial characteristic parameter of the target reference signal may be inferred based on the resource identifier of the source reference signal.

Antenna Port:

The antenna port may also be referred to as a port for short. The antenna port is a transmit antenna identified by a receive end device or a transmit antenna that can be distinguished in space. One antenna port may be configured for each virtual antenna, each virtual antenna may be a weighted combination of a plurality of physical antennas, and each antenna port may correspond to one reference signal port.

Antenna Panel:

The antenna panel is one or more physical antennas on the terminal device. When configuring a resource used to send an uplink signal for the terminal device, the network device may indicate, in an explicit or implicit manner, an antenna panel (panel ID) corresponding to the uplink signal, and the terminal device may send the uplink signal by using the antenna panel.

At least one antenna panel may be disposed on each of the network device and the terminal device. One antenna panel may correspond to one set of independent transmit links, for example, including a power amplifier and a transmit channel. One antenna panel may further correspond to one set of independent receive links, for example, including a power amplifier and a receive channel. An antenna panel used to send a signal and an antenna panel used to receive a signal may be a same antenna panel, or may be different antenna panels. One antenna panel may generate a plurality of analog beams by using a phase shifter. However, due to a working principle of the phase shifter, analog beams generated by a same antenna panel cannot be used at the same time, that is, a plurality of analog beams generated by one antenna panel can only be time division multiplexed, and independent analog beams generated by a plurality of antenna panels may be used at the same time, that is, a plurality of analog beams generated by the plurality of antenna panels can be frequency division multiplexed. A plurality of physical antennas in one antenna panel may further generate digital beams (for example, precoders or precoding matrices). The digital beams may be frequency division multiplexed, space division multiplexed, or the like. In other words, an antenna panel including a plurality of antennas may support multi-layer data transmission. A plurality of layers of data may be transmitted by using one orthogonal precoding matrix. The plurality of layers of data may be further superposed on analog beams at a high frequency for transmission (that is, the data is transmitted in a hybrid manner by using a digital beam and an analog beam).

It should be noted that, with continuous development of technologies, the terms in the embodiments of this application may change, but all of them shall fall within the protection scope of this application.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, a new radio (NR) system, or another communications system.

The terminal device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

The network device in the embodiments of this application may be a device configured to communicate with the terminal. The network device may be a base transceiver station (BTS) in a global system for mobile communications (GSM) or code division multiple access (CDMA), may be a NodeB (NB) in a wideband code division multiple access (WCDMA) system, may be an evolved NodeB (eNB, or eNodeB) in an LTE system, or may be a radio controller in a cloud radio access network (CRAN) scenario. Alternatively, the network device may be a relay station, an access point, a vehicle-mounted device, a wearable device, a network device in a 5G network or a network device in a future evolved PLMN network, or one or a group of antenna panels (including a plurality of antenna panels) of a base station in a 5G system. Alternatively, the network device may be a network node that constitutes a gNB or a transmission point, for example, a baseband unit (BBU) or a distributed unit (DU). This is not limited in the embodiments of this application.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that, the network device may be a device including one or more of a CU node, a DU node, or an AAU node. In addition, the CU may be classified into a network device in an access network (radio access network, RAN), or may be classified into a network device in a core network (CN). This is not limited in this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

It should be noted that the embodiments of this application may be applied to a communications system including one or more network devices, or may be applied to a communications system including one or more terminals. This is not limited in this application.

It should be understood that the communications system may include one or more network devices. One network device may send data or control signaling to one or more terminals. Alternatively, a plurality of network devices may simultaneously send data or control signaling to one or more terminals.

Figure 2:
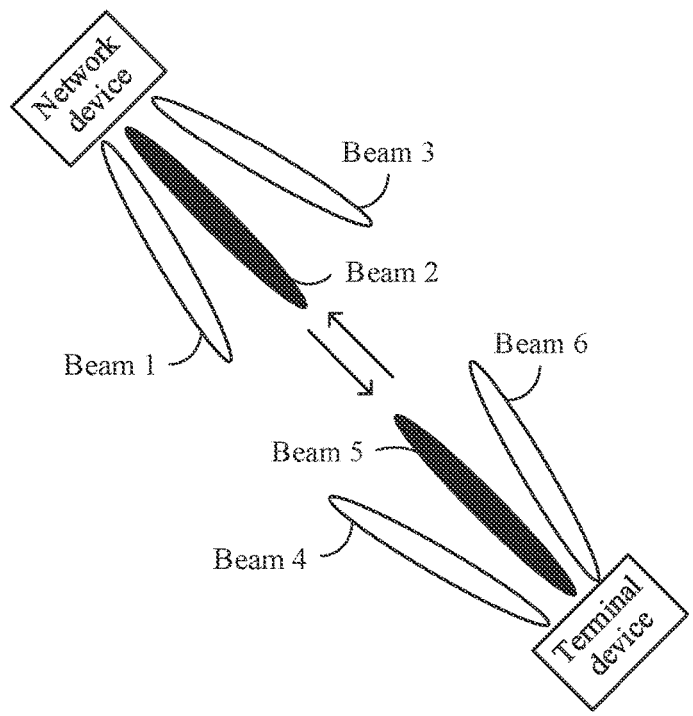
FIG. 2 is a schematic diagram of beam training.

FIG. 2 is a schematic diagram of a beam training method in a conventional solution. The beam training method shown in FIG. 2 sometimes is also referred to as a P1 beam training process. The following describes the P1 beam training process with reference to FIG. 2.

201: A terminal device receives, by using a plurality of receive beams and/or a plurality of antenna panels, N reference signals sent by a network device, where the N reference signals occupy a resource in a reference signal resource set, reference signal resources in the reference signal resource set are transmitted by using different downlink spatial transmission filters, and N is an integer greater than 1.

Correspondingly, the network device sends the N reference signals to the terminal device by using a plurality of transmit beams.

A plurality of reference signal resources in the reference signal resource set may correspond to different downlink spatial transmission filters. That "reference signal resources in the reference signal resource set are transmitted by using different downlink spatial transmission filters" may alternatively be described as that "N reference signals in the reference signal resource set are transmitted by using different downlink spatial transmission filters", or may be described as that "a repetition field of the reference signal resource set that is configured by using higher layer signaling is "off"". Using different downlink spatial transmission filters may mean that the terminal device does not assume that a same spatial filter is used, that is, at least two reference signals use different spatial transmission filters. The network device may configure the repetition field of the reference signal resource set to "off" by using the higher layer signaling (for example, RRC signaling). The reference signal resource set may be a resource set for NZP CSI-RSs. The reference signal resource set may be used for transmit beam training on a network device side.

An ellipse shown in FIG. 2 is used to indicate a receive beam of the terminal device or a transmit beam of the network device. Alternatively, an ellipse shown in FIG. 2 is used to indicate a transmit beam of the terminal device or a receive beam of the network device. The following uses the receive beam of the terminal device and the transmit beam of the network device as an example for description.

For example, the network device sends three reference signals by using a beam 1, a beam 2, and a beam 3 in FIG. 2, that is, N=3. The network device sends a reference signal 1 by using the beam 1, sends a reference signal 2 by using the beam 2, and sends a reference signal 3 by using the beam 3. Correspondingly, the terminal device receives the three reference signals by using a beam 4, a beam 5, and a beam 6. For example, the terminal device receives the reference signal 1, the reference signal 2, and the reference signal 3 by using an antenna panel 1 and the beam 4, receives the reference signal 1, the reference signal 2, and the reference signal 3 by using an antenna panel 2 and the beam 5, and receives the reference signal 1, the reference signal 2, and the reference signal 3 by using an antenna panel 3 and the beam 6.

202: The terminal device measures the N reference signals, and determines a first spatial characteristic parameter and a first antenna panel identifier of the terminal device, where the first spatial characteristic parameter corresponds to a target reference signal in the N reference signals, and the first antenna panel identifier corresponds to the target reference signal.

The measurement of the N reference signals may be reference signal received power (RSRP) measurement separately performed on the N reference signals, or signal to interference plus noise ratio (SINR) measurement separately performed on the N reference signals. The first spatial characteristic parameter may correspond to an optimal receive beam of the terminal device. For example, a beam corresponding to a reference signal with a highest RSRP value is determined as the optimal receive beam. That is, based on a measurement result, the terminal device selects an optimal receive beam from a plurality of receive beams, and selects an optimal antenna panel from a plurality of antenna panels.

For example, based on the signal measurement result, the terminal device may determine that first spatial relation parameter information corresponds to the receive beam 5 and the first antenna panel identifier is 2. In other words, the terminal device may determine that the optimal receive beam of the terminal device is the beam 5 and the optimal antenna panel is the antenna panel 2.

203: The terminal device sends indication information and the first antenna panel identifier to the network device, where the indication information is used to indicate the target reference signal.

Correspondingly, the network device receives the indication information sent by the terminal device, and determines the transmit beam of the network device based on the indication information, where the transmit beam of the network device corresponds to the target reference signal.

The indication information may include a resource index of the target reference signal or a measurement result of the target reference signal. Because the target reference signal corresponds to the transmit beam of the network device, an optimal transmit beam of the network device may correspond to the optimal receive beam of the terminal device, that is, one beam pair may be determined.

For example, the indication information is a resource index of the reference signal 2. After receiving the indication information, the network device may determine that the optimal transmit beam of the network device is the beam 2.

The terminal device reports the antenna panel identifier to the network device, to avoid a link interruption caused by a failure of a previous beam training result when the terminal device switches an antenna panel. In addition, the network device may further configure transmit power for an uplink signal based on the identifier of the antenna panel.

In this way, the network device may determine the optimal transmit beam of the network device, and the terminal device may determine the optimal receive beam and/or antenna panel of the terminal device. A black ellipse shown in FIG. 2 is used to indicate the optimal transmit beam of the network device and the optimal receive beam of the terminal device. If there is a beam reciprocity (beam correspondence), based on the beam reciprocity, the network device may determine an optimal receive beam of the network device, and the terminal device may determine an optimal transmit beam of the terminal device.

Figure 3:
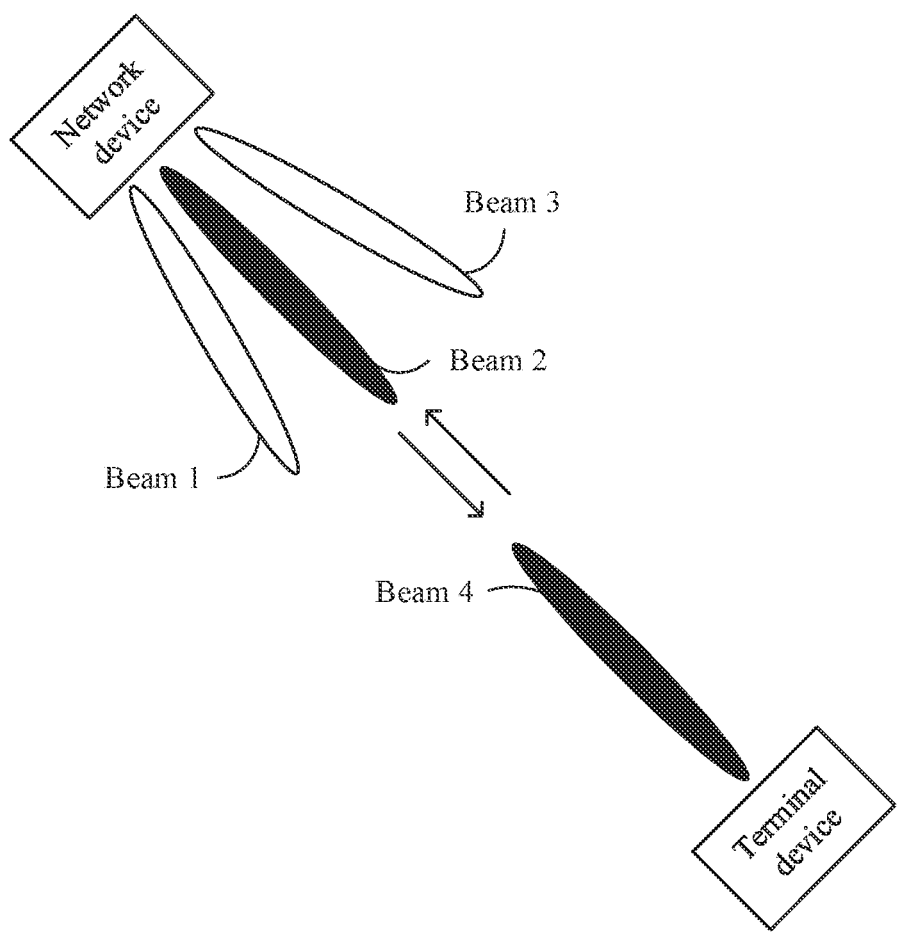
FIG. 3 is a schematic diagram of beam training.

FIG. 3 is a schematic diagram of a beam training method in a conventional solution. The beam training method shown in FIG. 3 sometimes is also referred to as a P2 beam training process. The following describes the P2 beam training process with reference to FIG. 3.

301: A terminal device receives, by using a target receive beam and a target antenna panel, N reference signals sent by a network device, where the N reference signals occupy a resource in a reference signal resource set, reference signal resources in the reference signal resource set are transmitted by using different downlink spatial transmission filters, and N is an integer greater than 1.

Correspondingly, the network device sends the N reference signals to the terminal device by using a plurality of transmit beams.

A plurality of reference signal resources in the reference signal resource set may correspond to different downlink spatial transmission filters. That "reference signal resources in the reference signal resource set are transmitted by using different downlink spatial transmission filters" may alternatively be described as that "N reference signals in the reference signal resource set are transmitted by using different downlink spatial transmission filters", or may be described as that "a repetition field of the reference signal resource set that is configured by using higher layer signaling is "off"". Using different downlink spatial transmission filters may mean that the terminal device does not assume that a same spatial filter is used, that is, at least two reference signals use different spatial transmission filters. The network device may configure the repetition field of the reference signal resource set to "off" by using the higher layer signaling (for example, RRC signaling). The reference signal resource set may be a resource set for NZP CSI-RSs. The reference signal resource set may be used for transmit beam training on a network device side.

An ellipse shown in FIG. 3 is used to indicate a receive beam of the terminal device or a transmit beam of the network device. Alternatively, an ellipse shown in FIG. 3 is used to indicate a transmit beam of the terminal device or a receive beam of the network device. The following uses the receive beam of the terminal device and the transmit beam of the network device as an example for description.

For example, the network device sends three reference signals by using a beam 1, a beam 2, and a beam 3 in FIG. 3, that is, N=3. The network device sends a reference signal 1 by using the beam 1, sends a reference signal 2 by using the beam 2, and sends a reference signal 3 by using the beam 3. Correspondingly, the terminal device receives the three reference signals by using a beam 4. For example, the terminal device receives the reference signal 1, the reference signal 2, and the reference signal 3 by using an antenna panel 1 and the beam 4.

302: The terminal device measures the N reference signals, and determines a second antenna panel identifier of the terminal device, where the second antenna panel identifier corresponds to a target reference signal in the N reference signals.

The measurement of the N reference signals may be RSRP measurement separately performed on the N reference signals, or SINR measurement separately performed on the N reference signals. A transmit beam corresponding to the target reference signal is an optimal transmit beam of the network device. For example, a beam corresponding to a reference signal with a highest RSRP value is determined as the optimal transmit beam. That is, the terminal device selects an optimal reference signal from the N reference signals based on a measurement result.

For example, the terminal device measures the three reference signals, and determines the reference signal 2 and determines that an antenna panel corresponding to the reference signal received by the terminal device is 2. In this case, the optimal transmit beam of the network device is the beam 2, and a receive antenna panel corresponding to the optimal transmit beam is the antenna panel 2.

303: The terminal device sends indication information and an identifier of the target antenna panel to the network device, where the indication information is used to indicate the target reference signal.

Correspondingly, the network device receives the indication information sent by the terminal device, and determines the transmit beam of the network device based on the indication information, where the transmit beam of the network device corresponds to the target reference signal.

The indication information may include an index of the target reference signal, and/or indicate a measurement result of the target reference signal. Because the target reference signal corresponds to the transmit beam of the network device, the optimal transmit beam of the network device may correspond to an optimal receive beam of the terminal device, that is, one beam pair may be determined.

For example, the indication information is a resource index of the reference signal 2. After receiving the indication information, the network device may determine that the optimal transmit beam of the network device is the beam 2.

The terminal device reports the antenna panel identifier to the network device, to avoid a link interruption caused by a failure of a previous beam training result when the terminal device switches an antenna panel. In addition, the network device may further configure transmit power for an uplink signal based on the identifier of the antenna panel.

In this way, the network device may determine the optimal transmit beam of the network device. A black ellipse shown in FIG. 3 is used to indicate the optimal transmit beam of the network device and the target receive beam of the terminal device. If there is a beam reciprocity (beam correspondence), based on the beam reciprocity, the network device may determine an optimal receive beam of the network device.

Figure 4:
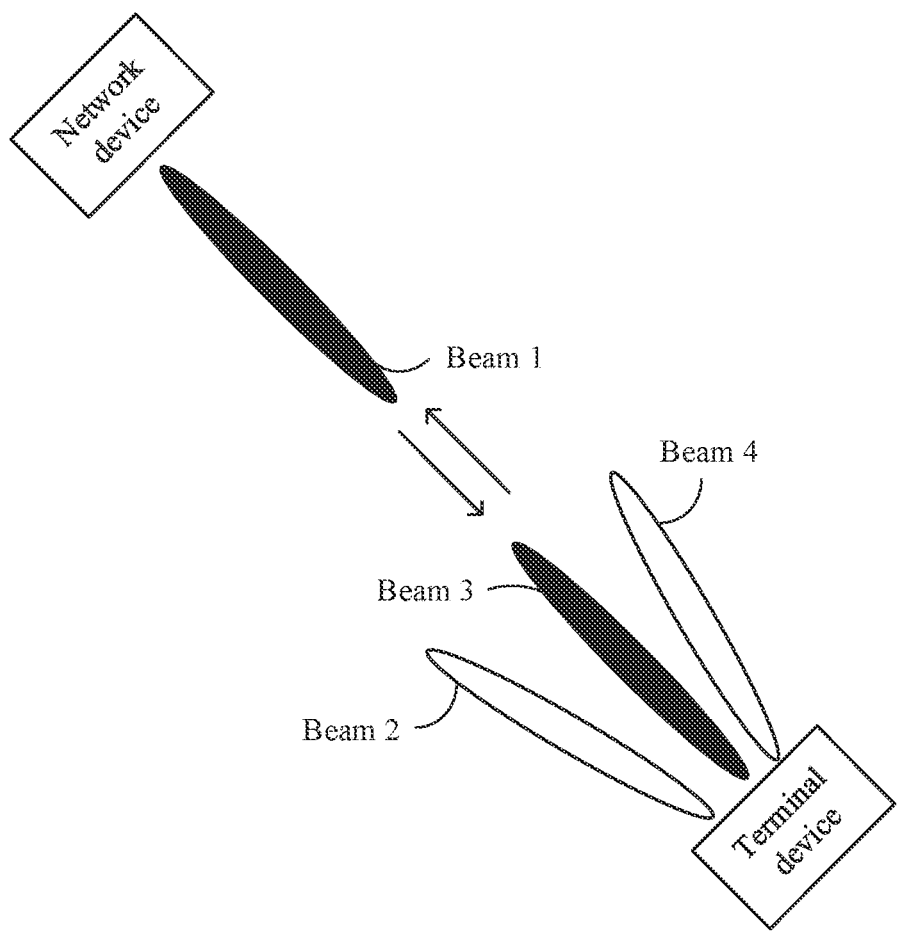
FIG. 4 is a schematic diagram of beam training.

FIG. 4 is a schematic diagram of a beam training method in a conventional solution. The beam training method shown in FIG. 4 sometimes is also referred to as a P3 beam training process. The following describes the P3 beam training process with reference to FIG. 4.

401: A terminal device receives, by using a plurality of receive beams and/or a plurality of antenna panels, N reference signals sent by a network device, where the N reference signals occupy a resource in a reference signal resource set, reference signal resources in the reference signal resource set are transmitted by using a same downlink spatial transmission filter, and N is an integer greater than 1.

Correspondingly, the network device sends the N reference signals to the terminal device by using a target transmit beam.

The reference signal resources in the reference signal resource set correspond to the same downlink spatial transmission filter. That "reference signal resources in the reference signal resource set are transmitted by using a same downlink spatial transmission filter" may alternatively be described as that "N reference signals in the reference signal resource set are transmitted by using a same downlink spatial transmission filter", or may be described as that "a repetition field of the reference signal resource set that is configured by using higher layer signaling is 'on'". The network device may configure the repetition field of the reference signal resource set to "on" by using the higher layer signaling (for example, RRC signaling). The reference signal resource set may be a resource set for NZP CSI-RSs. The reference signal resource set may be used for receive beam training on a terminal device side.

An ellipse shown in FIG. 4 is used to indicate a receive beam of the terminal device or a transmit beam of the network device. Alternatively, an ellipse shown in FIG. 4 is used to indicate a transmit beam of the terminal device or a receive beam of the network device. The following uses the receive beam of the terminal device and the transmit beam of the network device as an example for description.

For example, the network device sends three reference signals, namely, a reference signal 1, a reference signal 2, and a reference signal 3 by using a beam 1 in FIG. 4, that is, N=3. Correspondingly, the terminal device separately receives the three reference signals by using a beam 2, a beam 3, and a beam 4. For example, the terminal device receives the reference signal 1 by using an antenna panel 1 and the beam 2, the terminal device receives the reference signal 2 by using an antenna panel 2 and the beam 3, and receives the reference signal 3 by using the antenna panel 2 and the beam 4.

402: The terminal device measures the N reference signals, and determines a third spatial characteristic parameter and/or a third antenna panel identifier, where the third spatial characteristic parameter corresponds to a target reference signal in the N reference signals, and the third antenna panel identifier corresponds to the target reference signal.

The measurement of the N reference signals may be RSRP measurement separately performed on the N reference signals, or SINR measurement separately performed on the N reference signals. The third spatial characteristic parameter may be an optimal receive beam of the terminal device, and the third antenna panel identifier corresponds to an optimal antenna panel. For example, a beam corresponding to a reference signal with a highest RSRP value is determined as the optimal receive beam. That is, based on a measurement result, the terminal device selects an optimal receive beam from a plurality of receive beams, and selects an optimal antenna panel from a plurality of antenna panels.

For example, the terminal device measures the three reference signals, and may determine that the optimal receive beam is the beam 3 and the optimal antenna panel is the antenna panel 2.

Therefore, the target transmit beam of the network device corresponds to the receive beam of the terminal device, that is, one beam pair may be determined.

In this way, the terminal device may determine the optimal receive beam of the terminal device. A black ellipse shown in FIG. 4 is used to indicate the target transmit beam of the network device and the optimal receive beam of the terminal device. If there is a beam reciprocity (beam correspondence), based on the beam reciprocity, the terminal device may determine an optimal transmit beam of the terminal device.

A common beam training process includes one or more of the P1 beam training process, the P2 beam training process, and the P3 beam training process. In the P1 beam training process, a coarse-grained beam on the network device side and a coarse-grained beam on the terminal device side may be selected. In the P2 beam training process, a fine-grained beam on the network device side may be selected. In the P3 beam training process, a fine-grained beam on the terminal device side may be selected.

It should be understood that the foregoing beam training processes in FIG. 2, FIG. 3, and FIG. 4 are merely examples. The resource index of the reference signal that is reported by the terminal device may not correspond to the optimal transmit beam of the network device, but may correspond to a suboptimal, better, worse, or worst transmit beam of the network device. The worst beam may be, for example, a beam with stronger interference.

However, to facilitate scheduling of an uplink signal by the network device, the network device needs to learn of an identifier of an antenna panel of the terminal device. For example, the network device needs to configure transmit power for an uplink signal based on the identifier of the antenna panel. In the receive beam training process on the terminal side that is shown in FIG. 4, because the terminal device may not send any information, for example, an antenna panel identifier, to the network device, when a downlink reference signal configured by the network device in the receive beam training process on the terminal side is spatial relation parameter information of an uplink signal, the network device cannot learn of an identifier of an antenna panel corresponding to the downlink reference signal, and therefore cannot configure transmit power for the uplink signal based on the identifier of the antenna panel. In addition, when measuring a reference signal, the terminal device may separately perform RSRP measurement and SINR measurement on a same reference signal. Due to different standards for the two measurements, obtained optimal beams may also be different. Therefore, when the network device configures the reference signal for a target reference signal as spatial relation parameter information of the target reference signal, the terminal device cannot determine a measurement standard, where a spatial characteristic parameter obtained based on the measurement standard may be used to receive the target reference signal. In view of this, this application provides a method, so that the terminal device can obtain an accurate spatial characteristic parameter and/or accurate antenna panel information when spatial relation parameter information and/or antenna panel information are/is indicated.

Figure 5:
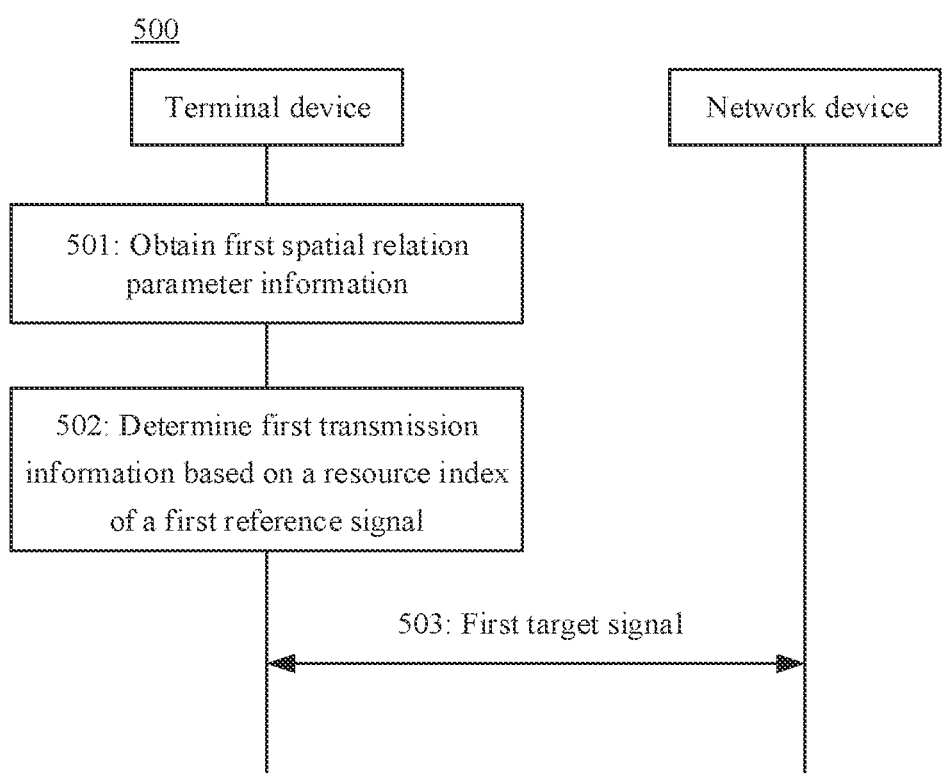
FIG. 5 is a schematic flowchart of a communication method according to an embodiment of this application.

FIG. 5 is a schematic flowchart of a communication method according to an embodiment of this application.

501: A terminal device obtains first spatial relation parameter information, where the first spatial relation parameter information is spatial relation parameter information of a first target signal, and the first spatial relation parameter information includes a resource index of a first reference signal.

In this application, "obtaining" may be replaced with an expression such as "receiving", "determining", or "obtaining".

For example, the terminal device may receive signaling sent by another communications device (for example, a network device). The signaling (for example, one or more of RRC signaling, MAC-CE signaling, or DCI signaling) carries the spatial relation parameter information of the first target signal.

For another example, the terminal device may use last obtained spatial relation parameter information of a signal as the spatial relation parameter information of the first target signal. For example, a signal A is a downlink reference signal, the first target signal is transmitted on a physical uplink control channel (PUCCH), and after the signal A is sent, the terminal device receives no downlink reference signal. The terminal device may use spatial relation parameter information of the signal A as the spatial relation parameter information of the first target signal.

The first target signal may be a reference signal, or may be service data, or may be an uplink channel. For example, the reference signal may be a channel state information reference signal (CSI-RS), a synchronization signal and physical broadcast channel block (synchronous signal/PBCH block, SSB), a demodulation reference signal (DMRS), a phase tracking signal (phase tracking reference signal, PTRS), a tracking signal (tracking reference signal, TRS), or an SRS. The service data is usually transmitted on a physical uplink shared channel (PUSCH) or a PDSCH. For example, the uplink channel may be a PUCCH or a PUSCH. The DMRS may be a demodulation reference signal of a PUCCH, or may be a demodulation reference signal of a PUSCH, or may be a demodulation reference signal of a PDCCH, or may be a demodulation reference signal of a PDSCH.

For example, the first spatial relation parameter information may be quasi-colocation (QCL) information of the first target signal, or spatial relation information of the first target signal. The first spatial relation parameter information includes a resource index of a referenced reference signal (or referred to as a resource index of a source reference signal, and collectively referred to as the resource index of the source reference signal below). The first spatial relation parameter information is configured for a target signal. In this application, the target signal is the first target signal, and the source reference signal is the first reference signal.

In an example, the first target signal is a downlink signal, and the first spatial relation parameter information is QCL information of the first target signal. If the QCL information of the first target signal includes the resource index of the first reference signal, the first reference signal is the source reference signal. The first target signal and the first reference signal satisfy a QCL relationship. For example, the first target signal may be a CSI-RS, an SS/PBCH block, a DMRS of a PDSCH, a DMRS of a PDCCH, a PTRS, a TRS, a PDSCH, or a PDCCH.

In an example, the first target signal is an uplink signal, and the first spatial relation parameter information is spatial relation information of the first target signal. If the spatial relation information of the first target signal includes the resource index of the first reference signal, the first reference signal is the source reference signal. The first target signal and the first reference signal use a same, approximate, or similar spatial characteristic parameter or beam (which is referred to as that a spatial relation is satisfied for short). For example, the first target signal may be a CSI-RS, a DMRS of a PUSCH, a DMRS of a PUCCH, a PUSCH, a PUCCH, or an SRS.

Therefore, the terminal device may determine that the first reference signal is a reference signal that satisfies a QCL relationship or a spatial relation with the first target signal.

The resource index of the first reference signal is an identifier of a resource in which the first reference signal is located. The terminal device receives the resource index sent by the network device, and may detect the first reference signal on a corresponding resource block.

In addition, a resource index of a reference signal may be further used to identify the reference signal. Moreover, in a process in which the terminal device determines a spatial characteristic parameter and/or an antenna panel, the terminal device measures a plurality of reference signals to select a better reference signal, where the better reference signal corresponds to the spatial characteristic parameter and/or the antenna panel. Therefore, the resource index of the reference signal may be associated with the spatial characteristic parameter and/or the antenna panel.

502: The terminal device determines first transmission information based on the resource index of the first reference signal, where the first transmission information includes first antenna panel information and/or a first spatial characteristic parameter.

In other words, the terminal device may determine, based on a spatial characteristic parameter corresponding to the first reference signal, a spatial characteristic parameter corresponding to the first target signal, and/or the terminal device may determine, based on antenna panel information corresponding to the first reference signal, antenna panel information corresponding to the first target signal. In other words, there is a correspondence between the first reference signal and the first target signal, so that the terminal device may determine, based on transmission information corresponding to the first reference signal, transmission information corresponding to the first target signal. The transmission information corresponding to the first target signal is the first transmission information.

In an example, the spatial characteristic parameter corresponding to the first reference signal is a spatial characteristic parameter used by the terminal device to receive the first reference signal, and/or the antenna panel information corresponding to the first reference signal is information about an antenna panel used by the terminal device to receive the first reference signal.

For example, if the terminal device receives the first reference signal by using a spatial characteristic parameter 1 and antenna panel information 1, the spatial characteristic parameter corresponding to the first reference signal may be the spatial characteristic parameter 1, and the antenna panel information corresponding to the first reference signal is the antenna panel information 1. The network device may indicate the first reference signal, so that the terminal device may determine the spatial characteristic parameter 1 and/or the antenna panel information 1 based on the first reference signal.

The terminal device may send the resource index of the first reference signal and the first antenna panel information to the network device, so that the network device may indicate the first reference signal, and the terminal device may receive or send the first target signal by using the first spatial characteristic parameter and/or the first antenna panel information.

One antenna panel may correspond to one or more reference signals. Therefore, the terminal device may simultaneously send resource indexes of K reference signals and N pieces of antenna panel information to the network device, where K and N are positive integers, and the K reference signals include the first reference signal. The antenna panel information may be used to indicate an identifier or a virtual identifier of an antenna panel.

The antenna panel identified by the antenna panel information may be activated in a time period, the network device may schedule the activated antenna panel in the specific time period, and the activated antenna panel is an active antenna panel.

Each of the K reference signals may correspond to one of N antenna panels. For example, when a quantity of active antenna panels is 1, N is 1, and the resource indexes of the K reference signals correspond to the N pieces of antenna panel information. The K reference signals are carried in one reference signal resource set, and an index of the reference signal resource set corresponds to the active antenna panel. Alternatively, each of the resource indexes of the K reference signals corresponds to the active antenna panel.

For another example, when a quantity of active antenna panels is greater than 1, N is equal to K, and the resource indexes of the K reference signals are in a one-to-one correspondence with the N pieces of antenna panel information.

For another example, when a quantity of active antenna panels is greater than 1, N is not equal to K, each of the resource indexes of the K reference signals corresponds to one of the N pieces of antenna panel information, and each of the N pieces of antenna panel information corresponds to at least one of the resource indexes of the K reference signals.

Therefore, when the network device sends a plurality of first reference signals to the terminal device, the terminal device may send resource indexes of K first reference signals to the network device, where the resource indexes of the K first reference signals may correspond to N pieces of antenna panel information. The network device may indicate resource indexes of K' first reference signals, so that the terminal device may receive or send the first target signal by using antenna panels corresponding to the resource indexes of the K' first reference signals, where K' is a positive integer less than or equal to K, and N' is a positive integer less than or equal to N. In an example, the spatial relation parameter information of the first reference signal includes a resource index of a second reference signal; and the spatial characteristic parameter corresponding to the first reference signal is a spatial characteristic parameter used by the terminal device to receive the second reference signal, and/or the antenna panel information corresponding to the first reference signal is information about an antenna panel used by the terminal device to receive the second reference signal.

In other words, the spatial characteristic parameter corresponding to the first reference signal is a spatial characteristic parameter used by the terminal device to receive another reference signal, and/or the antenna panel corresponding to the first reference signal is an antenna panel used by the terminal device to receive the another reference signal; and there is a correspondence between the another reference signal and the first reference signal. The correspondence may be, for example, a QCL relationship or a spatial relation. In other words, there is a correspondence between the another reference signal (where the another reference signal is the source reference signal) and the first reference signal, and there is a correspondence between the first reference signal (where the first reference signal is the source reference signal) and the first target signal. The network device may indicate the first reference signal, so that the terminal device may determine, based on the source reference signal of the first reference signal, to receive or send the first target signal by using a spatial characteristic parameter and/or antenna panel information corresponding to the source reference signal of the first reference signal. The network device indicates the resource index of the first reference signal to the terminal device, and the terminal device may determine, based on the resource index of the first reference signal, the source reference signal corresponding to the first reference signal as a reference signal 1, and receive or send the first target signal by using a spatial characteristic parameter and/or an antenna panel corresponding to the reference signal 1. By analogy, assuming that there is a correspondence between the reference signal 1 and a reference signal 2, the network device indicates the first reference signal to the terminal device, and the terminal device may determine a reference signal that has an association relationship with the first reference signal as the reference signal 1, and determine a reference signal that has an association relationship with the reference signal 1 as the reference signal 2, to use a spatial characteristic parameter and/or an antenna panel corresponding to the reference signal 2.

For example, if the spatial relation parameter information of the first reference signal includes the resource index of the second reference signal, and the terminal device receives the second reference signal by using a spatial characteristic parameter 2 and antenna panel information 2, the spatial characteristic parameter corresponding to the second reference signal is the spatial characteristic parameter 2, and the antenna panel information corresponding to the second reference signal is the antenna panel information 2. The network device may indicate the first reference signal, so that the terminal device may receive or send the first target signal by using the spatial characteristic parameter 2 and/or the antenna panel information 2.

The terminal device may not send the antenna panel information corresponding to the first reference signal to the network device. Therefore, in an example, the terminal device may send the resource index of the second reference signal and/or the antenna panel information corresponding to the second reference signal to the network device, that is, report the resource index of the second reference signal and the antenna panel information corresponding to the second reference signal to the network device. The network device and the terminal device may agree that when the network device indicates the first reference signal to the terminal device, both the terminal device and the network device may learn of the first spatial characteristic parameter based on the resource index of the second reference signal, and/or learn of the first antenna panel information based on the antenna panel information corresponding to the second reference signal.

One antenna panel may correspond to one or more reference signals. Therefore, the terminal device may simultaneously send resource indexes of K reference signals and N pieces of antenna panel information to the network device, where K and N are positive integers, and the K reference signals include the second reference signal. The antenna panel information may be used to indicate an identifier or a virtual identifier of an antenna panel.

The antenna panel identified by the antenna panel information may be activated in a time period, the network device may schedule the activated antenna panel in the specific time period, and the activated antenna panel is an active antenna panel.

Each of the K reference signals may correspond to one of N antenna panels. For example, when a quantity of active antenna panels is 1, N is 1, and the resource indexes of the K reference signals correspond to the N pieces of antenna panel information. The K reference signals are carried in one reference signal resource set, and an index of the reference signal resource set may correspond to the active antenna panel. Alternatively, each of the resource indexes of the K reference signals corresponds to the active antenna panel.

For another example, when a quantity of active antenna panels is greater than 1, N is equal to K, and the resource indexes of the K reference signals are in a one-to-one correspondence with the N pieces of antenna panel information.

For another example, when a quantity of active antenna panels is greater than 1, N is not equal to K, each of the resource indexes of the K reference signals corresponds to one of the N pieces of antenna panel information, and each of the N pieces of antenna panel information corresponds to at least one of the resource indexes of the K reference signals.

In an example, a resource of the first reference signal belongs to a first reference signal resource set, and reference signal resources in the first reference signal resource set are transmitted by using a same downlink spatial transmission filter. Before the first reference signal is received, a last received reference signal belonging to a second reference signal resource set is a third reference signal, and reference signal resources in the second reference signal resource set are transmitted by using different downlink spatial transmission filters. The spatial characteristic parameter corresponding to the first reference signal is a spatial characteristic parameter corresponding to the third reference signal (that is, a spatial characteristic parameter used by the terminal device to receive the third reference signal), and/or the antenna panel information corresponding to the first reference signal is antenna panel information corresponding to the third reference signal (that is, information about an antenna panel used by the terminal device to receive the third reference signal).

That "reference signal resources in the first reference signal resource set are transmitted by using a same downlink spatial transmission filter" may alternatively be described as that "a plurality of reference signals in the first reference signal resource set are transmitted by using a same downlink spatial transmission filter", or may be described as that "a repetition field of the first reference signal resource set that is configured by using higher layer signaling is "on"". The network device may configure the repetition field of the first reference signal resource set to "on" by using the higher layer signaling (for example, RRC signaling). The first reference signal resource set may be a resource set for NZP CSI-RSs. The first reference signal resource set may be used for receive beam training on a terminal device side. That "reference signal resources in the second reference signal resource set are transmitted by using different downlink spatial transmission filters" may alternatively be described as that "a plurality of reference signals in the second reference signal resource set are transmitted by using different downlink spatial transmission filters", or may be described as that "a repetition field of the second reference signal resource set that is configured by using higher layer signaling is "off"". Using different downlink spatial transmission filters may mean that the terminal device does not assume that a same spatial filter is used, that is, at least two reference signals use different spatial transmission filters. The network device may configure the repetition field of the second reference signal resource set to "off" by using the higher layer signaling (for example, RRC signaling). The second reference signal resource set may be a resource set for NZP CSI-RSs. The second reference signal resource set may be used for transmit beam training on a network device side.

For example, the resource set in which the first reference signal is located corresponds to CSI-RS repetition on. Before the terminal device receives the first reference signal, a reference signal that is last received by the terminal device and that corresponds to CSI-RS repetition off is the third reference signal. That is, the resource set in which the third reference signal is located corresponds to CSI-RS repetition off. If the terminal device receives the third reference signal by using a spatial characteristic parameter 3 and antenna panel information 3, the spatial characteristic parameter corresponding to the third reference signal may correspond to the spatial characteristic parameter 3, and the antenna panel information corresponding to the third reference signal is the antenna panel information 3. The network device may indicate the first reference signal, so that the terminal device may receive or send the first target signal by using the spatial characteristic parameter 3 and/or the antenna panel information 3.

The terminal device may send a resource index of the third reference signal and the antenna panel information corresponding to the third reference signal to the network device, or send the antenna panel information corresponding to the third reference signal to the network device, that is, report the resource index of the third reference signal and the antenna panel information corresponding to the third reference signal to the network device, or report the antenna panel information corresponding to the third reference signal to the network device.

One antenna panel may correspond to one or more reference signals. Therefore, the terminal device may simultaneously send resource indexes of K reference signals and N pieces of antenna panel information to the network device, where K and N are positive integers, and the K reference signals include the third reference signal. The antenna panel information is used to indicate an identifier or a virtual identifier of an antenna panel.

The antenna panel identified by the antenna panel information may be activated in a time period, the network device may schedule the activated antenna panel in the specific time period, and the activated antenna panel is an active antenna panel.

Each of the K reference signals may correspond to one of N antenna panels. For example, when a quantity of active antenna panels is 1, N is 1, and the resource indexes of the K reference signals correspond to the N pieces of antenna panel information. The K reference signals may form a reference signal group, and a resource index of the reference signal group corresponds to the active antenna panel. Alternatively, the K reference signals are carried in one reference signal resource set, and an index of the reference signal resource set corresponds to the active antenna panel.

For another example, when a quantity of active antenna panels is greater than 1, N is equal to K, and the resource indexes of the K reference signals are in a one-to-one correspondence with the N pieces of antenna panel information.

For another example, when a quantity of active antenna panels is greater than 1, N is not equal to K, each of the resource indexes of the K reference signals corresponds to one of the N pieces of antenna panel information, and each of the N pieces of antenna panel information corresponds to at least one of the resource indexes of the K reference signals.

Optionally, a first resource occupied by the first reference signal is a resource in a third reference signal resource set, a second resource occupied by the first reference signal is a resource in a fourth reference signal resource set, the third reference signal resource set is used to measure first-type channel quality, and the fourth reference signal resource set is used to measure second-type channel quality. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and the antenna panel information corresponding to the first reference signal is the first antenna panel information.

Resources in the third reference signal resource set may be contiguous or non-contiguous in time domain.

Resources in the fourth reference signal resource set may be contiguous or non-contiguous in time domain.

The third reference signal resource set and the fourth reference signal resource set may be the same. To be specific, all reference signals in the third reference signal resource set are reference signals further used to measure the second-type channel quality, and all reference signals in the fourth reference signal resource set are further used to measure the first-type channel quality.

The third reference signal resource set and the fourth reference signal resource set may be partially different, that is, the third reference signal resource set and the fourth reference signal resource set may overlap, that is, some reference signals in the third reference signal resource set are reference signals further used to measure the second-type channel quality, and some reference signals in the fourth reference signal resource set are further used to measure the first-type channel quality. In other words, the third reference signal resource set and the fourth reference signal resource set include resources whose resource indexes are the same.

It should be understood that, assuming that the network device sends L same first reference signals to the terminal device, resources on which the L first reference signals are located may belong to the third reference signal resource set or the fourth reference signal resource set. Frequency domain resources on which the L first reference signals are located are the same, and time domain resources on which the L first reference signals are located are different from each other. Resource indexes of the L first reference signals may be the same.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the measurement of the first-type channel quality is RSRP measurement, and the measurement of the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

The terminal device measures first-type channel quality of the reference signal in the third reference signal resource set, and the terminal device measures second-type channel quality of the reference signal in the fourth reference signal resource set. In a possible case, the terminal device may receive a first reference signal 1 on the first resource by using the spatial characteristic parameter 1 in a process of measuring the first-type channel quality, and receive a first reference signal 2 on the second resource by using the spatial characteristic parameter 2 in a process of measuring the second-type channel quality. In the foregoing two measurement processes, time domain resources on which the first reference signal 1 and the first reference signal 2 are located may be different. When the network device indicates the resource index of the first reference signal to the terminal device, because a resource index of the first reference signal 1 is the same as a resource index of the first reference signal 2, the terminal device cannot determine the spatial characteristic parameter 1 or the spatial characteristic parameter 2 based on the resource index of the first reference signal. Similarly, in a possible case, the terminal device may receive a first reference signal 1 by using the antenna panel information 1 in a process of measuring the first-type channel quality, and receive a first reference signal 2 by using the antenna panel information 2 in a process of measuring the second-type channel quality. Time domain resources on which the first reference signal 1 and the first reference signal 2 are located may be different. When the network device indicates the resource index of the first reference signal to the terminal device, because a resource index of the first reference signal 1 is the same as a resource index of the first reference signal 2, the terminal device cannot determine the antenna panel information 1 or the antenna panel information 2 based on the resource index of the first reference signal.

In an example, the terminal device may perform RSRP measurement and SINR measurement on a reference signal in the second reference signal resource set by using different spatial characteristic parameters and/or antenna panel information.

In an example, the reference signal corresponding to the first resource and the reference signal corresponding to the second resource satisfy the quasi-colocation relationship. The quasi-colocation relationship may alternatively be replaced with a spatial relation.

Spatial characteristic parameters and/or antenna panel information corresponding to two reference signals that satisfy a quasi-colocation relationship are/is the same or approximately the same. Therefore, the resource index of the first reference signal may identify a same spatial characteristic parameter and/or same antenna panel information. It should be understood that, in this application, that spatial characteristic parameters corresponding to two reference signals may be approximately the same means that a slight deviation may be allowed for the spatial characteristic parameters corresponding to the two reference signals, and the deviation is less than a first preset threshold. It should be understood that, that antenna panel information corresponding to two reference signals may be approximately the same means that a slight deviation may be allowed for the antenna panel information corresponding to the two reference signals, and the deviation is less than a second preset threshold.

For example, based on resource configuration information sent by the network device, the terminal device assumes that the terminal device first receives the first reference signal 1 on the first resource by using the spatial characteristic parameter 1, to measure the first-type channel quality, and then intends to receive the first reference signal 2 that is the same as the first reference signal 1 on the second resource. Because the first reference signal 2 and the first reference signal 1 satisfy a quasi-colocation relationship, the terminal device may receive the first reference signal 2 by using the spatial characteristic parameter 1 (that is, the first reference signal 1 and the first reference signal 2 are received by using a same spatial characteristic parameter), to measure the second-type channel quality. Therefore, when the network device indicates the resource index of the first reference signal to the terminal device, the terminal device may determine that the spatial characteristic parameter 1 corresponds to the resource index of the first reference signal.

Similarly, based on resource configuration information sent by the network device, the terminal device assumes that the terminal device first receives the first reference signal 1 on the first resource by using the antenna panel information 1, to measure the first-type channel quality, and then, the terminal device intends to receive the first reference signal 2 that is the same as the first reference signal 1 on the second resource. Because the first reference signal 2 and the first reference signal 1 satisfy a quasi-colocation relationship, the terminal device may receive the first reference signal 2 by using the antenna panel information 1 (that is, the first reference signal 1 and the first reference signal 2 are received by using same antenna panel information), to measure the second-type channel quality. Therefore, when the network device indicates the resource index of the first reference signal to the terminal device, the terminal device may determine that the antenna panel information 1 corresponds to the resource index of the first reference signal.

In an example, the reference signal corresponding to the first resource and the reference signal corresponding to the second resource correspond to a same spatial characteristic parameter or spatial characteristic parameters that are approximately the same, and the spatial characteristic parameter corresponding to the first reference signal is the first spatial characteristic parameter.

In other words, by using a pre-agreed protocol, the terminal device receives the first reference signal on the first resource by using the first spatial characteristic parameter, and receives the first reference signal on the second resource by using the first spatial characteristic parameter.

For example, based on resource configuration information sent by the network device, the terminal device assumes that the terminal device first receives the first reference signal 1 on the first resource by using the spatial characteristic parameter 1, to measure the first-type channel quality, and then, the terminal device intends to receive the first reference signal 2 that is the same as the first reference signal 1 on the second resource. Because it is pre-agreed that a spatial characteristic parameter corresponding to the first reference signal 2 is the same as a spatial characteristic parameter corresponding to the first reference signal 1, the terminal device may receive the first reference signal 2 by using the spatial characteristic parameter 1 (that is, the first reference signal 1 and the first reference signal 2 are received by using a same spatial characteristic parameter), to measure the second-type channel quality. Therefore, when the network device indicates the resource index of the first reference signal to the terminal device, the terminal device may determine that the spatial characteristic parameter 1 corresponds to the resource index of the first reference signal.

In an example, the reference signal corresponding to the first resource and the reference signal corresponding to the second resource correspond to the same antenna panel information, and the antenna panel information corresponding to the first reference signal is the first antenna panel information.

In other words, by using a pre-agreed protocol, the terminal device receives the first reference signal on the first resource by using an antenna panel identified by the first antenna panel information, and receives the first reference signal on the second resource by using the antenna panel identified by the first antenna panel information.

For example, based on resource configuration information sent by the network device, the terminal device assumes that the terminal device first receives the first reference signal 1 on the first resource by using the antenna panel information 1, to measure the first-type channel quality, and then, the terminal device intends to receive the first reference signal 2 that is the same as the first reference signal 1 on the second resource. Because it is pre-agreed that antenna panel information corresponding to the first reference signal 2 is the same as antenna panel information corresponding to the first reference signal 1, the terminal device may receive the first reference signal 2 by using the antenna panel information 1 (that is, the first reference signal 1 and the first reference signal 2 are received by using same antenna panel information), to measure the second-type channel quality. Therefore, when the network device indicates the resource index of the first reference signal to the terminal device, the terminal device may determine that the antenna panel information 1 corresponds to the resource index of the first reference signal.

Optionally, there is an interval of S time units between a time domain position of the first resource and a time domain position of the second resource, and S is less than a third preset threshold.

In an example, the second resource is a resource with a minimum interval from the time domain position of the first resource.

In an example, a time unit in which the first resource is located is adjacent to a time unit in which the second resource is located.

In an example, the first resource and the second resource are located in at least one same time unit.

In the embodiments of this application, the time unit may be one or more radio frames, one or more subframes, one or more slots, one or more mini-slots, one or more orthogonal frequency division multiplexing (OFDM) symbols, or the like defined in an LTE system or a 5G NR system, or may be a time window including a plurality of frames or subframes, for example, a system information (SI) window. In other words, the terminal device measures the first reference signal 1 on the first resource and the first reference signal 2 on the second resource within relatively short time. Within the relatively short time, an optimal beam and optimal antenna panel information that can be used by the terminal device usually do not change greatly. Therefore, transmission information corresponding to the first reference signal 1 may be considered as transmission information corresponding to the first reference signal 2.

Optionally, a first resource occupied by the first reference signal is a resource in a third reference signal resource set, a second resource occupied by the first reference signal is a resource in a fourth reference signal resource set, reference signal resources in the third reference signal resource set are transmitted by using a same downlink spatial transmission filter, and reference signal resources in the fourth reference signal resource set are transmitted by using different downlink spatial transmission filters. A reference signal corresponding to the first resource and a reference signal corresponding to the second resource satisfy a quasi-colocation relationship; and/or a reference signal corresponding to the first resource and a reference signal corresponding to the second resource correspond to a same spatial characteristic parameter, and a spatial characteristic parameter corresponding to the first reference signal is the first spatial characteristic parameter; and/or a reference signal corresponding to the first resource and a reference signal corresponding to the second resource correspond to same antenna panel information, and the antenna panel information corresponding to the first reference signal is first antenna panel information.

The resources in the third reference signal resource set may be contiguous or non-contiguous in time domain. The resources in the fourth reference signal resource set may be contiguous or non-contiguous in time domain. The third reference signal resource set and the fourth reference signal resource set may not overlap, that is, the reference signal resources in the third reference signal resource set are transmitted by using the same downlink spatial transmission filter, and the reference signal resources in the fourth reference signal resource set are transmitted by using the different downlink spatial transmission filters.

It should be understood that, assuming that the network device sends L same first reference signals to the terminal device, resources on which the L first reference signals are located may belong to the third reference signal resource set or the fourth reference signal resource set. Frequency domain resources on which the L first reference signals are located are the same, and time domain resources on which the L first reference signals are located are different from each other. Resource indexes of the L first reference signals may be the same.

That reference signal resources in the third reference signal resource set are transmitted by using a same downlink spatial transmission filter means that the reference signal resources in the third reference signal resource set all correspond to channel state information reference signal (CSI-RS) repetition on. In other words, the terminal device may measure reference signals in the third reference signal resource set by using a plurality of spatial characteristic parameters, and the reference signals in the third reference signal resource set all correspond to one downlink spatial transmission filter of the network device.

That reference signal resources in the fourth reference signal resource set are transmitted by using different downlink spatial transmission filters means that reference signals in the fourth reference signal resource set all correspond to CSI-RS repetition off. In other words, the terminal device may measure the reference signals in the fourth reference signal resource set by using one or more spatial characteristic parameters, and the reference signals in the fourth reference signal resource set correspond to a plurality of different downlink spatial transmission filters of the network device.

In a possible case, the reference signals carried in the fourth reference signal resource set correspond to the plurality of downlink spatial transmission filters of the network device. Therefore, after completing measurement of the reference signals, the terminal device may report a measurement result to the network device (for example, report a resource index of a better reference signal to the network device), so that the network device selects an appropriate downlink spatial transmission filter. The reference signals carried in the third reference signal resource set all correspond to the same downlink spatial transmission filter of the network device. Therefore, after completing measurement of the reference signals, the terminal device may not report a measurement result to the network device, for example, not report a resource index of the reference signal to the network device, where the resource index of the reference signal corresponds to the first spatial characteristic parameter and/or the first antenna panel information. Therefore, the network device cannot indicate the terminal device to use the first spatial characteristic parameter or the first antenna panel information. In an example, the reference signal corresponding to the first resource and the reference signal corresponding to the second resource satisfy the quasi-colocation relationship. The quasi-colocation relationship may alternatively be replaced with a spatial relation.

Spatial characteristic parameters and/or antenna panel information corresponding to two reference signals that satisfy a quasi-colocation relationship are/is the same or approximately the same. Therefore, the resource index of the first reference signal may identify a same spatial characteristic parameter and/or same antenna panel information.

For example, based on resource configuration information sent by the network device, the terminal device assumes that the terminal device first receives the first reference signal 1 on the first resource by using the spatial characteristic parameter 1, to measure the first reference signal 1, and then, the terminal device intends to receive the first reference signal 2 that is the same as the first reference signal 1 on the second resource. Because the first reference signal 2 and the first reference signal 1 satisfy a quasi-colocation relationship, the terminal device may receive the first reference signal 2 by using the spatial characteristic parameter 1 (that is, the first reference signal 1 and the first reference signal 2 are received by using a same spatial characteristic parameter), to measure the first reference signal 2. Therefore, when the network device indicates the resource index of the first reference signal to the terminal device, the terminal device may determine that the spatial characteristic parameter 1 corresponds to the resource index of the first reference signal.

Similarly, based on resource configuration information sent by the network device, the terminal device assumes that the terminal device first receives the first reference signal 1 on the first resource by using the antenna panel information 1, to measure the first reference signal 1, and then, the terminal device intends to receive the first reference signal 2 that is the same as the first reference signal 1 on the second resource. Because the first reference signal 2 and the first reference signal 1 satisfy a quasi-colocation relationship, the terminal device may receive the first reference signal 2 by using the antenna panel information 1 (that is, the first reference signal 1 and the first reference signal 2 are received by using same antenna panel information), to measure the first reference signal 2. Therefore, when the network device indicates the resource index of the first reference signal to the terminal device, the terminal device may determine that the antenna panel information 1 corresponds to the resource index of the first reference signal.

In an example, the reference signal corresponding to the first resource and the reference signal corresponding to the second resource correspond to a same spatial characteristic parameter or spatial characteristic parameters that are approximately the same, and the spatial characteristic parameter corresponding to the first reference signal is the first spatial characteristic parameter.

In other words, by using a pre-agreed protocol, the terminal device receives the first reference signal on the first resource by using the first spatial characteristic parameter, and receives the first reference signal on the second resource by using the first spatial characteristic parameter.

For example, based on resource configuration information sent by the network device, the terminal device assumes that the terminal device first receives the first reference signal 1 on the first resource by using the spatial characteristic parameter 1, to measure the first reference signal 1, and then, the terminal device intends to receive the first reference signal 2 that is the same as the first reference signal 1 on the second resource. Because it is pre-agreed that a spatial characteristic parameter corresponding to the first reference signal 2 is the same as a spatial characteristic parameter corresponding to the first reference signal 1, the terminal device may receive the first reference signal 2 by using the spatial characteristic parameter 1 (that is, the first reference signal 1 and the first reference signal 2 are received by using a same spatial characteristic parameter), to measure the first reference signal 2. Therefore, when the network device indicates the resource index of the first reference signal to the terminal device, the terminal device may determine that the spatial characteristic parameter 1 corresponds to the resource index of the first reference signal.

In an example, the reference signal corresponding to the first resource and the reference signal corresponding to the second resource correspond to the same antenna panel information, and the antenna panel information corresponding to the first reference signal is the first antenna panel information.

In other words, by using a pre-agreed protocol, the terminal device receives the first reference signal on the first resource by using an antenna panel identified by the first antenna panel information, and receives the first reference signal on the second resource by using the antenna panel identified by the first antenna panel information.

For example, it is assumed that the terminal device first receives the first reference signal 1 on the first resource by using the antenna panel information 1, to measure the first reference signal 2, and then, the terminal device intends to receive the first reference signal 2 that is the same as the first reference signal 1 on the second resource based on resource configuration information sent by the network device. Because it is pre-agreed that antenna panel information corresponding to the first reference signal 2 is the same as antenna panel information corresponding to the first reference signal 1, the terminal device may receive the first reference signal 2 by using the antenna panel information 1 (that is, the first reference signal 1 and the first reference signal 2 are received by using same antenna panel information), to measure the first reference signal 2. Therefore, when the network device indicates the resource index of the first reference signal to the terminal device, the terminal device may determine that the antenna panel information 1 corresponds to the resource index of the first reference signal.

Optionally, there is an interval of S time units between a time domain position of the first resource and a time domain position of the second resource, and S is less than a third preset threshold.

In an example, the second resource is a resource with a minimum interval from the time domain position of the first resource.

In an example, a time unit in which the first resource is located is adjacent to a time unit in which the second resource is located.

In an example, the first resource and the second resource are located in at least one same time unit.

In other words, the terminal device measures the first reference signal 1 on the first resource and the first reference signal 2 on the second resource within relatively short time. Within the relatively short time, an optimal beam and optimal antenna panel information that can be used by the terminal device usually do not change greatly. Therefore, transmission information corresponding to the first reference signal 1 may be considered as transmission information corresponding to the first reference signal 2.

Optionally, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The determining first transmission information based on the resource index of the first reference signal includes: determining the first transmission information based on the first spatial relation parameter information, where the first spatial relation parameter information is used to indicate that a transmission state of the first target signal is a first state or a second state, the first state corresponds to the second transmission information, and the second state corresponds to the third transmission information; or determining the first transmission information based on the resource index of the first reference signal and first indication information, where the first indication information is used to indicate antenna port information of the first target signal, a value of the first indication information is a third value or a fourth value, the third value corresponds to the second transmission information, and the fourth value corresponds to the third transmission information.

Resources in the third reference signal resource set may be contiguous or non-contiguous in time domain.

Resources in the fourth reference signal resource set may be contiguous or non-contiguous in time domain.

The third reference signal resource set and the fourth reference signal resource set may be the same. To be specific, all reference signals in the third reference signal resource set are reference signals further used to measure the second-type channel quality, and all reference signals in the fourth reference signal resource set are further used to measure the first-type channel quality.

The third reference signal resource set and the fourth reference signal resource set may be partially different, that is, the third reference signal resource set and the fourth reference signal resource set may overlap, that is, some reference signals in the third reference signal resource set are reference signals further used to measure the second-type channel quality, and some reference signals in the fourth reference signal resource set are further used to measure the first-type channel quality. In other words, the third reference signal resource set and the fourth reference signal resource set include resources whose resource indexes are the same.

It should be understood that, assuming that the network device sends L same first reference signals to the terminal device, resources on which the L first reference signals are located may belong to the third reference signal resource set or the fourth reference signal resource set. Frequency domain resources on which the L first reference signals are located are the same, and time domain resources on which the L first reference signals are located are different from each other. Resource indexes of the L first reference signals may be the same.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the first-type channel quality is RSRP measurement, and the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

The terminal device measures first-type channel quality of the reference signal in the third reference signal resource set, and the terminal device measures second-type channel quality of the reference signal in the fourth reference signal resource set. In a possible case, the terminal device may receive a first reference signal 1 on the first resource by using the spatial characteristic parameter 1 in a process of measuring the first-type channel quality, and receive a first reference signal 2 on the second resource by using the spatial characteristic parameter 2 in a process of measuring the second-type channel quality. In the foregoing two measurement processes, time domain resources on which the first reference signal 1 and the first reference signal 2 are located may be different. When the network device indicates the resource index of the first reference signal to the terminal device, because a resource index of the first reference signal 1 is the same as a resource index of the first reference signal 2, the terminal device cannot determine the spatial characteristic parameter 1 or the spatial characteristic parameter 2 based on the resource index of the first reference signal. Similarly, in a possible case, the terminal device may receive a first reference signal 1 by using the antenna panel information 1 in a process of measuring the first-type channel quality, and receive a first reference signal 2 by using the antenna panel information 2 in a process of measuring the second-type channel quality. Time domain resources on which the first reference signal 1 and the first reference signal 2 are located are different. When the network device indicates the resource index of the first reference signal to the terminal device, because a resource index of the first reference signal 1 is the same as a resource index of the first reference signal 2, the terminal device cannot determine the antenna panel information 1 or the antenna panel information 2 based on the resource index of the first reference signal.

The terminal device may determine, based on the transmission state of the first target signal, that the terminal device receives or sends the first target signal by using the second transmission information or the third transmission information. The network device may determine, based on a transmission state of the terminal device, whether the terminal device uses a result obtained through the measurement of the first-type channel quality or a result obtained through the measurement of the second-type channel quality. The terminal device may determine, based on the spatial relation parameter information of the first target signal that is indicated by the network device (for example, the first spatial relation parameter information is indicated by using a transmission configuration indicator (TCI) field or TCI indication information in downlink control information (DCI), that is, the TCI field or the TCI indication information may be used to indicate the QCL information of the first target signal) and/or the antenna port information, to receive or send the first target signal by using the second transmission information or the third transmission information. The spatial relation parameter information and/or the antenna port information of the first target signal may implicitly indicate the transmission state of the first target signal. The terminal device may determine, based on the transmission state of the first target signal, to receive/send the first target signal by using the second transmission information or the third transmission information.

In a possible implementation, when the transmission state of the first target signal is the first state, the terminal device transmits the first target signal by using the second transmission information; when the transmission state of the first target signal is the second state, the terminal device transmits the first target signal by using the third transmission information. The transmission state of the first target signal may be, for example, single-stream transmission or multi-stream transmission; for another example, single-beam transmission or multi-beam transmission; for another example, single-node (transmission reception point, TRP) transmission or multi-TRP transmission; or for another example, single-user transmission or multi-user transmission. The first state may be single-beam transmission, single-stream transmission, single-TRP transmission, and/or single-user transmission. The second state may be multi-beam transmission, multi-stream transmission, multi-TRP transmission, and/or multi-user transmission. When the transmission state of the first target signal is the first state, an interference factor may not be considered, and transmission information obtained in a measurement process in which the interference factor is not considered is more accurate. Therefore, the first target signal is transmitted by using the second transmission information. When the transmission state of the first target signal is the second state, an interference factor needs to be considered, and transmission information obtained in a measurement process in which the interference factor is considered is more accurate. Therefore, the first target signal is transmitted by using the third transmission information.

For example, the spatial relation parameter information may be used to indicate whether the first target signal is in a single-stream transmission state or a multi-stream transmission state; or may be used to indicate whether the first target signal is in single-beam transmission or multi-beam transmission; or may be used to indicate whether the first target signal is in single-TRP transmission or multi-TRP transmission. For another example, the transmission state of the first target signal may be a single-user transmission state or a multi-user transmission state. The antenna port information may be used to indicate whether the first target signal is in the single-user transmission state or the multi-user transmission state (where the multi-user transmission may mean that another user transmits a signal on a time-frequency resource of the first target signal). The first target signal in the single-user transmission state may be a first target signal in the single-stream transmission state or the multi-stream transmission state.

The spatial relation parameter information (for example, TCI information) may be indicated by using one or more of RRC signaling, MAC-CE signaling, or DCI signaling. The terminal device may learn of the transmission state of the first target signal based on a quantity of TCI states indicated by using the TCI information, a quantity of QCL information of a same type, or a quantity of reference signals in one piece of QCL information. Alternatively, the terminal device may learn of the transmission state of the first target signal based on a quantity of spatial relations indicated by using the spatial relation information or a quantity of reference signals in one piece of spatial relation information. For example, when the TCI information indicates one TCI state, or when the TCI information indicates one piece of QCL information of a same type (for example, Type D), or when there is one reference signal in one piece of QCL information in the TCI information, the terminal device determines that single-beam transmission may be performed on the first target signal. For another example, when the TCI information indicates more than one TCI state (for example, two TC states), or when the TCI information indicates more than one piece of QCL information of a same type (for example, Type D), or when there is more than one reference signal in one piece of QCL information in the TCI information, the terminal device determines that multi-beam transmission may be performed on the first target signal. The antenna port information may be indicated by using DCI signaling.

For example, based on the resource configuration information sent by the network device, the terminal device assumes that the terminal device is in the single-stream transmission state. The terminal device first receives the first reference signal 1 on the first resource by using the spatial characteristic parameter 1, to measure the first-type channel quality. Then, the terminal device receives the first reference signal 2 that is the same as the first reference signal 1 on the second resource by using the spatial characteristic parameter 2. Because the signal interference factor has little impact on the terminal device in the single-stream transmission state, the network device may determine that the terminal device uses a spatial characteristic parameter with a smaller interference correlation. The terminal device may determine, based on the spatial relation parameter information of the first target signal, that the terminal device receives or sends the first target signal by using the spatial characteristic parameter 1 with a smaller interference correlation. Similarly, it is assumed that the terminal device is in the single-stream transmission state. The terminal device first receives the first reference signal 1 on the first resource by using the antenna panel information 1, to measure the first-type channel quality. Then, the terminal device receives the first reference signal 2 that is the same as the first reference signal 1 on the second resource by using the antenna panel information 2. Because the signal interference factor has little impact on the terminal device in the single-stream transmission state, the network device may determine that the terminal device uses antenna panel information with a smaller interference correlation. The terminal device may determine, based on the spatial relation parameter information of the first target signal, that the terminal device receives or sends the first target signal by using the antenna panel information 1 with a smaller interference correlation. The foregoing spatial characteristic parameter with the smaller interference correlation or the foregoing antenna panel information with the smaller interference correlation may be understood as spatial relation parameter information or antenna panel information obtained in a measurement process in which inter-beam interference is not considered.

For another example, based on the resource configuration information sent by the network device, the terminal device assumes that the terminal device is in the multi-stream transmission state. The terminal device first receives the first reference signal 1 on the first resource by using the spatial characteristic parameter 1, to measure the first-type channel quality. Then, the terminal device receives the first reference signal 2 that is the same as the first reference signal 1 on the second resource by using the spatial characteristic parameter 2. Because the signal interference factor has some impact on the terminal device in the multi-stream transmission state, the network device may determine that the terminal device uses a spatial characteristic parameter with a larger interference correlation. The terminal device may determine, based on the spatial relation parameter information of the first target signal, that the terminal device receives or sends the first target signal by using the spatial characteristic parameter 2 with a larger interference correlation. Similarly, it is assumed that the terminal device is in the multi-stream transmission state. The terminal device first receives the first reference signal 1 on the first resource by using the antenna panel information 1, to measure the first-type channel quality. Then, the terminal device receives the first reference signal 2 that is the same as the first reference signal 1 on the second resource by using the antenna panel information 2. Because the signal interference factor has some impact on the terminal device in the multi-stream transmission state, the network device may determine that the terminal device uses a spatial characteristic parameter with a larger interference correlation. The terminal device may determine, based on the spatial relation parameter information of the first target signal, that the terminal device receives or sends the first target signal by using the antenna panel information 2 with a larger interference correlation. The foregoing spatial characteristic parameter with the smaller interference correlation or the foregoing antenna panel information with the smaller interference correlation may be understood as spatial relation parameter information or antenna panel information obtained in a measurement process in which inter-beam interference is considered.

In an example, when the terminal device is in the single-user transmission state, the first indication information indicates the second transmission information; when the terminal device is in the multi-user transmission state, the first indication information indicates the third transmission information. The first indication information is the antenna port information. The first indication information is, for example, an antenna port field or antenna port indication information in DCI. The antenna port field or the antenna port indication information may be used to indicate an antenna port corresponding to the first target signal. The first target signal may be, for example, a physical downlink shared channel (PDSCH).

For example, based on the resource configuration information sent by the network device, the terminal device assumes that the terminal device is in the single-user transmission state. The terminal device first receives the first reference signal 1 on the first resource by using the spatial characteristic parameter 1, to measure the first-type channel quality. Then, the terminal device receives the first reference signal 2 that is the same as the first reference signal 1 on the second resource by using the spatial characteristic parameter 2. Because the signal interference factor has little impact on the terminal device in the single-user transmission state, the network device may indicate the resource index of the first reference signal and the first indication information of the first value to the terminal device, so that the terminal device can receive or send the first target signal by using the spatial characteristic parameter 1. Similarly, it is assumed that the terminal device is in the single-user transmission state. The terminal device first receives the first reference signal 1 on the first resource by using the antenna panel information 1, to measure the first-type channel quality. Then, the terminal device receives the first reference signal 2 that is the same as the first reference signal 1 on the second resource by using the antenna panel information 2. Because the signal interference factor has little impact on the terminal device in the single-user transmission state, the network device may indicate the resource index of the first reference signal and the first indication information of the first value to the terminal device, so that the terminal device can receive or send the first target signal by using the antenna panel information 1.

For another example, based on the resource configuration information sent by the network device, the terminal device assumes that the terminal device is in the multi-user transmission state. The terminal device first receives the first reference signal 1 on the first resource by using the spatial characteristic parameter 1, to measure the first-type channel quality. Then, the terminal device receives the first reference signal 2 that is the same as the first reference signal 1 on the second resource by using the spatial characteristic parameter 2. Because the signal interference factor has some impact on the terminal device in the multi-user transmission state, the network device may indicate the resource index of the first reference signal and the first indication information of the second value to the terminal device, so that the terminal device can receive or send the first target signal by using the spatial characteristic parameter 2. Similarly, it is assumed that the terminal device is in the multi-user transmission state. The terminal device first receives the first reference signal 1 on the first resource by using the antenna panel information 1, to measure the first-type channel quality. Then, the terminal device receives the first reference signal 2 that is the same as the first reference signal 1 on the second resource by using the antenna panel information 2. Because the signal interference factor has some impact on the terminal device in the multi-user transmission state, the network device may indicate the resource index of the first reference signal and the first indication information of the second value to the terminal device, so that the terminal device can receive or send the first target signal by using the antenna panel information 2.

Optionally, there is an interval of S time units between a time domain position of the first resource and a time domain position of the second resource, and S is less than a third preset threshold.

In an example, the second resource is a resource with a minimum interval from the time domain position of the first resource.

In an example, a time unit in which the first resource is located is adjacent to a time unit in which the second resource is located.

In an example, the first resource and the second resource are located in at least one same time unit.

In other words, the terminal device measures the first reference signal 1 on the first resource and the first reference signal 2 on the second resource within relatively short time. That the first reference signal 1 and the first reference signal 2 are a same reference signal may be understood as that the first reference signal 1 and the first reference signal 2 correspond to a same transmit beam of the network device, or may be understood as that reference signal resource indexes corresponding to the first reference signal 1 and the first reference signal 2 are the same. The terminal device receives the first reference signal 1 on the first resource, and receives the first reference signal 2 on the second resource. For ease of description, two same first reference signals located on different resources are respectively referred to as the first reference signal 1 and the first reference signal 2. Within relatively short time, a channel condition or a channel state does not change greatly. Therefore, transmission information corresponding to the first reference signal 1 may be compared with transmission information corresponding to the first reference signal 2.

Optionally, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. The third reference signal resource set is used to measure first-type channel quality, and the fourth reference signal resource set is used to measure second-type channel quality. The determining first transmission information based on the resource index of the first reference signal includes: determining the first transmission information based on the resource index of the first reference signal and second indication information, where the second indication information indicates that the first transmission information is the second transmission information or the third transmission information.

Resources in the third reference signal resource set may be contiguous or non-contiguous in time domain.

Resources in the fourth reference signal resource set may be contiguous or non-contiguous in time domain.

The third reference signal resource set and the fourth reference signal resource set may be the same. To be specific, all reference signals in the third reference signal resource set are reference signals further used to measure the second-type channel quality, and all reference signals in the fourth reference signal resource set are further used to measure the first-type channel quality.

The third reference signal resource set and the fourth reference signal resource set may be partially different, that is, the third reference signal resource set and the fourth reference signal resource set may overlap, that is, some reference signals in the third reference signal resource set are reference signals further used to measure the second-type channel quality, and some reference signals in the fourth reference signal resource set are further used to measure the first-type channel quality. In other words, the third reference signal resource set and the fourth reference signal resource set include resources whose resource indexes are the same.

It should be understood that, assuming that the network device sends L same first reference signals to the terminal device, resources on which the L first reference signals are located may belong to the third reference signal resource set or the fourth reference signal resource set. Frequency domain resources on which the L first reference signals are located are the same, and time domain resources on which the L first reference signals are located are different from each other. Resource indexes of the L first reference signals may be the same.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the first-type channel quality is RSRP measurement, and the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

The terminal device measures first-type channel quality of the reference signal in the third reference signal resource set, and the terminal device measures second-type channel quality of the reference signal in the fourth reference signal resource set. In a possible case, the terminal device may receive a first reference signal 1 on the first resource by using the spatial characteristic parameter 1 in a process of measuring the first-type channel quality, and receive a first reference signal 2 on the second resource by using the spatial characteristic parameter 2 in a process of measuring the second-type channel quality. In the foregoing two measurement processes, time domain resources on which the first reference signal 1 and the first reference signal 2 are located may be different. When the network device indicates the resource index of the first reference signal to the terminal device, because a resource index of the first reference signal 1 is the same as a resource index of the first reference signal 2, the terminal device cannot determine the spatial characteristic parameter 1 or the spatial characteristic parameter 2 based on the resource index of the first reference signal. Similarly, in a possible case, the terminal device may receive a first reference signal 1 by using the antenna panel information 1 in a process of measuring the first-type channel quality, and receive a first reference signal 2 by using the antenna panel information 2 in a process of measuring the second-type channel quality. Time domain resources on which the first reference signal 1 and the first reference signal 2 are located may be different. When the network device indicates the resource index of the first reference signal to the terminal device, because a resource index of the first reference signal 1 is the same as a resource index of the first reference signal 2, the terminal device cannot determine the antenna panel information 1 or the antenna panel information 2 based on the resource index of the first reference signal. That the network device sends the second indication information to the terminal device means that the network device determines a more appropriate reference signal, so that the terminal device may use a spatial characteristic parameter and/or antenna panel information corresponding to the more appropriate reference signal.

For example, based on resource configuration information sent by the network device, the terminal device assumes that the terminal device first receives the first reference signal 1 on the first resource by using the spatial characteristic parameter 1, to measure the first-type channel quality, and then, the terminal device receives the first reference signal 2 that is the same as the first reference signal 1 on the second resource by using the spatial characteristic parameter 2, to measure the second-type channel quality. The terminal device reports a measurement result of the first reference signal 1 and a measurement result of the second reference signal 2 to the network device. The network device may send the second indication information, so that the terminal device may determine, based on the second indication information, to receive or send the first target signal by using the spatial characteristic parameter 1 or the spatial characteristic parameter 2.

For another example, based on resource configuration information sent by the network device, the terminal device assumes that the terminal device first receives the first reference signal 1 on the first resource by using the antenna panel information 1, to measure the first-type channel quality, and then, the terminal device receives the first reference signal 2 that is the same as the first reference signal 1 on the second resource by using the antenna panel information 2, to measure the second-type channel quality. The terminal device reports a measurement result of the first reference signal 1 and a measurement result of the second reference signal 2 to the network device. The network device may send the second indication information, so that the terminal device may determine, based on the second indication information, to receive or send the first target signal by using the antenna panel information 1 or the antenna panel information 2.

In an example, the network device sends the second indication information to the terminal device. A value of the second indication information is a first value or a second value. When the value of the second indication information is the first value, the second indication information is used to indicate to measure the first-type channel quality; or when the value of the second indication information is the second value, the second indication information is used to indicate to measure the second-type channel quality. In other words, the network device may indicate a more appropriate measurement type, so that the terminal device may determine transmission information corresponding to the more appropriate measurement type.

In an example, the network device sends the second indication information to the terminal device. A value of the second indication information is a first bit value or a second bit value. When the second indication information is the first bit value, the second indication information is used to indicate that the first transmission information is the second transmission information; or when the second indication information is the second bit value, the second indication information is used to indicate that the first transmission information is the third transmission information. For example, when the first bit value is 0, the second transmission information is indicated; when the first bit value is 1, the third transmission information is indicated. In the bit value manner, overheads are relatively small. Therefore, the network device can indicate the terminal device to use more appropriate transmission information by sending a relatively small amount of data, thereby more flexibly indicating the transmission information.

Optionally, there is an interval of S time units between a time domain position of the first resource and a time domain position of the second resource, and S is less than a third preset threshold.

In an example, the second resource is a resource with a minimum interval from the time domain position of the first resource.

In an example, a time unit in which the first resource is located is adjacent to a time unit in which the second resource is located.

In an example, the first resource and the second resource are located in at least one same time unit.

In other words, the terminal device measures the first reference signal 1 on the first resource and the first reference signal 2 on the second resource within relatively short time. Within the relatively short time, a channel condition or a channel state does not change greatly. Therefore, transmission information corresponding to the first reference signal 1 may be compared with transmission information corresponding to the first reference signal 2.

Optionally, a first resource occupied by the first reference signal is a resource in a third reference signal resource set, a second resource occupied by the first reference signal is a resource in a fourth reference signal resource set, the first reference signal on the first resource corresponds to second transmission information, the second transmission information includes a second spatial characteristic parameter and/or second antenna panel information, the first reference signal on the second resource corresponds to third transmission information, and the third transmission information includes a third spatial characteristic parameter and/or third antenna panel information. Reference signal resources in the third reference signal resource set are transmitted by using a same downlink spatial transmission filter, and reference signal resources in the fourth reference signal resource set are transmitted by using different downlink spatial transmission filters. The determining first transmission information based on the resource index of the first reference signal includes: determining the first transmission information based on the resource index of the first reference signal and second indication information, where the second indication information indicates that the first transmission information is the second transmission information or the third transmission information.

The resources in the third reference signal resource set may be contiguous or non-contiguous in time domain. The resources in the fourth reference signal resource set may be contiguous or non-contiguous in time domain. The third reference signal resource set and the fourth reference signal resource set may not overlap, that is, the reference signal resources in the third reference signal resource set are transmitted by using the same downlink spatial transmission filter, and the reference signal resources in the fourth reference signal resource set are transmitted by using the different downlink spatial transmission filters.

It should be understood that, assuming that the network device sends L same first reference signals to the terminal device, resources on which the L first reference signals are located may belong to the third reference signal resource set or the fourth reference signal resource set. Frequency domain resources on which the L first reference signals are located are the same, and time domain resources on which the L first reference signals are located are different from each other. Resource indexes of the L first reference signals may be the same.

That reference signal resources in the third reference signal resource set are transmitted by using a same downlink spatial transmission filter means that the reference signal resources in the third reference signal resource set all correspond to channel state information reference signal (CSI-RS) repetition on. In other words, the terminal device may measure reference signals in the third reference signal resource set by using a plurality of spatial characteristic parameters (or a plurality of beams), and the reference signals in the third reference signal resource set all correspond to one downlink spatial transmission filter of the network device. In this process, the terminal device may train a receive beam of the terminal device, and obtain a better receive beam of the terminal device corresponding to the transmit beam of the network device for the transmit beam of the network device.

That reference signal resources in the fourth reference signal resource set are transmitted by using different downlink spatial transmission filters means that reference signals in the fourth reference signal resource set all correspond to CSI-RS repetition off. In other words, the terminal device may measure the reference signals in the fourth reference signal resource set by using one spatial characteristic parameter, and the reference signals in the fourth reference signal resource set correspond to a plurality of different downlink spatial transmission filters of the network device. In this process, the terminal device may train the transmit beam of the network device, and the terminal device measures a plurality of transmit beams of the network device by using a same receive beam, to obtain a better transmit beam of the network device.

Therefore, the terminal device may measure, in a P1/P2 beam training process, the reference signal in the fourth reference signal resource set to which the first reference signal belongs. In addition, the terminal device may measure, in a P3 beam training process, the reference signal in the third reference signal resource set to which the same first reference signal belongs. When the network device indicates to the terminal device that the spatial relation parameter information of the first target signal includes the resource index of the first reference signal, the terminal device cannot determine whether the network device indicates the transmission information obtained through measurement in the P1/P2 beam training process, or transmission information obtained through measurement in the P3 beam training process. Therefore, when indicating the resource index of the first reference signal to the terminal device, the network device may indicate the second indication information to the terminal device, where the second indication information is used to indicate the second transmission information or the third transmission information. The second transmission information may correspond to the transmission information obtained through measurement in the P1/P2 beam training process, and the third transmission information corresponds to the transmission information obtained through measurement in the P3 beam training process.

For example, based on resource configuration information sent by the network device, the terminal device assumes that the terminal device first receives the first reference signal 1 on the first resource by using the spatial characteristic parameter 1, to measure the first reference signal 1, and then, the terminal device receives the first reference signal 2 that is the same as the first reference signal 1 on the second resource by using the spatial characteristic parameter 2, to measure the first reference signal 2. The first resource may correspond to the P3 beam training process, and the second resource may correspond to the P1/P2 beam training process. In a possible case, the terminal device does not feed back a measurement result of the first reference signal 1 in the P3 beam training process. In a possible case, the terminal device may send the resource index of the first reference signal 1 to the network device, or send the resource index of the first reference signal 1 and a signal quality measurement value of the first reference signal 1, so that the terminal device feeds back a measurement result of the first reference signal in the P3 beam training process. The terminal device may send the resource index of the first reference signal 2 to the network device, so that the terminal device feeds back a measurement result of the first reference signal 2 in the P1/P2 beam training process. Alternatively, the terminal device may send the resource index of the first reference signal and a signal quality measurement value of the first reference signal to the network device, so that the terminal device feeds back a measurement result of the first reference signal in the P1/P2 beam training process. When the terminal device does not feed back the measurement result in the P3 beam training process to the network device, the network device may determine, based on a service requirement of the terminal device, that the terminal device uses the second transmission information or the third transmission information. For example, when the first target signal is a signal transmitted on a data channel, the network device may send the second indication information, to indicate the terminal device to receive or send the first target signal by using the spatial characteristic parameter 1. When the first target signal is a signal transmitted on a control channel, the network device may send the second indication information, to indicate the terminal device to receive or send the first target signal by using the spatial characteristic parameter 2. When the terminal device feeds back the measurement result in the P3 beam training process to the network device, the network device may send the second indication information based on the measurement result fed back by the terminal device, to indicate whether the terminal device uses the spatial characteristic parameter 1 or the spatial characteristic parameter 2 to receive or send the first target signal.

Similarly, based on resource configuration information sent by the network device, the terminal device assumes that the terminal device first receives the first reference signal 1 on the first resource by using the antenna panel information 1, to measure the first reference signal 1, and then, the terminal device receives the first reference signal 2 that is the same as the first reference signal 1 on the second resource by using the antenna panel information 2, to measure the first reference signal 2. The first resource may correspond to the P3 beam training process, and the second resource may correspond to the P1/P2 beam training process. The terminal device may send the resource index of the first reference signal 1 to the network device, or further send the signal quality measurement value of the first reference signal 1, so that the terminal device feeds back the measurement result of the first reference signal 1 in the P3 beam training process. The terminal device may send the resource index of the first reference signal 2 to the network device, so that the terminal device feeds back the measurement result of the first reference signal 2 in the P1/P2 beam training process. Alternatively, the terminal device may send the resource index of the first reference signal and the signal quality measurement value of the first reference signal to the network device, so that the terminal device feeds back the measurement result of the first reference signal in the P1/P2 beam training process. The network device may send the second indication information based on the measurement result fed back by the terminal device, to indicate whether the terminal device uses the antenna panel 1 or the antenna panel 2 to receive or send the first target signal. In an example, the network device sends the second indication information to the terminal device. A value of the second indication information is a first value or a second value. When the second indication information is the first value, the second indication information is used to indicate to measure the first-type channel quality; or when the second indication information is the second value, the second indication information is used to indicate to measure the second-type channel quality. In other words, the network device may indicate a more appropriate measurement type, so that the terminal device may determine transmission information corresponding to the more appropriate measurement type.

In an example, the network device sends the second indication information to the terminal device. A value of the second indication information is a first bit value or a second bit value. When the second indication information is the first bit value, the second indication information is used to indicate that the first transmission information is the second transmission information; or when the second indication information is the second bit value, the second indication information is used to indicate that the first transmission information is the third transmission information. For example, when the first bit value is 0, the second transmission information is indicated; when the first bit value is 1, the third transmission information is indicated. A data amount of the bit value is relatively small. Therefore, the network device can indicate the terminal device to use more appropriate transmission information by sending a relatively small amount of data, thereby more flexibly indicating the transmission information.

Optionally, there is an interval of S time units between a time domain position of the first resource and a time domain position of the second resource, and S is less than a third preset threshold.

In an example, a time unit in which the first resource is located is adjacent to a time unit in which the second resource is located.

In an example, the first resource and the second resource are located in at least one same time unit.

In an example, the second resource is a resource with a minimum interval from the time domain position of the first resource.

In other words, the terminal device measures the first reference signal 1 on the first resource and the first reference signal 2 on the second resource within relatively short time. Within the relatively short time, a channel condition or a channel state does not change greatly. Therefore, transmission information corresponding to the first reference signal 1 may be compared with transmission information corresponding to the first reference signal 2.

503: The terminal device receives or sends the first target signal based on the first transmission information.

Correspondingly, the network device sends or receives the first target signal.

When the first transmission information includes the first spatial characteristic parameter, the terminal device receives or sends the first target signal by using the first spatial characteristic parameter.

When the first transmission information includes the first antenna panel information, the terminal device receives or sends the first target signal by using an antenna panel corresponding to the first antenna panel information.

The following further describes the communication method provided in this embodiment of this application for a plurality of communication scenarios.

Scenario 1

Antenna panel information or a spatial characteristic parameter used by the terminal device to send an uplink signal may be determined based on a measurement result of a downlink reference signal. The network device may configure spatial relation parameter information of the uplink signal as a downlink reference signal (especially, in a scenario in which there is a reciprocity (beam correspondence) in uplink and downlink). The network device needs to configure, based on the antenna panel information used by the terminal device to send the uplink signal, information about power used by the terminal device to send the uplink signal. If the downlink reference signal is a reference signal in the P3 beam training process, the terminal device does not feed back, to the network device in the P3 beam training process, the antenna panel information determined by the terminal device, and the network device cannot configure power information for sending an uplink signal by the terminal device.

Figure 6:
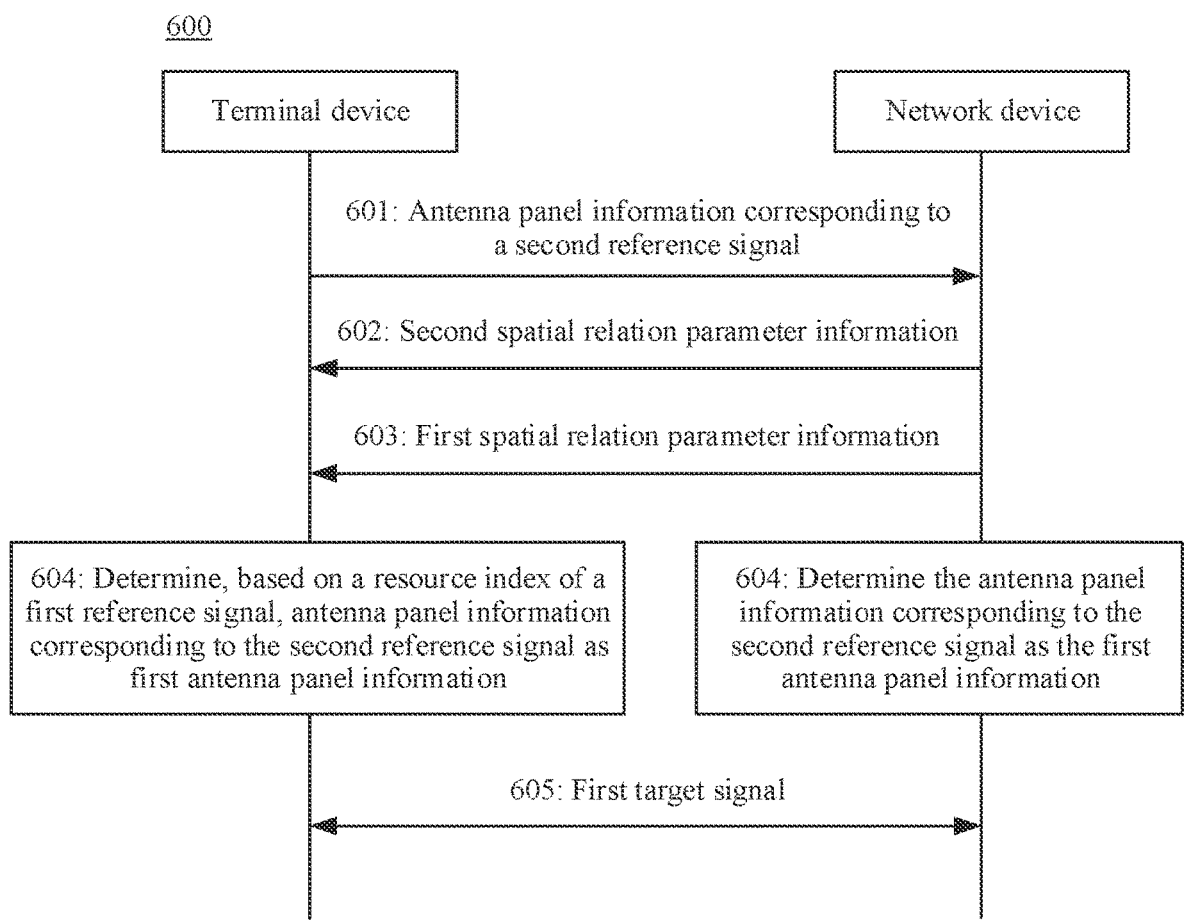
FIG. 6 is a schematic flowchart of a communication method according to an embodiment of this application.

As shown in FIG. 6, this application provides a communication method, so that a network device may determine antenna panel information used by a terminal device, to allocate, to the terminal device, power for sending a signal.

601: The terminal device sends antenna panel information corresponding to a second reference signal to the network device.

Correspondingly, the network device receives the antenna panel information that corresponds to the second reference signal and that is sent by the terminal device.

Optionally, the terminal device sends resource indexes of K reference signals and N pieces of antenna panel information to the network device, where the K reference signals include the second reference signal, the N pieces of antenna panel information include the antenna panel information corresponding to the second reference signal, and K and N are positive integers.

The resource index of the reference signal corresponds to the antenna panel information, and the antenna panel information is used to indicate an identifier or a virtual identifier of an antenna panel. Each of the K reference signals may correspond to one of the N pieces of antenna panel information.

In an example, if a quantity of active antenna panels is 1, the terminal device sends the resource indexes of the K reference signals and one piece of antenna panel information to the network device, where K is a positive integer. In this case, the resource indexes of the K reference signals correspond to the piece of antenna panel information.

In an example, if a quantity of active antenna panels is greater than 1, the terminal device sends the resource indexes of the K reference signals and K pieces of antenna panel information to the network device, where K is an integer greater than 1. In this case, the resource indexes of the K reference signals are in a one-to-one correspondence with the N pieces of antenna panel information.

In an example, each of the K reference signals may correspond to one of the N pieces of antenna panel information. In this case, the terminal device reports the resource index of each of the K reference signals and one or more pieces of antenna panel information corresponding to the resource index of each reference signal.

In an example, all of the K reference signals may correspond to one or more of the N pieces of antenna panel information. In this case, the terminal device reports the resource index of each of the K reference signals and one or more pieces of antenna panel information corresponding to the resource indexes of the K reference signals.

The second reference signal may be, for example, a CSI-RS, an SSB, a DMRS, a PTRS, or a TRS.

602: The network device sends second spatial relation parameter information to the terminal device, where the second spatial relation parameter information is spatial relation parameter information of a first reference signal, the second spatial relation parameter information includes a resource index of the second reference signal, a resource of the first reference signal belongs to a first reference signal resource set, and reference signal resources in the first reference signal resource set are transmitted by using a same downlink spatial transmission filter.

Correspondingly, the terminal device receives the second spatial relation parameter information sent by the network device.

The first reference signal may be, for example, a CSI-RS, an SSB, a DMRS, a PTRS, or a TRS.

For example, the second spatial relation parameter information may be QCL information of the first reference signal or spatial relation information of the first reference signal.

Because the second spatial relation parameter information includes the resource index of the second reference signal, the second reference signal and the first reference signal satisfy a QCL relationship or a spatial relation. When the first reference signal and the second reference signal are downlink signals, the second reference signal and the first reference signal satisfy the QCL relationship. When the first reference signal and the second reference signal are uplink signals, the second reference signal and the first reference signal satisfy the spatial relation.

As described above, the first reference signal may be used in a P3 beam training process. A plurality of reference signals in the first reference signal resource set are transmitted by using a same downlink spatial transmission filter. In other words, a repetition field of the first reference signal resource set that is configured by using higher layer signaling is "on".

603: The network device sends first spatial relation parameter information to the terminal device, where the first spatial relation parameter information is spatial relation parameter information of a first target signal, and the first spatial relation parameter information includes a resource index of the first reference signal.

Correspondingly, the terminal device receives the first spatial relation parameter information sent by the network device.

For a specific implementation of step 603, refer to step 501 in the embodiment shown in FIG. 5. Details are not described herein again.

604: The terminal device determines, based on the resource index of the first reference signal, the antenna panel information corresponding to the second reference signal as first antenna panel information.

Correspondingly, the network device may determine the antenna panel information corresponding to the second reference signal as the first antenna panel information.

In other words, there is the QCL relationship or the spatial relation between the second reference signal and the first reference signal (where the second reference signal is a source reference signal), and there is a QCL relationship or a spatial relation between the first reference signal and the first target signal (where the first reference signal is a source reference signal). The network device may indicate the resource index of the first reference signal, so that the terminal device may receive or send the first target signal by using antenna panel information corresponding to the source reference signal (that is, the second reference signal) of the first reference signal.

For example, if the terminal device receives the second reference signal by using antenna panel information 2, the antenna panel information corresponding to the second reference signal is the antenna panel information 2. The network device indicates the resource index of the first reference signal, and the spatial relation parameter information of the first reference signal includes the resource index of the second reference signal. Therefore, the terminal device may use the antenna panel information 2 as the first antenna panel information.

605: The terminal device receives or sends the first target signal based on the first antenna panel information.

Correspondingly, the network device sends or receives the first target signal.

Example 1: The first target signal may be an uplink signal, and the terminal device sends the first target signal based on the first antenna panel information. Correspondingly, the network device receives the first target signal, or the network device receives the first target signal based on the first antenna panel information.

Example 2: The first target signal may be a downlink signal, and the network device sends the first target signal, or the network device sends the first target signal based on the first antenna panel information. Correspondingly, the terminal device receives the first target signal based on the first antenna panel information.

For a specific implementation of step 605, refer to step 503 in the embodiment shown in FIG. 5. Details are not described herein again.

In the embodiment shown in FIG. 6, the network device may determine, based on the QCL relationship that the first reference signal and the second reference signal satisfy, that antenna panel information for sending the first target signal is the antenna panel information corresponding to the second reference signal, so that the network device may allocate, to the terminal device based on the antenna panel information corresponding to the second reference signal, transmit power for sending the first target signal.

Scenario 2

Antenna panel information or a spatial characteristic parameter used by the terminal device to send an uplink signal may be determined based on a measurement result of a downlink reference signal. The network device may configure spatial relation parameter information of the uplink signal as a downlink reference signal (especially, in a scenario in which there is a reciprocity (beam correspondence) in uplink and downlink). The network device needs to configure, based on the antenna panel information used by the terminal device to send the uplink signal, information about power used by the terminal device to send the uplink signal. If the downlink reference signal is a reference signal in the P3 beam training process, the terminal device does not feed back, to the network device in the P3 beam training process, the antenna panel information determined by the terminal device, and the network device cannot configure power information for sending an uplink signal by the terminal device.

Figure 7:
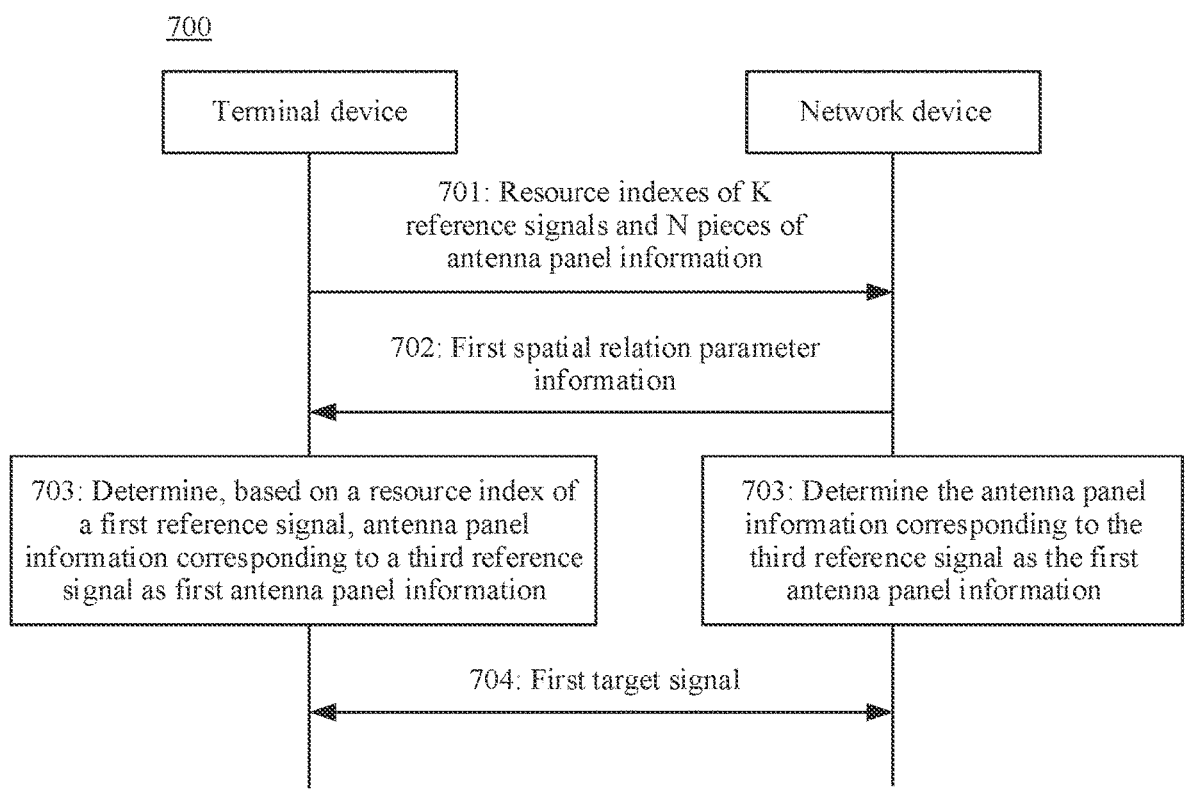
FIG. 7 is a schematic flowchart of a communication method according to an embodiment of this application.

As shown in FIG. 7, this application provides a communication method, so that a network device may determine antenna panel information used by a terminal device, to allocate, to the terminal device, power for sending a signal.

701: The terminal device sends resource indexes of K reference signals and N pieces of antenna panel information to the network device, where the K reference signals include a third reference signal, and the N pieces of antenna panel information include antenna panel information corresponding to the third reference signal. A resource of the third reference signal belongs to a second reference signal resource set, and reference signal resources in the second reference signal resource set are transmitted by using different downlink spatial transmission filters. The second reference signal resource set includes resources of M reference signals, the M reference signals include the third reference signal, and M is a positive integer. Therefore, K is less than or equal to M, and K and N are positive integers.

Correspondingly, the network device receives the resource indexes of the K reference signals and the N pieces of antenna panel information that are sent by the terminal device.

A correspondence between the resource indexes of the K reference signals and the N pieces of antenna panel information may be a one-to-one correspondence, a many-to-one correspondence, or a many-to-many correspondence. For details, refer to descriptions of related content in step 601 in the embodiment shown in FIG. 6. Details are not described herein.

As described above, the third reference signal may be used in a P1 or P2 beam training process. A plurality of reference signals in the second reference signal resource set are transmitted by using different downlink spatial transmission filters. In other words, a repetition field of the second reference signal resource set that is configured by using higher layer signaling is "off". In other words, the reference signal resources in the second reference signal resource set are not transmitted by using a same downlink spatial transmission filter.

For a specific implementation of step 701, refer to step 601 in the embodiment shown in FIG. 6. Details are not described herein again.

702: The network device sends first spatial relation parameter information to the terminal device, where the first spatial relation parameter information is spatial relation parameter information of a first target signal, the first spatial relation parameter information includes a resource index of a first reference signal, a resource of the first reference signal belongs to a first reference signal resource set, and reference signal resources in the first reference signal resource set are transmitted by using a same downlink spatial transmission filter.

Correspondingly, the terminal device receives the first spatial relation parameter information.

As described above, the first reference signal may be used in a P3 beam training process. A plurality of reference signals in the first reference signal resource set are transmitted by using a same downlink spatial transmission filter. In other words, a repetition field of the first reference signal resource set that is configured by using higher layer signaling is "on".

For a specific implementation of step 702, refer to step 501 in the embodiment shown in FIG. 5. Details are not described herein again.

703: The terminal device determines, based on the resource index of the first reference signal, the antenna panel information corresponding to the third reference signal as the first antenna panel information, where the third reference signal is a reference signal received at second time closest to first time, the first time is time at which the first reference signal is received, and the second time is earlier than the first time.

Correspondingly, the network device may determine the antenna panel information corresponding to the third reference signal as the first antenna panel information.

The first reference signal corresponds to CSI-RS repetition on. Before the terminal device receives the first reference signal, a reference signal that is last received by the terminal device and that corresponds to CSI-RS repetition off is the third reference signal. If the terminal device receives the third reference signal by using antenna panel information 3, the antenna panel information corresponding to the third reference signal is the antenna panel information 3. The network device may indicate the antenna panel information 3 to the terminal device by indicating the first reference signal.

For a specific implementation of step 703, further refer to step 502 in the embodiment shown in FIG. 5. Details are not described herein again.

704: The terminal device receives or sends the first target signal based on the first antenna panel information.

Correspondingly, the network device sends or receives the first target signal.

Example 1: The first target signal may be an uplink signal, and the terminal device sends the first target signal based on the first antenna panel information. Correspondingly, the network device receives the first target signal, or the network device receives the first target signal based on the first antenna panel information.

Example 2: The first target signal may be a downlink signal, and the network device sends the first target signal, or the network device sends the first target signal based on the first antenna panel information. Correspondingly, the terminal device receives the first target signal based on the first antenna panel information.

For a specific implementation of step 704, refer to step 503 in the embodiment shown in FIG. 5. Details are not described herein again.

In the embodiment shown in FIG. 7, because the terminal device reports the antenna panel information in the P1/P2 beam training process, the network device may determine, based on antenna panel information reported in the latest P1/P2 beam training process, the antenna panel information for sending the first target signal, so that the network device may allocate, to the terminal device based on the antenna panel information reported in the latest P1/P2 beam training process, transmit power for sending the first target signal.

Scenario 3

Antenna panel information or a spatial characteristic parameter used by the terminal device to send an uplink signal may be determined based on a measurement result of a downlink reference signal. The network device may configure spatial relation parameter information of the uplink signal as a downlink reference signal (especially, in a scenario in which there is a reciprocity (beam correspondence) in uplink and downlink). The network device needs to configure, based on the antenna panel information used by the terminal device to send the uplink signal, information about power used by the terminal device to send the uplink signal. If the downlink reference signal is a reference signal in the P3 beam training process, the terminal device does not feed back, to the network device in the P3 beam training process, the antenna panel information determined by the terminal device, and the network device cannot configure power information for sending an uplink signal by the terminal device.

Figure 8:
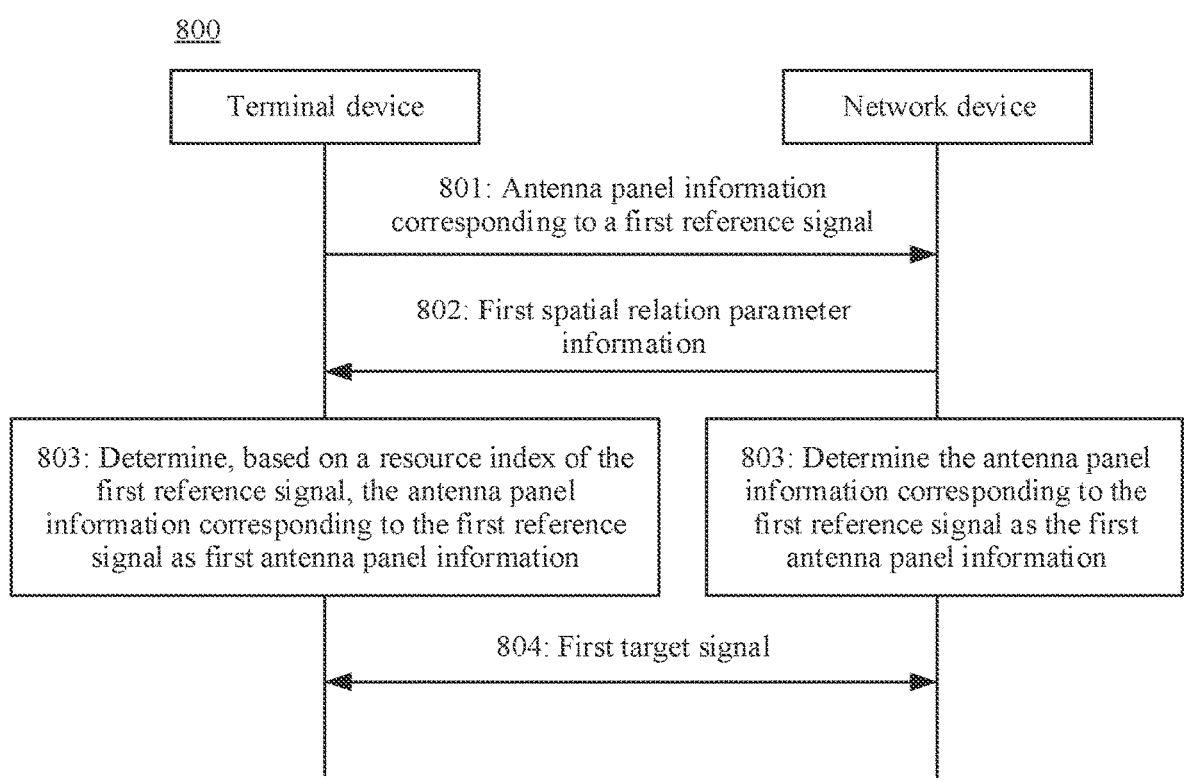
FIG. 8 is a schematic flowchart of a communication method according to an embodiment of this application.

As shown in FIG. 8, this application provides a communication method, so that a network device may determine antenna panel information used by a terminal device, to allocate, to the terminal device, power for sending a signal.

801: The terminal device sends antenna panel information corresponding to a first reference signal to the network device.

Correspondingly, the network device receives the antenna panel information that corresponds to the first reference signal and that is sent by the terminal device.

The terminal device may report only the antenna panel information corresponding to the first reference signal. The terminal device may alternatively report a resource index of the first reference signal and the antenna panel information corresponding to the first reference signal.

For a specific implementation of step 801, refer to step 601 in the embodiment shown in FIG. 6. Details are not described herein again.

802: The network device sends first spatial relation parameter information to the terminal device, where the first spatial relation parameter information is spatial relation parameter information of a first target signal, the first spatial relation parameter information includes the resource index of the first reference signal, a resource of the first reference signal belongs to a first reference signal resource set, and reference signal resources in the first reference signal resource set are transmitted by using a same downlink spatial transmission filter.

Correspondingly, the terminal device receives the first spatial relation parameter information sent by the network device.

As described above, the first reference signal may be used in a P3 beam training process. A plurality of reference signals in the first reference signal resource set are transmitted by using a same downlink spatial transmission filter. In other words, a repetition field of the first reference signal resource set that is configured by using higher layer signaling is "on".

For a specific implementation of step 802, refer to step 701 in the embodiment shown in FIG. 7. Details are not described herein again.

803: The terminal device determines, based on the resource index of the first reference signal, the antenna panel information corresponding to the first reference signal as first antenna panel information.

Correspondingly, the network device determines the antenna panel information corresponding to the first reference signal as the first antenna panel information.

The terminal device may send the first antenna panel information corresponding to the first reference signal to the network device, so that the network device may indicate that the resource index of the first reference signal is the first spatial relation parameter information of the first target signal, and the terminal device may receive or send the first target signal by using the first antenna panel information.

For example, if the terminal device receives the first reference signal by using antenna panel information 1, an antenna panel information corresponding to the first reference signal is the antenna panel information 1. The network device may indicate that the resource index of the first reference signal is the first spatial relation parameter information of the first target signal, so that the terminal device may determine the antenna panel information 1 based on the resource index of the first reference signal.

For another example, the terminal device receives the first reference signal by using antenna panel information X, where the antenna panel information X is receive antenna panel information. In a reciprocity scenario, transmit antenna panel information of the terminal device related to the antenna panel information X is the antenna panel information 1. When the first target signal is an uplink signal, the antenna panel corresponding to the first reference signal is the antenna panel information 1. The network device may indicate that the resource index of the first reference signal is the first spatial relation parameter information of the first target signal, so that the terminal device may determine the antenna panel information 1 based on the resource index of the first reference signal, and send the first target signal by using the antenna panel information 1. It should be understood that the receive antenna panel information X of the terminal device may be the same as or different from the transmit antenna panel information 1 of the terminal device.

804: The terminal device receives or sends the first target signal based on the first antenna panel information.

Correspondingly, the network device sends or receives the first target signal.

Example 1: The first target signal may be an uplink signal, and the terminal device sends the first target signal based on the first antenna panel information. Correspondingly, the network device receives the first target signal, or the network device receives the first target signal based on the first antenna panel information.

Example 2: The first target signal may be a downlink signal, and the network device sends the first target signal, or the network device sends the first target signal based on the first antenna panel information. Correspondingly, the terminal device receives the first target signal based on the first antenna panel information.

For a specific implementation of step 804, refer to step 503 in the embodiment shown in FIG. 5. Details are not described herein again.

In the embodiment shown in FIG. 8, because the terminal device reports the antenna panel information in the P3 beam training process, the network device may determine, based on the antenna panel information reported by the terminal device, the antenna panel information for sending the first target signal, so that the network device may allocate, to the terminal device, transmit power for sending the first target signal.

Scenario 4

In one beam training process, the network device sends a reference signal to the terminal device, and the terminal device may measure first-type channel quality and second-type channel quality of the reference signal by using different spatial characteristic parameters and/or antenna panel information. When the network device indicates to the terminal device that a resource index of the reference signal is spatial relation parameter information of another signal, the terminal device cannot determine a specific measurement process, where a spatial characteristic parameter and/or antenna panel information of the reference signal that are/is obtained from the measurement process are/is used to receive or send the another signal.

Figure 9:
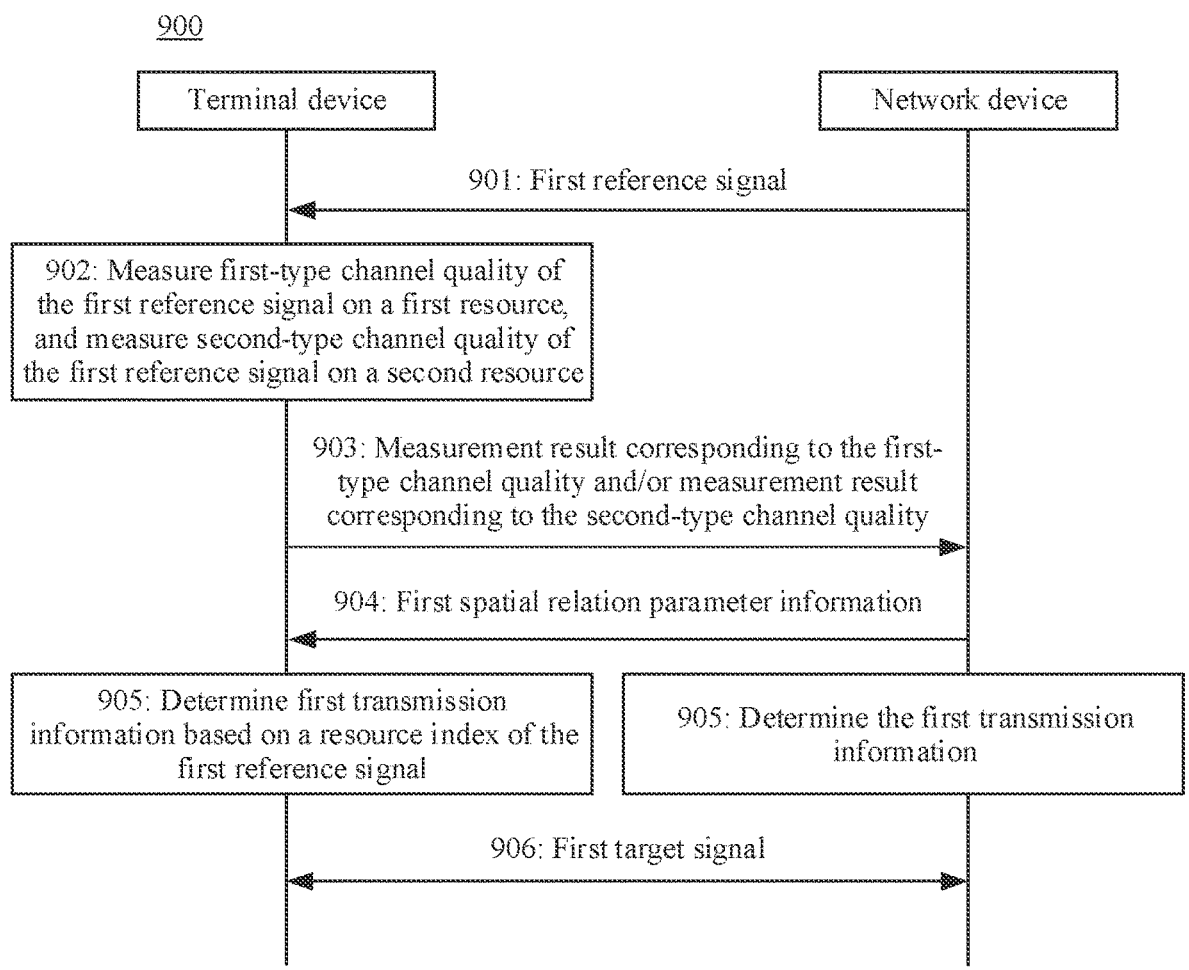
FIG. 9 is a schematic flowchart of a communication method according to an embodiment of this application.

As shown in FIG. 9, this application provides a communication method, so that a terminal device may determine, based on a reference signal resource index in spatial relation parameter information of a signal that is indicated by a network device, a spatial characteristic parameter and/or antenna panel information used to receive or send the signal, without confusion.

901: The network device sends a first reference signal to the terminal device.

Correspondingly, the terminal device receives the first reference signal sent by the network device.

The first reference signal may be, for example, a CSI-RS, an SSB, a DMRS, a PTRS, or a TRS.

It is assumed that the network device sends L same first reference signals to the terminal device, where frequency domain resources on which the L first reference signals are located are the same, time domain resources on which the L first reference signals are located are different from each other, and resource indexes of the L first reference signals are the same.

902: The terminal device measures first-type channel quality of the first reference signal on a first resource, and measures second-type channel quality of the first reference signal on a second resource, where the first reference signal corresponding to the first resource and the first reference signal corresponding to the second resource satisfy a quasi-colocation relationship.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the first-type channel quality is RSRP measurement, and the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

The quasi-colocation relationship may alternatively be replaced with a spatial relation. Spatial characteristic parameters and/or antenna panel information corresponding to two reference signals that satisfy a quasi-colocation relationship are/is the same or approximately the same. Therefore, the terminal device receives the first reference signal on the first resource and the first reference signal on the second resource by using a same (or similar) spatial characteristic parameter and/or same antenna panel information.

Optionally, because the terminal device or the network device moves, the terminal device may need to update its spatial characteristic parameter and/or antenna panel information based on channel state information, to obtain better transmission quality. However, a change of the channel state information may be a slowly changing process. It is agreed that the first reference signal corresponding to the first resource and the first reference signal corresponding to the second resource satisfy the quasi-colocation relationship, only when an interval of S time units between a time domain position of the first resource and a time domain position of the second resource is less than a preset threshold. Therefore, only two resources (the first resource and the second resource) on which the same reference signal is located in a relatively short time interval are received or measured by using a same (or similar) spatial characteristic parameter and/or same (or similar) antenna panel information, and are not received or measured by using a same (or similar) spatial characteristic parameter and/or same (or similar) antenna panel information at any time. It may also be understood that the first reference signal corresponding to the first resource and the first reference signal corresponding to the second resource do not satisfy the quasi-colocation relationship at any moment. However, the first reference signal corresponding to the first resource and the first reference signal corresponding to the second resource satisfy the quasi-colocation relationship only when a time interval between the first resource and the second resource is relatively small (for example, the time interval is less than the preset threshold). That the first reference signal corresponding to the first resource and the first reference signal corresponding to the second resource satisfy a quasi-colocation relationship may be understood as that the first resource and the second resource satisfy the quasi-colocation relationship. In an example, the second resource is a resource with a minimum interval from the time domain position of the first resource (which may also be understood as that the second resource is a resource that has a minimum interval from the time domain position of the first resource and is used to measure the second-type channel quality). In an example, a time unit in which the first resource is located is adjacent to a time unit in which the second resource is located. In an example, the first resource and the second resource are located in at least one same time unit. In another example, if the time interval between the first resource and the second resource does not satisfy the foregoing limitation, the terminal device may determine that a spatial characteristic parameter and/or antenna panel information corresponding to a resource closest to a first target signal in the first resource and the second resource are/is used to transmit the first target signal.

It should be understood that the first resource and the second resource may be resources that are closest to the first target signal and that are used for first-type channel quality measurement and second-type channel quality measurement, respectively.

For example, based on resource configuration information sent by the network device, the terminal device assumes that the terminal device first receives a first reference signal 1 on the first resource by using a spatial characteristic parameter 1, to measure the first-type channel quality, and then, the terminal device intends to receive a first reference signal 2 that is the same as the first reference signal 1 on the second resource. Because the first reference signal 2 and the first reference signal 1 satisfy a quasi-colocation relationship, the terminal device may receive the first reference signal 2 by using the spatial characteristic parameter 1 (that is, the first reference signal 1 and the first reference signal 2 are received by using a same spatial characteristic parameter), to measure the second-type channel quality.

For another example, it is assumed that the terminal device first receives a first reference signal 1 on the first resource by using antenna panel information 1, to measure the first-type channel quality, and then, the terminal device intends to receive a first reference signal 2 that is the same as the first reference signal 1 on the second resource based on resource configuration information sent by the network device. Because the first reference signal 2 and the first reference signal 1 satisfy a quasi-colocation relationship, the terminal device may receive the first reference signal 2 by using the antenna panel information 1 (that is, the first reference signal 1 and the first reference signal 2 are received by using same antenna panel information), to measure the second-type channel quality.

903: The terminal device sends, to the network device, a measurement result corresponding to the first-type channel quality and/or a measurement result corresponding to the second-type channel quality.

Correspondingly, the network device receives the measurement result corresponding to the first-type channel quality and/or the measurement result corresponding to the second-type channel quality that are/is sent by the terminal device.

904: The network device sends first spatial relation parameter information to the terminal device, where the first spatial relation parameter information is spatial relation parameter information of the first target signal, and the first spatial relation parameter information includes a resource index of the first reference signal.

Correspondingly, the terminal device receives the first spatial relation parameter information sent by the network device.

Spatial characteristic parameters and/or antenna panel information corresponding to two reference signals that satisfy a quasi-colocation relationship are/is the same or approximately the same. Therefore, a spatial characteristic parameter and/or antenna panel information used to transmit the first target signal may be determined by using only the resource index of the first reference signal.

905: The terminal device determines first transmission information based on the resource index of the first reference signal, where the first transmission information includes a first spatial characteristic parameter and/or first antenna panel information.

Correspondingly, the network device determines the first transmission information.

Therefore, when the network device indicates the resource index of the first reference signal to the terminal device, the terminal device may determine that the spatial characteristic parameter 1 and/or the antenna panel information 1 correspond/corresponds to the resource index of the first reference signal.

Similarly, that "the first reference signal corresponding to the first resource and the first reference signal corresponding to the second resource satisfy a quasi-colocation relationship" may be replaced with that "the reference signal corresponding to the first resource and the reference signal corresponding to the second resource correspond to a same spatial characteristic parameter" and/or "the reference signal corresponding to the first resource and the reference signal corresponding to the second resource correspond to same antenna panel information".

In an example, based on resource configuration information sent by the network device, the terminal device assumes that the terminal device first receives a first reference signal 1 on the first resource by using a spatial characteristic parameter 1, to measure the first-type channel quality, and then, the terminal device intends to receive a first reference signal 2 that is the same as the first reference signal 1 on the second resource. Because it is pre-agreed that a spatial characteristic parameter corresponding to the first reference signal 2 is the same as a spatial characteristic parameter corresponding to the first reference signal 1, the terminal device may receive the first reference signal 2 by using the spatial characteristic parameter 1 (that is, the first reference signal 1 and the first reference signal 2 are received by using a same spatial characteristic parameter), to measure the second-type channel quality. Therefore, when the network device indicates the resource index of the first reference signal to the terminal device, the terminal device may determine that the spatial characteristic parameter 1 corresponds to the resource index of the first reference signal.

In an example, based on resource configuration information sent by the network device, the terminal device assumes that the terminal device first receives a first reference signal 1 on the first resource by using antenna panel information 1, to measure the first-type channel quality, and then, the terminal device intends to receive a first reference signal 2 that is the same as the first reference signal 1 on the second resource. Because it is pre-agreed that antenna panel information corresponding to the first reference signal 2 is the same as antenna panel information corresponding to the first reference signal 1, the terminal device may receive the first reference signal 2 by using the antenna panel information 1 (that is, the first reference signal 1 and the first reference signal 2 are received by using same antenna panel information), to measure the second-type channel quality. Therefore, when the network device indicates the resource index of the first reference signal to the terminal device, the terminal device may determine that the antenna panel information 1 corresponds to the resource index of the first reference signal.

For a specific implementation of step 905, refer to step 502 in the embodiment shown in FIG. 5. Details are not described herein again.

906: The terminal device receives or sends the first target signal based on the first transmission information.

Correspondingly, the network device sends or receives the first target signal.

Example 1: The first target signal may be an uplink signal, and the terminal device sends the first target signal based on the first transmission information. Correspondingly, the network device receives the first target signal, or the network device receives the first target signal based on the first transmission information.

Example 2: The first target signal may be a downlink signal, and the network device sends the first target signal, or the network device sends the first target signal based on the first transmission information. Correspondingly, the terminal device receives the first target signal based on the first transmission information.

For a specific implementation of step 906, refer to step 503 in the embodiment shown in FIG. 5. Details are not described herein again.

When a resource index of a reference signal is configured for both first-type channel quality measurement and second-type channel quality measurement, because it is preset in such a manner that spatial characteristic parameters and/or antenna panel information used in two measurement processes are/is the same or similar, the terminal device may determine, based on an indication of the network device, the spatial characteristic parameter and/or the antenna panel information used to receive or send the first target signal, without confusion.

Scenario 5

In one beam training process, the network device sends a reference signal to the terminal device, and the terminal device may measure first-type channel quality and second-type channel quality of the reference signal by using different spatial characteristic parameters and/or antenna panel information. When the network device indicates to the terminal device that a resource index of the reference signal is spatial relation parameter information of another signal, the terminal device cannot determine a specific measurement process, where a spatial characteristic parameter and/or antenna panel information of the reference signal that are/is obtained from the measurement process are/is used to receive or send the another signal.

Figure 10:
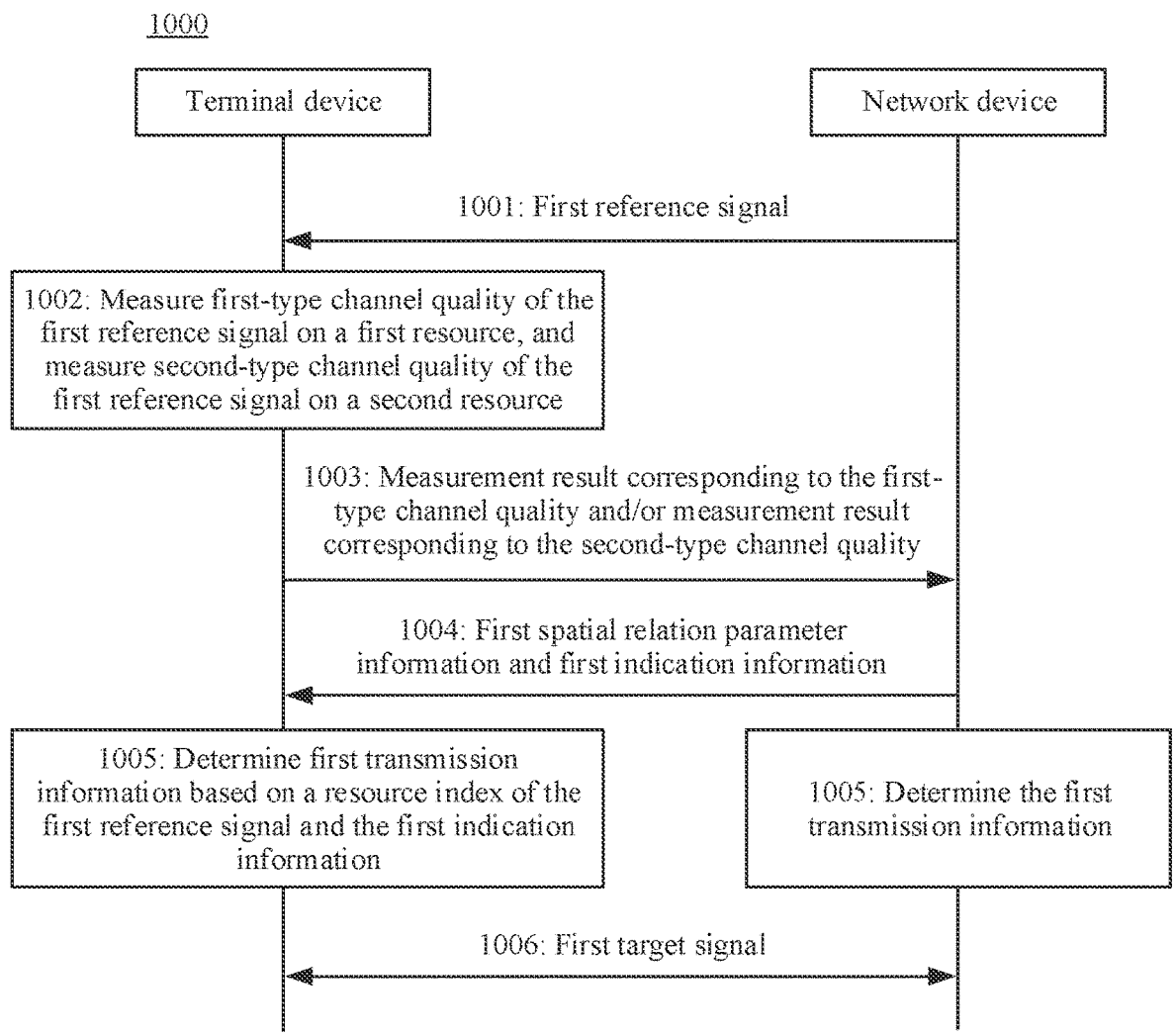
FIG. 10 is a schematic flowchart of a communication method according to an embodiment of this application.

As shown in FIG. 10, this application provides a communication method, so that a terminal device may determine, based on a reference signal resource index in spatial relation parameter information of a signal that is indicated by a network device, a spatial characteristic parameter and/or antenna panel information used to receive or send the signal, without confusion.

1001: The network device sends a first reference signal to the terminal device.

Correspondingly, the terminal device receives the first reference signal sent by the network device.

For a specific implementation of step 1001, refer to step 901 in the embodiment shown in FIG. 9. Details are not described herein again.

1002: The terminal device measures first-type channel quality of the first reference signal on a first resource based on (or by using) second transmission information, and measures second-type channel quality of the first reference signal on a second resource based on (or by using) third transmission information.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the first-type channel quality is RSRP measurement, and the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

For example, the terminal device first receives a first reference signal 1 on the first resource by using a spatial characteristic parameter 1, to measure the first-type channel quality. Then, the terminal device receives a first reference signal 2 that is the same as the first reference signal 1 on the second resource by using a spatial characteristic parameter 2.

For another example, the terminal device first receives a first reference signal 1 on the first resource by using antenna panel information 1, to measure the first-type channel quality. Then, the terminal device receives a first reference signal 2 that is the same as the first reference signal 1 on the second resource by using antenna panel information 2.

1003. The terminal device sends, to the network device, a measurement result corresponding to the first-type channel quality and/or a measurement result corresponding to the second-type channel quality.

Correspondingly, the network device receives the measurement result corresponding to the first-type channel quality and the measurement result corresponding to the second-type channel quality that are sent by the terminal device.

The terminal device may send a resource index of the first reference signal to the network device, to report the measurement result corresponding to the first-type channel quality and the measurement result corresponding to the second-type channel quality.

Optionally, the terminal device may send, to the network device, antenna panel information corresponding to the first-type channel quality and antenna panel information corresponding to the second-type channel quality.

Optionally, a channel quality measurement value corresponding to the first-type channel quality and a channel quality measurement value corresponding to the second-type channel quality are further included.

1004: The network device sends first spatial relation parameter information and first indication information to the terminal device, where the first spatial relation parameter information is spatial relation parameter information of a first target signal, and the first spatial relation parameter information includes the resource index of the first reference signal. The first indication information is used to indicate antenna port information of the first target signal, a value of the first indication information is a first value or a second value, the first value corresponds to the second transmission information, and the second value corresponds to the third transmission information.

Correspondingly, the terminal device receives the first spatial relation parameter information sent by the network device.

The first indication information may be used to indicate whether the terminal device is in a single-user transmission state or a multi-user transmission state. The first indication information is, for example, an antenna port field or antenna port indication information in DCI. The antenna port field or the antenna port indication information may be used to indicate an antenna port corresponding to the first target signal.

When the terminal device is in the single-user transmission state, because a signal interference factor has little impact on the terminal device in the single-user transmission state, the network device may indicate the resource index of the first reference signal and the first indication information of the first value to the terminal device, so that the terminal device can receive or send the first target signal based on the second transmission information. When the terminal device is in the multi-user transmission state, because a signal interference factor has some impact on the terminal device in the multi-user transmission state, the network device may indicate the resource index of the first reference signal and the first indication information of the second value to the terminal device, so that the terminal device can receive or send the first target signal based on the third transmission information.

1005: The terminal device determines the first transmission information based on the resource index of the first reference signal and the first indication information, where the first transmission information includes a first spatial characteristic parameter and/or first antenna panel information.

Correspondingly, the network device determines the first transmission information.

For a specific implementation of step 1005, refer to step 502 in the embodiment shown in FIG. 5. Details are not described herein again.

1006: The terminal device receives or sends the first target signal based on the first transmission information.

Correspondingly, the network device sends or receives the first target signal.

Example 1: The first target signal may be an uplink signal, and the terminal device sends the first target signal based on the first transmission information. Correspondingly, the network device receives the first target signal, or the network device receives the first target signal based on the first transmission information.

Example 2: The first target signal may be a downlink signal, and the network device sends the first target signal, or the network device sends the first target signal based on the first transmission information. Correspondingly, the terminal device receives the first target signal based on the first transmission information.

For a specific implementation of step 1006, refer to step 503 in the embodiment shown in FIG. 5. Details are not described herein again.

During multi-stream transmission or multi-user transmission, inter-beam interference or inter-user interference greatly affects signal transmission, and an interference factor needs to be considered in a process of obtaining signal transmission information. During single-stream transmission or single-user transmission, inter-beam interference or inter-user interference does not exist, and an interference factor does not need to be considered in a process of obtaining signal transmission information. Therefore, the network device may determine the antenna port information based on the transmission state of the terminal device, and send indication information (the antenna port information) to the terminal device, so that the terminal device may determine to use the spatial characteristic parameter and/or the antenna panel information obtained through the measurement of the first-type channel quality, or use the spatial characteristic parameter and/or the antenna panel information obtained through the measurement of the second-type channel quality, without confusion.

It should be understood that, optionally, because the terminal device or the network device moves, the terminal device may need to update its spatial characteristic parameter and/or antenna panel information based on channel state information, to obtain better transmission quality. However, a change of the channel state information may be a slowly changing process. The first transmission information of the first target signal is determined according to the foregoing method, only when an interval of S time units between a time domain position of the first resource and a time domain position of the second resource is less than a preset threshold. In an example, the second resource is a resource with a minimum interval from the time domain position of the first resource (which may also be understood as that the second resource is a resource that has a minimum interval from the time domain position of the first resource and is used to measure the second-type channel quality). In an example, a time unit in which the first resource is located is adjacent to a time unit in which the second resource is located. In an example, the first resource and the second resource are located in at least one same time unit. In another example, if a time interval between the first resource and the second resource does not satisfy the foregoing limitation, the terminal device may determine that transmission information corresponding to a resource closest to the first target signal in the first resource and the second resource is the first transmission information of the first target signal.

It should be understood that the first resource and the second resource may be resources that are closest to the first target signal and that are used for first-type channel quality measurement and second-type channel quality measurement, respectively.

Scenario 6

In one beam training process, the network device sends a reference signal to the terminal device, and the terminal device may measure first-type channel quality and second-type channel quality of the reference signal by using different spatial characteristic parameters and/or antenna panel information. When the network device indicates to the terminal device that a resource index of the reference signal is spatial relation parameter information of another signal, the terminal device cannot determine a specific measurement process, where a spatial characteristic parameter and/or antenna panel information of the reference signal that are/is obtained from the measurement process are/is used to receive or send the another signal.

Figure 11:
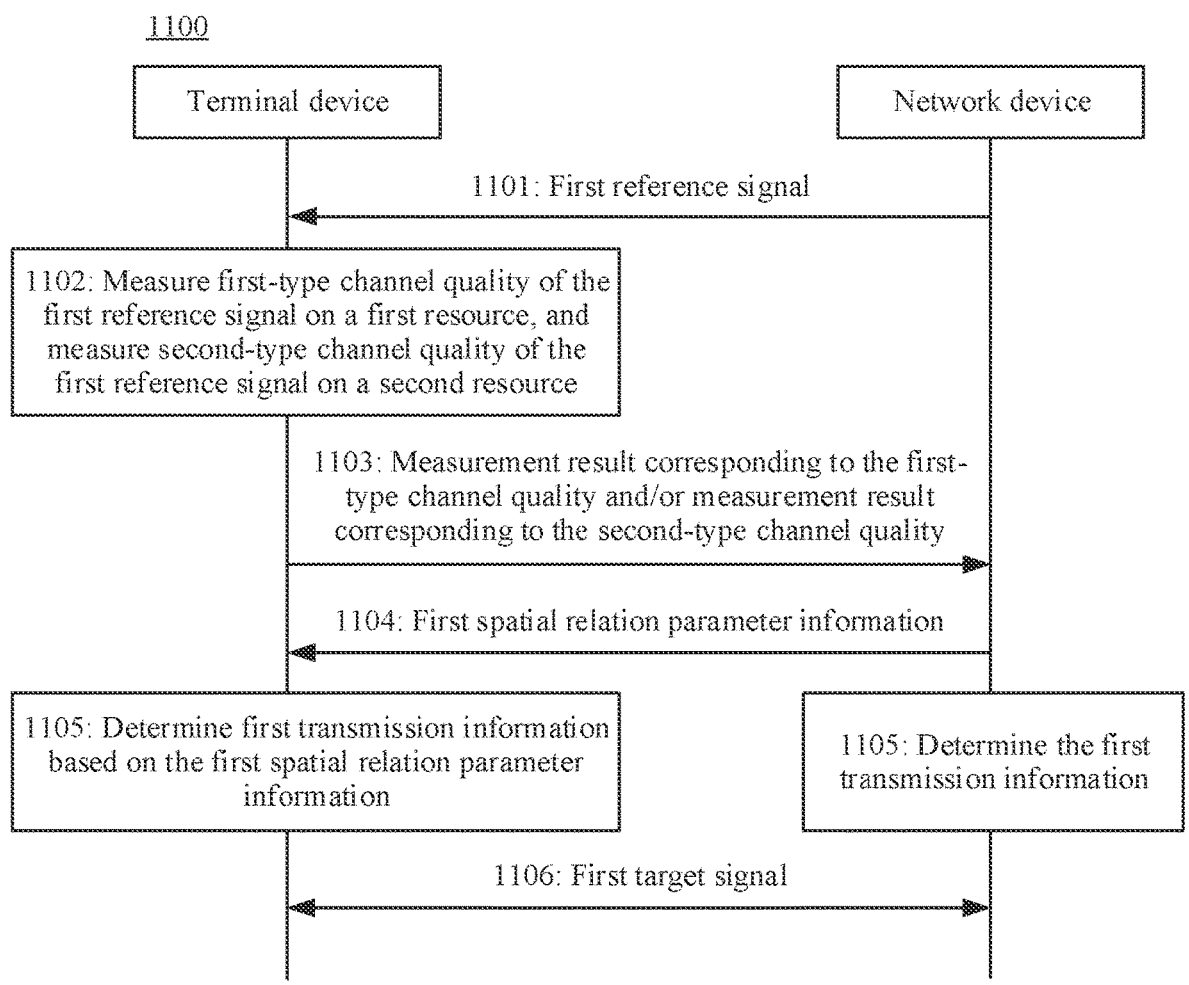
FIG. 11 is a schematic flowchart of a communication method according to an embodiment of this application.

As shown in FIG. 11, this application provides a communication method, so that a terminal device may determine, based on a reference signal resource index in spatial relation parameter information of a signal that is indicated by a network device, a spatial characteristic parameter and/or antenna panel information used to receive or send the signal, without confusion.

1101: The network device sends a first reference signal to the terminal device.

Correspondingly, the terminal device receives the first reference signal sent by the network device.

For a specific implementation of step 1101, refer to step 901 in the embodiment shown in FIG. 9. Details are not described herein again.

1102: The terminal device measures first-type channel quality of the first reference signal on a first resource based on second transmission information, and measures second-type channel quality of the first reference signal on a second resource based on third transmission information.

The measurement of the first-type channel quality is different from the measurement of the second-type channel quality. In an example, the measurement of the first-type channel quality may be measurement in which an interference factor is not considered, and the measurement of the second-type channel quality may be measurement in which an interference factor is considered. For example, the first-type channel quality is RSRP measurement, and the second-type channel quality is SINR measurement. When the network device sends configuration information to the terminal device, the configuration information includes a reporting configuration, and the reporting configuration includes a reference signal resource configuration measured by the network device and a reporting quantity (that is, a type of channel quality fed back by the terminal device). For example, the reporting quantity may be the first-type channel quality or the second-type channel quality.

For example, the terminal device first receives a first reference signal 1 on the first resource by using a spatial characteristic parameter 1, to measure the first-type channel quality. Then, the terminal device receives a first reference signal 2 that is the same as the first reference signal 1 on the second resource by using a spatial characteristic parameter 2.

For another example, the terminal device first receives a first reference signal 1 on the first resource by using antenna panel information 1, to measure the first-type channel quality. Then, the terminal device receives a first reference signal 2 that is the same as the first reference signal 1 on the second resource by using antenna panel information 2.

1103: The terminal device sends, to the network device, a measurement result corresponding to the first-type channel quality and a measurement result corresponding to the second-type channel quality.

Correspondingly, the network device receives the measurement result corresponding to the first-type channel quality and the measurement result corresponding to the second-type channel quality that are sent by the terminal device.

For a specific implementation of step 1101, refer to step 1001 in the embodiment shown in FIG. 10. Details are not described herein again.

1104: The network device sends first spatial relation parameter information to the terminal device, where the first spatial relation parameter information is spatial relation parameter information of a first target signal, and the first spatial relation parameter information includes a resource index of the first reference signal. The first spatial relation parameter information is used to indicate that a transmission state of the first target signal is a first state or a second state, the first state corresponds to the second transmission information, and the second state corresponds to the third transmission information.

Correspondingly, the terminal device receives the first spatial relation parameter information sent by the network device.

The network device may determine, based on the transmission state of the first target signal, whether the terminal device uses transmission information corresponding to the measurement of the first-type channel quality or transmission information corresponding to the measurement of the second-type channel quality. It is determined, based on the spatial relation parameter information of the first target signal that is indicated by the network device (for example, for the first spatial relation parameter information, a transmission configuration indicator (TCI) field or TCI indication information in downlink control information (DCI) is used to indicate the transmission state of the first target signal, that is, the TC field or the TCI indication information may be used to indicate QCL information of the first target signal) and/or antenna port information, to receive or send the first target signal by using the second transmission information or the third transmission information. The spatial relation parameter information and/or the antenna port information of the first target signal may implicitly indicate the transmission state of the first target signal.

1105: The terminal device determines the first transmission information based on the first spatial relation parameter information, where the first transmission information includes a first spatial characteristic parameter and/or first antenna panel information.

Correspondingly, the network device determines the first transmission information.

The terminal device may determine, based on the transmission state of the first target signal, that the terminal device receives or sends the first target signal by using the second transmission information or the third transmission information. The terminal device may perform determining based on the spatial relation parameter information of the first target signal that is indicated by the network device (for example, the first spatial relation parameter information is indicated by using a transmission configuration indicator (TCI) field or TCI indication information in downlink control information (DCI)). The terminal device may determine, based on the transmission state of the first target signal, to receive/send the first target signal by using the second transmission information or the third transmission information. When the transmission state of the first target signal is the first state, the terminal device transmits the first target signal by using the second transmission information. When the transmission state of the first target signal is the second state, the terminal device transmits the first target signal by using the third transmission information. The transmission state of the first target signal may be, for example, single-stream transmission or multi-stream transmission; for another example, single-beam transmission or multi-beam transmission; for another example, single-node (transmission reception point, TRP) transmission or multi-TRP transmission; or for another example, single-user transmission or multi-user transmission. The first state may be single-beam transmission, single-stream transmission, single-TRP transmission, and/or single-user transmission. The second state may be multi-beam transmission, multi-stream transmission, multi-TRP transmission, and/or multi-user transmission.

For a specific implementation of step 1105, refer to step 502 in the embodiment shown in FIG. 5. Details are not described herein again.

1106: The terminal device receives or sends the first target signal based on the first transmission information.

Correspondingly, the network device sends or receives the first target signal.

Example 1: The first target signal may be an uplink signal, and the terminal device sends the first target signal based on the first transmission information. Correspondingly, the network device receives the first target signal, or the network device receives the first target signal based on the first transmission information.

Example 2: The first target signal may be a downlink signal, and the network device sends the first target signal, or the network device sends the first target signal based on the first transmission information. Correspondingly, the terminal device receives the first target signal based on the first transmission information.

For a specific implementation of step 1106, refer to step 503 in the embodiment shown in FIG. 5. Details are not described herein again.

During multi-stream transmission or multi-user transmission, inter-beam interference or inter-user interference greatly affects signal transmission, and an interference factor needs to be considered in a process of obtaining signal transmission information. During single-stream transmission or single-user transmission, inter-beam interference or inter-user interference does not exist, and an interference factor does not need to be considered in a process of obtaining signal transmission information. Therefore, the terminal device may determine the transmission state of the terminal device based on a quantity of reference signal indexes included in the spatial characteristic parameter, to send indication information to the terminal device based on the transmission state, so that the terminal device may determine to use the spatial characteristic parameter and/or the antenna panel information obtained through the measurement of the first-type channel quality, or use the spatial characteristic parameter and/or the antenna panel information obtained through the measurement of the second-type channel quality, without confusion.

Scenario 7

In one beam training process, the network device sends a reference signal to the terminal device, and the terminal device may measure first-type channel quality and second-type channel quality of the reference signal by using different spatial characteristic parameters and/or antenna panel information. When the network device indicates to the terminal device that a resource index of the reference signal is spatial relation parameter information of another signal, the terminal device cannot determine a specific measurement process, where a spatial characteristic parameter and/or antenna panel information of the reference signal that are/is obtained from the measurement process are/is used to receive or send the another signal.

Figure 12:
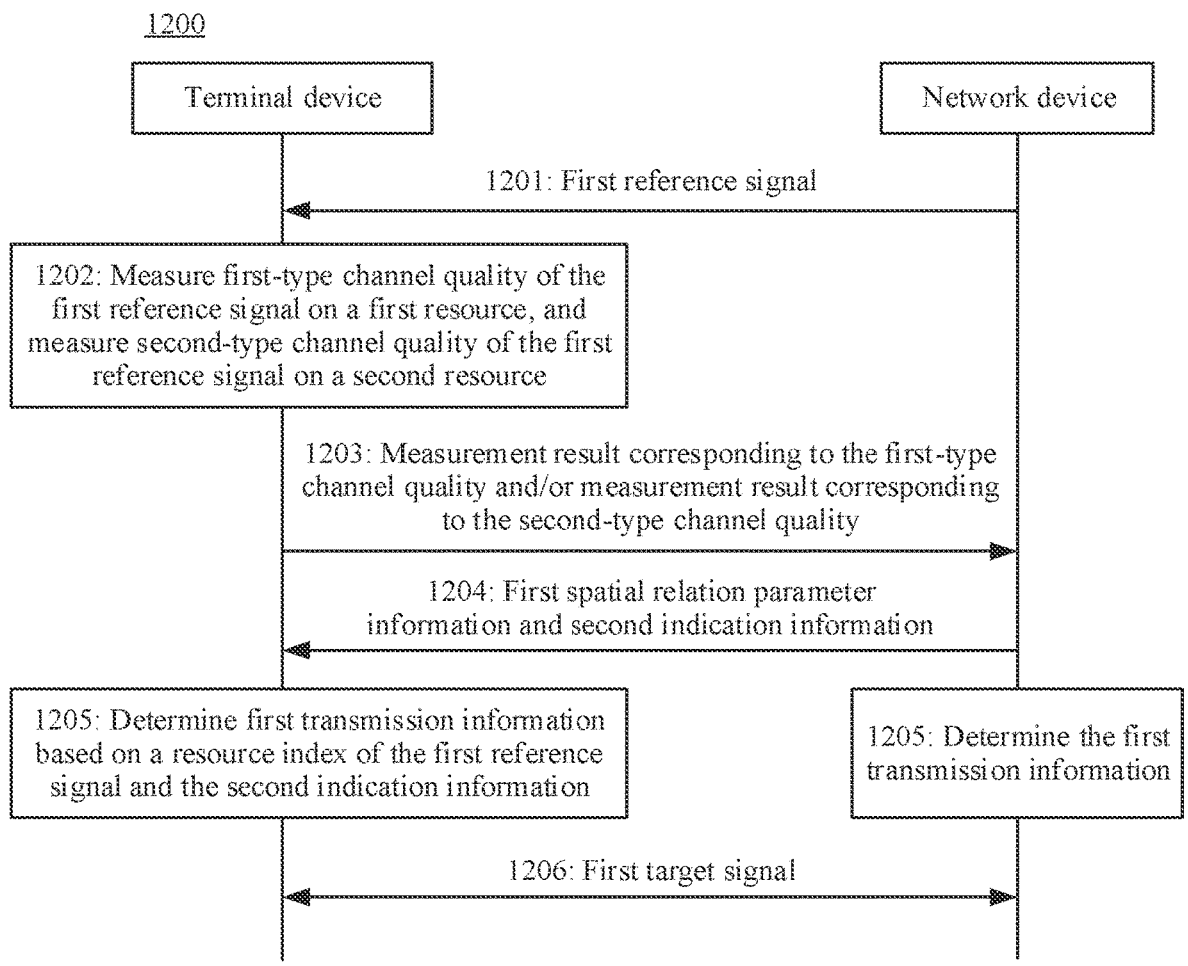
FIG. 12 is a schematic flowchart of a communication method according to an embodiment of this application.

As shown in FIG. 12, this application provides a communication method, so that a terminal device may determine, based on a reference signal resource index in spatial relation parameter information of a signal that is indicated by a network device, a spatial characteristic parameter and/or antenna panel information used to receive or send the signal, without confusion.

1201: The network device sends a first reference signal to the terminal device.

Correspondingly, the terminal device receives the first reference signal sent by the network device.

1202: The terminal device measures first-type channel quality of the first reference signal on a first resource based on second transmission information, and measures second-type channel quality of the first reference signal on a second resource based on third transmission information.

The device receives a first reference signal 2 that is the same as a first reference signal 1 on the second resource by using antenna panel information 2.

1203: The terminal device sends, to the network device, a measurement result corresponding to the first-type channel quality and/or a measurement result corresponding to the second-type channel quality.

For specific implementations of steps 1201 to 1203, refer to steps 1001 to 1003 in the embodiment shown in FIG. 10. Details are not described herein again.

1204: The network device sends the first spatial relation parameter information and second indication information to the terminal device. The first spatial relation parameter information is spatial relation parameter information of a first target signal, and the first spatial relation parameter information includes a resource index of the first reference signal. The second indication information indicates that the first transmission information is the second transmission information or the third transmission information.

Correspondingly, the terminal device receives the first spatial relation parameter information sent by the network device.

In an example, a value of the second indication information is a first value or a second value. When the second indication information is the first value, the second indication information is used to indicate to measure the first-type channel quality; or when the second indication information is the second value, the second indication information is used to indicate to measure the second-type channel quality.

In an example, a value of the second indication information is a first bit value or a second bit value. When the second indication information is the first bit value, the second indication information is used to indicate that the first transmission information is the second transmission information; or when the second indication information is the second bit value, the second indication information is used to indicate that the first transmission information is the third transmission information.

1205: The terminal device determines the first transmission information based on the resource index of the first reference signal and the second indication information, where the first transmission information includes a first spatial characteristic parameter and/or first antenna panel information.

Correspondingly, the network device determines the first transmission information.

For a specific implementation of step 1205, refer to step 502 in the embodiment shown in FIG. 5. Details are not described herein again.

1206. The terminal device receives or sends the first target signal based on the first transmission information.

Correspondingly, the network device sends or receives the first target signal.

Example 1: The first target signal may be an uplink signal, and the terminal device sends the first target signal based on the first transmission information. Correspondingly, the network device receives the first target signal, or the network device receives the first target signal based on the first transmission information.

Example 2: The first target signal may be a downlink signal, and the network device sends the first target signal, or the network device sends the first target signal based on the first transmission information. Correspondingly, the terminal device receives the first target signal based on the first transmission information.

For a specific implementation of step 1206, refer to step 503 in the embodiment shown in FIG. 5. Details are not described herein again.

Optionally, there is an interval of S time units between a time domain position of the first resource and a time domain position of the second resource, and S is less than a preset threshold.

The terminal device may report measurement results obtained in different measurement processes to the network device, and the network device determines a spatial characteristic parameter and/or antenna panel information corresponding to a specific measurement process to be used.

The spatial characteristic parameter and/or the antenna panel information used by the terminal device to receive or send the first target signal are/is indicated by using an instruction. Therefore, higher flexibility is provided, and a case in which a self-contradiction occurs and determining cannot be performed is avoided when the terminal device receives or sends the first target signal.

It should be understood that, optionally, because the terminal device or the network device moves, the terminal device may need to update its spatial characteristic parameter and/or antenna panel information based on channel state information, to obtain better transmission quality. However, a change of the channel state information may be a slowly changing process. The first transmission information of the first target signal is determined according to the foregoing method, only when the interval of S time units between the time domain position of the first resource and the time domain position of the second resource is less than the preset threshold. In an example, the second resource is a resource with a minimum interval from the time domain position of the first resource (which may also be understood as that the second resource is a resource that has a minimum interval from the time domain position of the first resource and is used to measure the second-type channel quality). In an example, a time unit in which the first resource is located is adjacent to a time unit in which the second resource is located. In an example, the first resource and the second resource are located in at least one same time unit. In another example, if a time interval between the first resource and the second resource does not satisfy the foregoing limitation, the terminal device may determine that transmission information corresponding to a resource closest to the first target signal in the first resource and the second resource is the first transmission information of the first target signal.

It should be understood that the first resource and the second resource may be resources that are closest to the first target signal and that are used for first-type channel quality measurement and second-type channel quality measurement, respectively.

Figure 13:
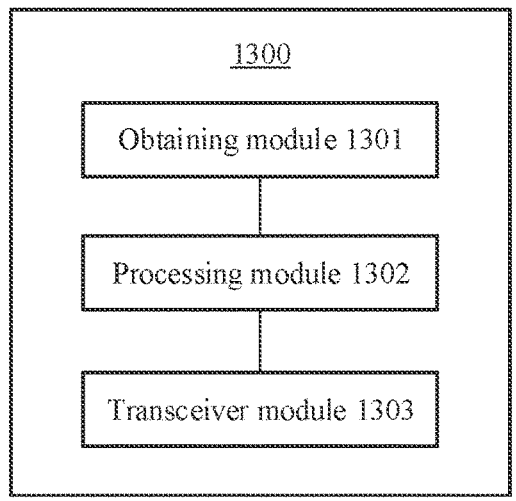
FIG. 13 is a schematic diagram depicting a structure of a communications apparatus according to an embodiment of this application.

FIG. 13 is a schematic diagram of a structure of a communications apparatus according to an embodiment of this application. The communications apparatus may be a terminal device, or may be a component (for example, a chip or a circuit) that can be used in the terminal device. As shown in FIG. 13, the communications apparatus 1300 may include an obtaining module 1301, a processing module 1302, and a transceiver module 1303.

The obtaining module 1301 is configured to obtain first spatial relation parameter information, where the first spatial relation parameter information is spatial relation parameter information of a first target signal, and the first spatial relation parameter information includes a resource index of a first reference signal.

The processing module 1302 is configured to determine first transmission information based on the resource index of the first reference signal, where the first transmission information includes first antenna panel information and/or a first spatial characteristic parameter.

The transceiver module 1303 is configured to receive or send the first target signal based on the first transmission information.

The obtaining module 1301 may be implemented by a receiver and/or a processor. The processing module 1302 may be implemented by a processor. The transceiver module 1303 may be implemented by a receiver and/or a transmitter. For specific functions and beneficial effects of the obtaining module 1301, the processing module 1302, and the transceiver module 1303, refer to the methods shown in FIG. 5 to FIG. 12. Details are not described herein again.

In a possible embodiment, a communications apparatus is further provided. The communications apparatus may be a terminal device, or may be a component (for example, a chip or a circuit) that can be used in the terminal device. The communications apparatus may include a transceiver and a processor, and optionally, may further include a memory. The transceiver may be configured to implement corresponding functions and operations of the receiving module and the sending module. The processor may be configured to implement a corresponding function and operation of the processing module. The memory may be configured to store executable instructions or application program code, and the processor controls execution of the executable instruction or the application program code, to implement the communication method provided in the foregoing embodiments of this application; and/or the memory may be configured to temporarily save some data, instruction information, and the like. The memory may be independent of the processor. In this case, the memory may be connected to the processor through a communications line. In another possible design, the memory may alternatively be integrated with the processor. This is not limited in this embodiment of this application.

Figure 14:
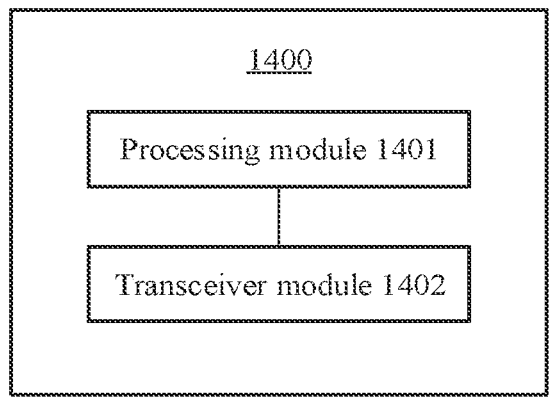
FIG. 14 is a schematic diagram depicting a structure of a communications apparatus according to an embodiment of this application.

FIG. 14 is a schematic diagram of a structure of a communications apparatus according to an embodiment of this application. The communications apparatus may be a network device, or may be a component (for example, a chip or a circuit) that can be used in the network device. As shown in FIG. 14, the communications apparatus 1400 may include a processing module 1401 and a transceiver module 1402.

The processing module 1401 is configured to determine first transmission information, where the first transmission information includes first antenna panel information and/or a first spatial characteristic parameter.

The transceiver module 1402 is configured to send first spatial relation parameter information based on the first transmission information, where the first spatial relation parameter information is spatial relation parameter information of a first target signal, and the first spatial relation parameter information includes a resource index of a first reference signal.

The transceiver module 1402 is further configured to send or receive the first target signal based on the first transmission information.

The processing module 1401 may be implemented by a processor. The transceiver module 1402 may be implemented by a receiver and/or a transmitter. For specific functions and beneficial effects of the processing module 1401 and the transceiver module 1402, refer to the methods shown in FIG. 5 to FIG. 12. Details are not described herein again.

In a possible embodiment, a communications apparatus is further provided. The communications apparatus may be a network device, or may be a component (for example, a chip or a circuit) that can be used in the network device. The communications apparatus may include a transceiver and a processor, and optionally, may further include a memory. The transceiver may be configured to implement corresponding functions and operations of the receiving module and the sending module. The processor may be configured to implement a corresponding function and operation of the processing module. The memory may be configured to store executable instructions or application program code, and the processor controls execution of the executable instruction or the application program code, to implement the communication method provided in the foregoing embodiments of this application; and/or the memory may be configured to temporarily save some data, instruction information, and the like. The memory may be independent of the processor. In this case, the memory may be connected to the processor through a communications line. In another possible design, the memory may alternatively be integrated with the processor. This is not limited in this embodiment of this application.

Figure 15:
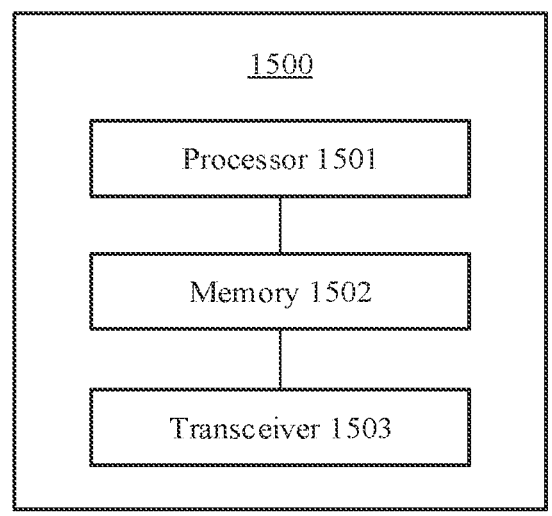
FIG. 15 is a schematic diagram depicting a structure of a communications apparatus according to an embodiment of this application.

FIG. 15 is a structural block diagram of a communications apparatus according to an embodiment of the present invention. The communications apparatus may be a terminal device. As shown in FIG. 15, the terminal device includes a processor 1501, a memory 1502, a radio frequency circuit, an antenna, and an input/output apparatus. The processor 1501 may be configured to process a communication protocol and communication data, control the terminal device, execute a software program, process data of the software program, and so on. The memory 1502 is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user, and output data to the user. It should be noted that some types of terminal devices may have no input/output apparatus.

When needing to send data, after performing baseband processing on the to-be-sent data, the processor 1501 outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 15. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, an antenna and a radio frequency circuit that have receiving and sending functions may be considered as a transceiver 1503 of the terminal device, and a processor having a processing function may be considered as a processing unit of the terminal device. The transceiver may also be referred to as a transceiver unit, a transceiver, a transceiver apparatus, or the like. The processing unit may also be referred to as a processor, a processing board, a processing module, a processing apparatus, or the like. Optionally, a component that is in the transceiver 1503 and that is configured to implement a receiving function may be considered as a receiving unit, and a component that is in the transceiver 1503 and that is configured to implement a sending function may be considered as a sending unit. In other words, the transceiver 1503 includes the receiving unit and the sending unit. The receiving unit sometimes may also be referred to as a receiver machine, a receiver, a receiving circuit, or the like. The sending unit sometimes may also be referred to as a transmitter machine, a transmitter, a transmitter circuit, or the like.

The processor 1501, the memory 1502, and the transceiver 1503 communicate with each other through an internal connection path, to transfer a control and/or data signal.

The methods disclosed in the foregoing embodiments of the present invention may be applied to the processor 1501, or implemented by the processor 1501. The processor 1501 may be an integrated circuit chip and has a signal processing capability. In an implementation process, the steps in the foregoing methods may be implemented by using a hardware integrated logic circuit in the processor 1501, or by using instructions in a form of software.

The foregoing processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps in the methods disclosed with reference to the embodiments of the present invention may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Optionally, in some embodiments, the memory 1502 may store instructions used to perform the method performed by the terminal device in the methods shown in FIG. 5 to FIG. 12. The processor 1501 may execute the instructions stored in the memory 1502 to complete, in combination with other hardware (for example, the transceiver 1503), the steps performed by the terminal device in the methods shown in FIG. 5 to FIG. 12. For a specific operation process and beneficial effects, refer to the descriptions in the embodiments shown in FIG. 5 to FIG. 12.

An embodiment of this application further provides a chip. The chip includes a transceiver unit and a processing unit. The transceiver unit may be an input/output circuit or a communications interface. The processing unit is a processor, a microprocessor, or an integrated circuit integrated on the chip. The chip may perform the method on the terminal device side in the foregoing method embodiments.

An embodiment of this application further provides a computer-readable storage medium. The computer-readable storage medium stores instructions, and when the instructions are executed, the method on the terminal device side in the foregoing method embodiments is performed.

An embodiment of this application further provides a computer program product including instructions. When the instructions are executed, the method on the terminal device side in the foregoing method embodiments is performed.

Figure 16:
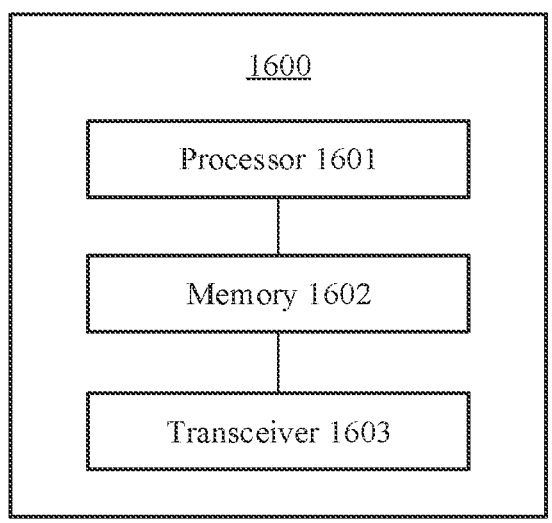
FIG. 16 is a schematic diagram depicting a structure of a communications apparatus according to an embodiment of this application.

FIG. 16 is a structural block diagram of a communications apparatus according to an embodiment of the present invention. The communications apparatus may be a network device. As shown in FIG. 16, the network device includes a processor 1601, a memory 1602, a radio frequency circuit, an antenna, and an input/output apparatus. The processor 1601 may be configured to process a communication protocol and communication data, control the network device, execute a software program, process data of the software program, and so on. The memory 1602 is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user, and output data to the user. It should be noted that some types of network devices may have no input/output apparatus.

When needing to send data, after performing baseband processing on the to-be-sent data, the processor 1601 outputs a baseband signal to the radio frequency circuit; and the radio frequency circuit performs radio frequency processing on the baseband signal and then sends the radio frequency signal to the outside in a form of an electromagnetic wave through the antenna. When data is sent to the network device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 16. In an actual network device product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, an antenna and a radio frequency circuit that have receiving and sending functions may be considered as a transceiver 1603 of the network device, and a processor having a processing function may be considered as a processing unit of the network device. The transceiver may also be referred to as a transceiver unit, a transceiver, a transceiver apparatus, or the like. The processing unit may also be referred to as a processor, a processing board, a processing module, a processing apparatus, or the like. Optionally, a component that is in the transceiver 1603 and that is configured to implement a receiving function may be considered as a receiving unit, and a component that is in the transceiver 1603 and that is configured to implement a sending function may be considered as a sending unit. In other words, the transceiver 1603 includes the receiving unit and the sending unit. The receiving unit sometimes may also be referred to as a receiver machine, a receiver, a receiving circuit, or the like. The sending unit sometimes may also be referred to as a transmitter machine, a transmitter, a transmitter circuit, or the like.

The processor 1601, the memory 1602, and the transceiver 1603 communicate with each other through an internal connection path, to transfer a control and/or data signal.

The methods disclosed in the foregoing embodiments of the present invention may be applied to the processor 1601, or implemented by the processor 1601. The processor 1601 may be an integrated circuit chip and has a signal processing capability. In an implementation process, the steps in the foregoing methods may be implemented by using a hardware integrated logic circuit in the processor 1601, or by using instructions in a form of software.

The foregoing processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps in the methods disclosed with reference to the embodiments of the present invention may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Optionally, in some embodiments, the memory 1602 may store instructions used to perform the method performed by the network device in the methods shown in FIG. 5 to FIG. 12. The processor 1601 may execute the instructions stored in the memory 1602 to complete, in combination with other hardware (for example, the transceiver 1603), the steps performed by the network device in the methods shown in FIG. 5 to FIG. 12. For a specific operation process and beneficial effects, refer to the descriptions in the embodiments shown in FIG. 5 to FIG. 12.

An embodiment of this application further provides a chip. The chip includes a transceiver unit and a processing unit. The transceiver unit may be an input/output circuit or a communications interface. The processing unit is a processor, a microprocessor, or an integrated circuit integrated on the chip. The chip may perform the method on the network device side in the foregoing method embodiments.

An embodiment of this application further provides a computer-readable storage medium. The computer-readable storage medium stores instructions, and when the instructions are executed, the method on the network device side in the foregoing method embodiments is performed.

An embodiment of this application further provides a computer program product including instructions. When the instructions are executed, the method on the network device side in the foregoing method embodiments is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining first spatial relation parameter information, wherein the first spatial relation parameter information is spatial relation parameter information of a first target signal, and the first spatial relation parameter information comprises a resource index of a first reference signal;
    determining first transmission information based on the resource index of the first reference signal, wherein the first transmission information comprises at least one of first antenna panel information or a first spatial characteristic parameter, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information comprises at least one of a second spatial characteristic parameter or second antenna panel information, the first reference signal on the second resource corresponds to third transmission information, the third transmission information comprises at least one of a third spatial characteristic parameter or third antenna panel information, and determining the first transmission information based on the resource index of the first reference signal comprises:
        determining the first transmission information based on the first spatial relation parameter information, wherein the first spatial relation parameter information indicates that a transmission state of the first target signal is a first state or a second state, the first state corresponds to the second transmission information, and the second state corresponds to the third transmission information; or
        determining the first transmission information based on the resource index of the first reference signal and first indication information, wherein the first indication information indicates antenna port information of the first target signal, a value of the first indication information is a third value or a fourth value, the third value corresponds to the second transmission information, and the fourth value corresponds to the third transmission information; and
    receiving or sending the first target signal based on the first transmission information.

2. The method according to claim 1, wherein a resource of the first reference signal belongs to a first reference signal resource set, and reference signal resources in the first reference signal resource set are transmitted by using a same downlink spatial transmission filter.

3. The method according to claim 1, wherein before the obtaining first spatial relation parameter information, the method further comprises:
    obtaining second spatial relation parameter information, wherein the second spatial relation parameter information is spatial relation parameter information of the first reference signal, and the second spatial relation parameter information comprises a resource index of a second reference signal; and
    the determining first transmission information based on the resource index of the first reference signal comprises:
        determining, based on the resource index of the first reference signal, antenna panel information corresponding to the second reference signal as the first antenna panel information.

4. The method according to claim 1, wherein the determining first transmission information based on the resource index of the first reference signal comprises:
    determining antenna panel information corresponding to a third reference signal as the first antenna panel information, wherein:
        a resource of the third reference signal belongs to a second reference signal resource set, the third reference signal is a reference signal received at a second time closest to a first time, the first time is a time at which the first reference signal is received, the second time is earlier than the first time, and reference signal resources in the second reference signal resource set are transmitted by using different downlink spatial transmission filters.

5. The method according to claim 1, wherein before the obtaining first spatial relation parameter information, the method further comprises:
sending the first antenna panel information corresponding to the first reference signal.

6. The method according to claim 1,
wherein a reference signal corresponding to the first resource and a reference signal corresponding to the second resource meet at least one of the following requirements:
the reference signal corresponding to the first resource and the reference signal corresponding to the second resource satisfy a quasi-colocation relationship;
the reference signal corresponding to the first resource and the reference signal the reference signal corresponding to the first resource and the reference signal corresponding to the second resource correspond to a same spatial characteristic parameter, and a spatial characteristic parameter corresponding to the first reference signal is the first spatial characteristic parameter; or
the reference signal corresponding to the first resource and the reference signal the reference signal corresponding to the first resource and the reference signal corresponding to the second resource correspond to same antenna panel information, and antenna panel information corresponding to the first reference signal is the first antenna panel information; and
wherein:
the third reference signal resource set is used to measure the first-type channel quality, and the fourth reference signal resource set is used to measure the second-type channel quality; or
reference signal resources in the third reference signal resource set are transmitted by using a same downlink spatial transmission filter, and reference signal resources in the fourth reference signal resource set are transmitted by using different downlink spatial transmission filters.

7. An apparatus comprising:
at least one processor; and
one or more memories storing instructions that when executed by the at least one processor, cause the apparatus to perform operations comprising:
obtaining first spatial relation parameter information, wherein the first spatial relation parameter information is spatial relation parameter information of a first target signal, and the first spatial relation parameter information comprises a resource index of a first reference signal;
determining first transmission information based on the resource index of the first reference signal, wherein the first transmission information comprises at least one of first antenna panel information or a first spatial characteristic parameter, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information comprises at least one of a second spatial characteristic parameter or second antenna panel information, the first reference signal on the second resource corresponds to third transmission information, the third transmission information comprises at least one of a third spatial characteristic parameter or third antenna panel information, and determining the first transmission information based on the resource index of the first reference signal comprises:
determining the first transmission information based on the first spatial relation parameter information, wherein the first spatial relation parameter information indicates that a transmission state of the first target signal is a first state or a second state, the first state corresponds to the second transmission information, and the second state corresponds to the third transmission information; or
determining the first transmission information based on the resource index of the first reference signal and first indication information, wherein the first indication information indicates antenna port information of the first target signal, a value of the first indication information is a third value or a fourth value, the third value corresponds to the second transmission information, and the fourth value corresponds to the third transmission information; and
receiving or sending the first target signal based on the first transmission information.

8. The apparatus according to claim 7, wherein a resource of the first reference signal belongs to a first reference signal resource set, and reference signal resources in the first reference signal resource set are transmitted by using a same downlink spatial transmission filter.

9. The apparatus according to claim 7, wherein the operations further comprise:
obtaining second spatial relation parameter information, wherein the second spatial relation parameter information is spatial relation parameter information of the first reference signal, and the second spatial relation parameter information comprises a resource index of a second reference signal; and
determining, based on the resource index of the first reference signal, antenna panel information corresponding to the second reference signal as the first antenna panel information.

10. The apparatus according to claim 7, wherein the operations further comprise:
determining antenna panel information corresponding to a third reference signal as the first antenna panel information, wherein:
a resource of the third reference signal belongs to a second reference signal resource set, the third reference signal is a reference signal received at a second time closest to a first time, the first time is a time at which the first reference signal is received, the second time is earlier than the first time, and reference signal resources in the second reference signal resource set are transmitted by using different downlink spatial transmission filters.

11. The apparatus according to claim 7, wherein the operations further comprise:
sending the first antenna panel information corresponding to the first reference signal.

12. The apparatus according to claim 7,
wherein a reference signal corresponding to the first resource and a reference signal corresponding to the second resource meet at least one of the following requirements:
the reference signal corresponding to the first resource and the reference signal corresponding to the second resource satisfy a quasi-colocation relationship;
the reference signal corresponding to the first resource and the reference signal the reference signal corresponding to the first resource and the reference signal corresponding to the second resource correspond to a same spatial characteristic parameter, and a spatial characteristic parameter corresponding to the first reference signal is the first spatial characteristic parameter; or
the reference signal corresponding to the first resource and the reference signal the reference signal corresponding to the first resource and the reference signal corresponding to the second resource correspond to same antenna panel information, and antenna panel information corresponding to the first reference signal is the first antenna panel information; and
wherein:
the third reference signal resource set is used to measure the first-type channel quality, and the fourth reference signal resource set is used to measure the second-type channel quality; or
reference signal resources in the third reference signal resource set are transmitted by using a same downlink spatial transmission filter, and reference signal resources in the fourth reference signal resource set are transmitted by using different downlink spatial transmission filters.

13. An apparatus, comprising:
at least one processor; and
one or more memories storing instructions that when executed by the at least one processor, cause the apparatus to perform operations comprising:
determining first transmission information, wherein the first transmission information comprises at least one of first antenna panel information or a first spatial characteristic parameter;
sending first spatial relation parameter information based on the first transmission information, wherein the first spatial relation parameter information is spatial relation parameter information of a first target signal, the first spatial relation parameter information comprises a resource index of a first reference signal, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information comprises at least one of a second spatial characteristic parameter or second antenna panel information, the first reference signal on the second resource corresponds to third transmission information, the third transmission information comprises at least one of a third spatial characteristic parameter or third antenna panel information, and sending the first spatial relation parameter information based on the first transmission information comprises:
sending the first spatial relation parameter information based on the first sending the first spatial relation parameter information based on the first transmission information, wherein the first spatial relation parameter information indicates that a transmission state of the first target signal is a first state or a second state, the first state corresponds to the second transmission information, and the second state corresponds to the third transmission information; or
sending the first spatial relation parameter information based on the first transmission information and first indication information, wherein the first indication information indicates antenna port information of the first target signal, a value of the first indication information is a third value or a fourth value, the third value corresponds to the second transmission information, and the fourth value corresponds to the third transmission information; and
sending or receiving the first target signal based on the first transmission information.

14. The apparatus according to claim 13, wherein a resource of the first reference signal belongs to a first reference signal resource set, and reference signal resources in the first reference signal resource set are transmitted by using a same downlink spatial transmission filter.

15. The apparatus according to claim 13, wherein the operations further comprise:
sending second spatial relation parameter information, wherein the second spatial relation parameter information is spatial relation parameter information of the first reference signal, and the second spatial relation parameter information comprises a resource index of a second reference signal; and
determining antenna panel information corresponding to the second reference signal as the first antenna panel information.

16. The apparatus according to claim 13, wherein the operations further comprises:
determining antenna panel information corresponding to a third reference signal as the first antenna panel information, wherein:
a resource of the third reference signal belongs to a second reference signal resource set, the third reference signal is a reference signal sent at a second time closest to a first time, the first time is a time at which the first reference signal is received, the second time is earlier than the first time, and reference signal resources in the second reference signal resource set are transmitted by using different downlink spatial transmission filters.

17. The apparatus according to claim 13, wherein the operations further comprise:
receiving the first antenna panel information corresponding to the first reference signal.

18. The apparatus according to claim 13,
wherein a reference signal corresponding to the first resource and a reference signal corresponding to the second resource meet at least one of the following requirements:
the reference signal corresponding to the first resource and the reference signal corresponding to the second resource satisfy a quasi-colocation relationship;
the reference signal corresponding to the first resource and the reference signal the reference signal corresponding to the first resource and the reference signal corresponding to the second resource correspond to a same spatial characteristic parameter, and a spatial characteristic parameter corresponding to the first reference signal is the first spatial characteristic parameter; or the reference signal corresponding to the first resource and the reference signal corresponding to the second resource correspond to same antenna panel information, and antenna panel information corresponding to the first reference signal is the first antenna panel information; and wherein:

the third reference signal resource set is used to measure the first-type channel quality, and the fourth reference signal resource set is used to measure the second-type channel quality; or reference signal resources in the third reference signal resource set are transmitted by using a same downlink spatial transmission filter, and reference signal resources in the fourth reference signal resource set are transmitted by using different downlink spatial transmission filters.

19. A method, comprising:

determining first transmission information, wherein the first transmission information comprises at least one of first antenna panel information or a first spatial characteristic parameter;

sending first spatial relation parameter information based on the first transmission information, wherein the first spatial relation parameter information is spatial relation parameter information of a first target signal, and the first spatial relation parameter information comprises a resource index of a first reference signal, a first resource occupied by the first reference signal is a resource in a third reference signal resource set, a second resource occupied by the first reference signal is a resource in a fourth reference signal resource set, the third reference signal resource set is used to measure first-type channel quality, the fourth reference signal resource set is used to measure second-type channel quality, the first reference signal on the first resource corresponds to second transmission information, the second transmission information comprises at least one of a second spatial characteristic parameter or second antenna panel information, the first reference signal on the second resource corresponds to third transmission information, and the third transmission information comprises at least one of a third spatial characteristic parameter or third antenna panel information, and sending the first spatial relation parameter information based on the first transmission information comprises:

sending the first spatial relation parameter information based on the first transmission sending the first spatial relation parameter information based on the first transmission information, wherein the first spatial relation parameter information indicates that a transmission state of the first target signal is a first state or a second state, the first state corresponds to the second transmission information, and the second state corresponds to the third transmission information; or sending the first spatial relation parameter information based on the first transmission sending the first spatial relation parameter information based on the first transmission information and first indication information, wherein the first indication information indicates antenna port information of the first target signal, a value of the first indication information is a third value or a fourth value, the third value corresponds to the second transmission information, and the fourth value corresponds to the third transmission information; and sending or receiving the first target signal based on the first transmission information.

20. The method according to claim 19, wherein a resource of the first reference signal belongs to a first reference signal resource set, and reference signal resources in the first reference signal resource set are transmitted by using a same downlink spatial transmission filter.

* * * * *

UNITED STATES PATENT AND TRADEMARK OFFICE
CERTIFICATE OF CORRECTION

| | |
|---|---|
| PATENT NO. | : 11,799,520 B2 |
| APPLICATION NO. | : 17/584731 |
| DATED | : October 24, 2023 |
| INVENTOR(S) | : Di Zhang and Kunpeng Liu |

It is certified that error appears in the above-identified patent and that said Letters Patent is hereby corrected as shown below:

In the Claims

Column 81, Line 20-21, Claim 6, after "signal" please delete "the reference signal corresponding to the first resource and the reference signal";

Column 81, Line 28-29, Claim 6, after "signal" please delete "the reference signal corresponding to the first resource and the reference signal";

Column 83, Line 11-12, Claim 12, after "signal" please delete "the reference signal corresponding to the first resource and the reference signal";

Column 83, Line 19-20, Claim 12, after "signal" please delete "the reference signal corresponding to the first resource and the reference signal";

Column 84, Line 3-4, Claim 13, after "comprises:" please delete "sending the first spatial relation parameter information based on the first";

Column 84, Line 66-67, Claim 18, after "signal" please delete "the reference signal corresponding to the first resource and the reference signal";

Column 86, Line 14-16, Claim 19, after "transmission" please delete "sending the first spatial relation parameter information based on the first transmission";

Column 86, Line 23-25, Claim 19, after "transmission" please delete "sending the first spatial relation parameter information based on the first transmission".

Signed and Sealed this
Fourteenth Day of May, 2024

Katherine Kelly Vidal
*Director of the United States Patent and Trademark Office*